US012145346B2

United States Patent
Reinhall et al.

(10) Patent No.: US 12,145,346 B2
(45) Date of Patent: Nov. 19, 2024

(54) CUSTOM MANUFACTURED FIT PODS

(71) Applicant: VICIS IP, LLC, New York, NY (US)

(72) Inventors: Per Reinhall, Seattle, WA (US); John Cagle, Seattle, WA (US); Derek Wallin, Seattle, WA (US); Jason Neubauer, Seattle, WA (US); Valerie Carricaburu, Seattle, WA (US); Colin Johnson, Seattle, WA (US); Bertrand Didier, Seattle, WA (US); Andre H P Stone, Seattle, WA (US); Amish Patel, Seattle, WA (US)

(73) Assignee: VICIS IP, LLC, New York, NY (US)

( * ) Notice: Subject to any disclaimer, the term of this patent is extended or adjusted under 35 U.S.C. 154(b) by 0 days.

(21) Appl. No.: 17/149,120

(22) Filed: Jan. 14, 2021

(65) Prior Publication Data

US 2021/0187897 A1    Jun. 24, 2021

Related U.S. Application Data

(63) Continuation-in-part of application No. PCT/US2019/061157, filed on Nov. 13, 2019.
(Continued)

(51) Int. Cl.
*B32B 3/12*    (2006.01)
*A42B 3/06*    (2006.01)
(Continued)

(52) U.S. Cl.
CPC ............... *B32B 3/12* (2013.01); *A42B 3/064* (2013.01); *B32B 3/06* (2013.01); *B32B 3/14* (2013.01);
(Continued)

(58) Field of Classification Search
CPC .............. A41D 13/015; A41D 13/0156; A41D 13/0158; A41D 31/02; A41D 31/28;
(Continued)

(56) References Cited

U.S. PATENT DOCUMENTS 1,080,690 A    12/1913  Hipkiss
2,140,716 A    12/1938  Pryale
(Continued)

FOREIGN PATENT DOCUMENTS

WO    2010082970 A1    7/2010
WO    2015103634 A2    7/2015
(Continued)

OTHER PUBLICATIONS

U.S. Appl. No. 62/851,080.*
(Continued)

*Primary Examiner* — Z. Jim Yang
(74) *Attorney, Agent, or Firm* — Lorenz & Kopf, LLP

(57) ABSTRACT

A microlattice structure may be used for a variety of different applications with a protective helmet assembly. The three-dimensional microlattice layer comprising a plurality of interconnected filaments extending along at least three different directions from a plurality of nodes. The microlattice layer may further comprise at least one material layer extending laterally between and interconnecting at least two or more nodes. The at least one material layer may be configured to transversely and rotationally constrain the nodes to increase the overall compressive strength and stiffness of the microlattice structure. The at least one material layer may comprise a single, continuous layer and/or a plurality of material layer segments. The microlattice layer may comprise a single, continuous layer or a plurality of microlattice layer segments. The microlattice layer may be stacked, the stacked microlattice layers may
(Continued)

further comprise one or more material layers and/or one or more impact mitigation layers.

13 Claims, 27 Drawing Sheets

Related U.S. Application Data

(60) Provisional application No. 62/960,827, filed on Jan. 14, 2020, provisional application No. 62/898,443, filed on Sep. 10, 2019, provisional application No. 62/760,319, filed on Nov. 13, 2018.

(51) Int. Cl.
*B32B 3/06* (2006.01)
*B32B 3/14* (2006.01)
*B32B 3/16* (2006.01)
*B32B 3/26* (2006.01)
*B32B 5/02* (2006.01)
*B32B 5/18* (2006.01)
*B32B 5/22* (2006.01)
*B32B 7/022* (2019.01)

(52) U.S. Cl.
CPC .............. *B32B 3/266* (2013.01); *B32B 5/028* (2013.01); *B32B 5/18* (2013.01); *B32B 5/22* (2013.01); *B32B 7/022* (2019.01); *B32B 2274/00* (2013.01); *B32B 2437/04* (2013.01); *B32B 2571/00* (2013.01)

(58) Field of Classification Search
CPC ............ A41D 31/285; A42B 3/12–128; A42B 3/06–065; A42B 3/069; B32B 3/12–16
See application file for complete search history.

(56) References Cited

U.S. PATENT DOCUMENTS

| | | | |
|---|---|---|---|
| 2,525,389 A | 10/1950 | Zeller | |
| 3,186,004 A | 6/1965 | Carlini | |
| 3,551,911 A | 1/1971 | Holden | |
| 3,897,597 A | 8/1975 | Kasper | |
| 5,093,936 A | 3/1992 | Copeland et al. | |
| 5,448,780 A | 9/1995 | Gath | |
| D412,766 S | 8/1999 | Tang | |
| 6,219,850 B1 | 4/2001 | Halstead et al. | |
| D459,555 S | 6/2002 | Gatellet | |
| 6,434,755 B1 | 8/2002 | Halstead et al. | |
| D466,651 S | 12/2002 | Halstead et al. | |
| 6,871,525 B2 | 3/2005 | Withnall et al. | |
| 7,802,320 B2 | 9/2010 | Morgan | |
| 8,528,118 B2 | 9/2013 | Ide et al. | |
| 9,116,428 B1* | 8/2015 | Jacobsen | B32B 3/12 |
| 9,162,416 B1* | 10/2015 | Eckel | G02B 6/1221 |
| D752,822 S | 3/2016 | Bologna | |
| D787,748 S | 5/2017 | Bologna | |
| 9,788,591 B2 | 10/2017 | Ide et al. | |
| 10,136,692 B2 | 11/2018 | Ide et al. | |
| 10,159,296 B2 | 12/2018 | Pietrzak et al. | |
| D844,255 S | 3/2019 | Bologna | |
| 10,271,605 B2 | 4/2019 | Withnall et al. | |
| 10,362,829 B2 | 7/2019 | Lowe | |
| D856,600 S | 8/2019 | Withnall et al. | |
| 10,506,841 B2 | 12/2019 | Bologna et al. | |
| 10,561,193 B2 | 2/2020 | Withnall et al. | |
| 10,780,338 B1 | 9/2020 | Bologna et al. | |
| 10,856,600 B2 | 12/2020 | Ide et al. | |
| 10,932,514 B2 | 3/2021 | Ide et al. | |
| 10,948,898 B1 | 3/2021 | Pietrzak et al. | |
| D916,385 S | 4/2021 | Withnall et al. | |
| D927,084 S | 8/2021 | Bologna et al. | |
| 11,166,511 B2 | 11/2021 | Infusing et al. | |
| 11,167,198 B2 | 11/2021 | Bologna et al. | |
| 11,213,736 B2 | 1/2022 | Bologna et al. | |
| 11,291,263 B2 | 4/2022 | Lowe | |
| 11,311,067 B2 | 4/2022 | Bologna et al. | |
| 11,399,589 B2 | 8/2022 | Bologna et al. | |
| 11,419,383 B2 | 8/2022 | Pietrzak et al. | |
| 11,503,872 B2 | 11/2022 | Bologna et al. | |
| 11,638,457 B2 | 5/2023 | Lowe | |
| 11,712,615 B2 | 8/2023 | Bologna et al. | |
| 2006/0163319 A1 | 7/2006 | Ervin et al. | |
| 2008/0006353 A1 | 1/2008 | Elzey et al. | |
| 2008/0113143 A1* | 5/2008 | Taylor | B32B 5/245 428/47 |
| 2010/0299812 A1 | 12/2010 | Maddux et al. | |
| 2011/0091273 A1* | 4/2011 | Sayre | C08G 18/3215 404/6 |
| 2011/0229685 A1* | 9/2011 | Lin | F16F 7/12 428/117 |
| 2011/0250385 A1* | 10/2011 | Sypeck | E04C 2/3405 156/292 |
| 2011/0283873 A1 | 11/2011 | Wadley et al. | |
| 2012/0141750 A1* | 6/2012 | Taylor | F16F 1/3737 428/201 |
| 2013/0152287 A1 | 6/2013 | Cormier et al. | |
| 2013/0273347 A1* | 10/2013 | Jacobsen | B32B 5/028 428/304.4 |
| 2014/0090155 A1* | 4/2014 | Johnston | A42B 3/064 2/414 |
| 2014/0252674 A1* | 9/2014 | Hundley | B32B 9/005 428/116 |
| 2014/0325745 A1 | 11/2014 | Erb et al. | |
| 2015/0000018 A1* | 1/2015 | Brandt | A41D 13/0156 2/455 |
| 2015/0059063 A1 | 3/2015 | Ho | |
| 2015/0075697 A1* | 3/2015 | Gildersleeve | A61F 13/0253 156/60 |
| 2015/0223546 A1* | 8/2015 | Cohen | A42B 3/127 2/412 |
| 2015/0328512 A1* | 11/2015 | Davis | A63B 59/51 2/425 |
| 2016/0039168 A1* | 2/2016 | Mankame | B32B 3/12 428/221 |
| 2016/0278470 A1 | 9/2016 | Posner et al. | |
| 2016/0302496 A1* | 10/2016 | Ferrara | A41D 13/015 |
| 2016/0327113 A1* | 11/2016 | Shelley | B32B 27/20 |
| 2016/0346997 A1* | 12/2016 | Lewis | B33Y 80/00 |
| 2017/0188648 A1 | 7/2017 | Larrabee | |
| 2017/0231322 A1* | 8/2017 | Gheorghian | A43B 13/182 267/141 |
| 2017/0295880 A1 | 10/2017 | Kennedy et al. | |
| 2017/0303622 A1* | 10/2017 | Stone | A42B 3/065 |
| 2017/0360156 A1* | 12/2017 | Lussier | A43B 23/042 |
| 2018/0058531 A1* | 3/2018 | Schaedler | B32B 15/04 |
| 2018/0071979 A1* | 3/2018 | Achten | B29C 64/141 |
| 2018/0140037 A1* | 5/2018 | Frieder, Jr. | B32B 15/20 |
| 2018/0184745 A1* | 7/2018 | Stone | A42B 3/065 |
| 2018/0249778 A1 | 9/2018 | Brandt | |
| 2018/0255861 A1 | 9/2018 | Ho | |
| 2019/0014850 A1* | 1/2019 | Johnson, Jr. | A42B 3/0486 |
| 2019/0075876 A1* | 3/2019 | Burek | A42B 3/124 |
| 2019/0104792 A1* | 4/2019 | Diamond | A41D 31/245 |
| 2019/0111658 A1* | 4/2019 | Gupta | B29C 70/688 |
| 2019/0145740 A1* | 5/2019 | Czerski | B32B 5/02 2/463 |
| 2019/0231018 A1* | 8/2019 | Boutin | A42B 3/124 |
| 2019/0313732 A1* | 10/2019 | Russell | A43B 23/0235 |
| 2020/0022444 A1* | 1/2020 | Stone | A42B 3/065 |
| 2020/0070465 A1 | 3/2020 | Hundley et al. | |
| 2020/0113267 A1* | 4/2020 | Light | B33Y 40/20 |
| 2020/0130324 A1* | 4/2020 | Chuang | G02B 1/14 |
| 2020/0154803 A1* | 5/2020 | Goulet | A41D 13/0156 |
| 2020/0215415 A1* | 7/2020 | Bologna | G06T 17/00 |
| 2021/0023775 A1* | 1/2021 | Poelma | B29C 64/188 |
| 2021/0106091 A1 | 4/2021 | Glover et al. | |
| 2021/0316501 A1* | 10/2021 | Boyce | B22F 3/1115 |
| 2022/0031005 A1* | 2/2022 | Pietrzak | A42B 3/064 |

(56) References Cited

U.S. PATENT DOCUMENTS

2022/0079280 A1* 3/2022 Laperriere ......... A43B 23/0245
2023/0010873 A1* 1/2023 Storey .................... A42B 3/064

FOREIGN PATENT DOCUMENTS

| WO | 2018200353 A1 | 11/2018 | | |
| WO | WO 2019079852 | 5/2019 | | |
| WO | WO-2020115063 A1 * | 6/2020 | ............. | A42B 3/064 |
| WO | WO-2020232555 A1 * | 11/2020 | ............... | A42B 3/12 |

OTHER PUBLICATIONS

U.S. Appl. No. 62/770,453.*
Materials Data Book from Cambridge University Engineering.*
Mechanical properties of various plastics, compiled by OmNexus.*
U.S. International Search Authority, International Search Report and Written Opinion for Appl. No. PCT/US2019/061157, dated Jan. 13, 2020, pp. 1-13.
Extended European Search Report in European Appln No. 22151578.6, dated May 25, 2022, 7 pages.

* cited by examiner

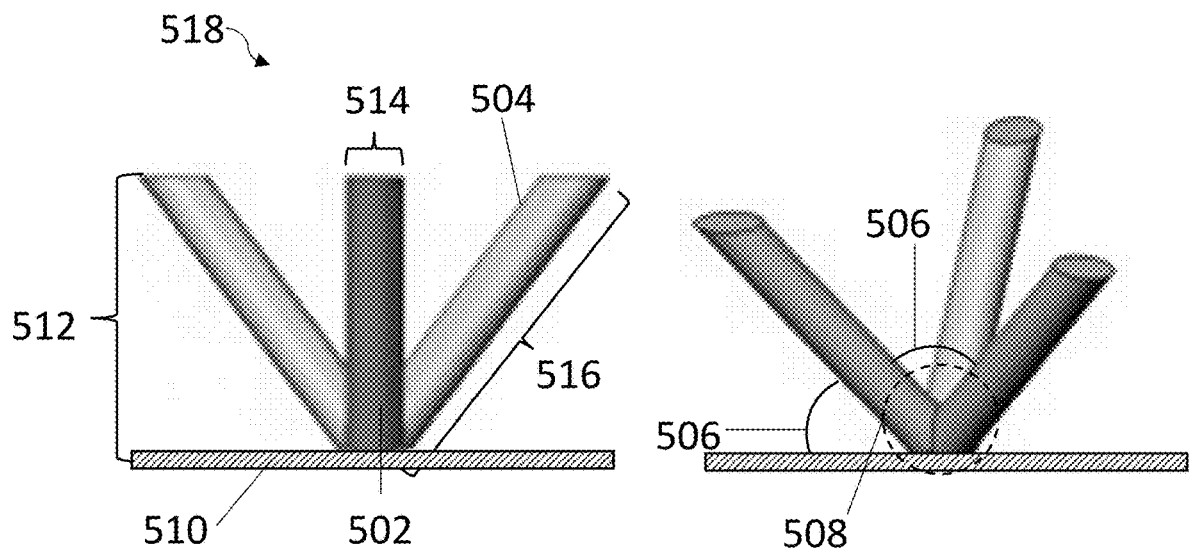
FIG. 5E
FIG. 5F
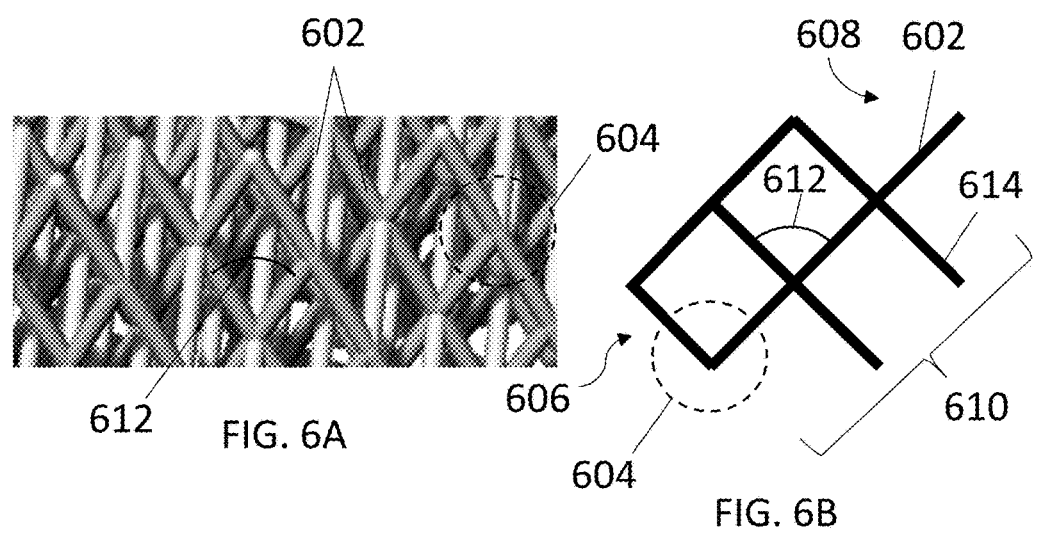
FIG. 6A
FIG. 6B

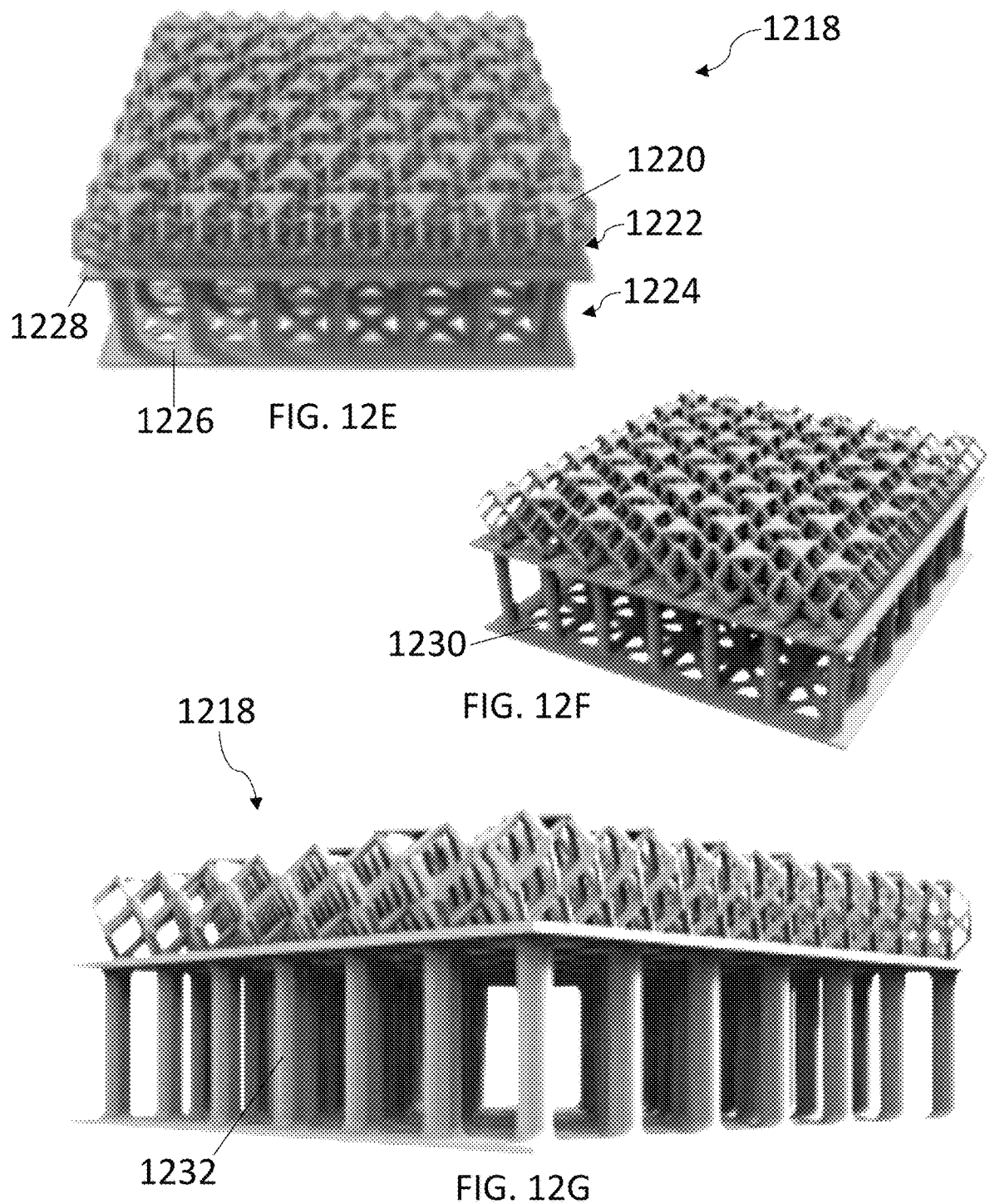

CUSTOM MANUFACTURED FIT PODS

CROSS-REFERENCE TO RELATED APPLICATIONS

This is a continuation-in-part application of Patent Cooperation Treaty Application Serial No. PCT/US2019/061157, entitled "MicroLattice Layers," filed on Nov. 13, 2019, which claims benefit of U.S. Provisional Patent Application No. 62/760,319, entitled "AirCrew Helmet System," filed Nov. 13, 2018, and U.S. Provisional Application No. 62/898,443, entitled "Microlattice Layers," filed Sep. 10, 2019, the disclosures of which are incorporated by reference herein in their entireties.

This application further claims the benefit of U.S. Provisional Patent Application No. 62/960,827 entitled "Custom Manufactured Fit Pods," filed Jan. 14, 2020, the disclosure of which is incorporated by reference herein in its entirety.

TECHNICAL FIELD

The present invention relates to methods, devices, and systems for conformal body protection. More specifically, the invention relates to methods, devices, and systems for tailored micro-lattice layers and/or structures for custom and conformal body protection and its suitability for use in different applications.

BACKGROUND OF THE INVENTION

Currently, different types of foam materials (e.g., EPS) are commonly used in sporting good implements, such as hockey sticks and baseball bats, because their strength-to-weight ratios provide a solid combination of light weight and performance. Foamed materials, however, have limitations. For example, foamed materials have homogeneous, isotropic properties, such that they generally have the same behavioral and/or mechanical characteristics in all directions. Further, not all foamed materials can be precisely controlled, and their properties are stochastic, or random, and not designed in any particular direction. And because of their porosity, foamed materials often compress or lose strength over time, as well as lack the ability to handle multifunctional and/or multi-cyclic applications.

BRIEF SUMMARY OF THE INVENTION

There exists a need to create an improved microlattice layer that provides a greater stiffness, and strength-to-weight ratio, comfort as well as providing excellent energy absorption for use in different applications. Furthermore, microlattice offers additional advantages compared to conventional lattices, resulting in improved capability of core ventilation and heat exchange, which eliminates the problem of moisture absorption and potential material properties degradation. The microlattice layer and/or structure comprises an interconnected network of a plurality of filaments (e.g., or struts) that can be tailored to specific applications by modifying the filament dimensions, filament materials, units cell shape and geometry, interior angles, filament configuration and/or any combination thereof.

The improved microlattice layer and/or structure has optimal mechanical properties for impact absorption because it allows for multiple, repeated compressions. The microlattice layer and/or structure is capable of hyper-elastic or elastic buckling, giving the microlattice layer and/or structure the resilience to recover their energy-absorbing shape and properties after impact. The microlattice layer and/or structure deforms 50% or greater from its original dimensions, which is most commonly referred to as the strain, and returns to its original configuration and/or dimensions. More specifically, the improved microlattice layer and/or structure can exceed strains (and/or deformations) of 50% or greater before it returns to its original configuration and/or dimensions.

The improved microlattice layer and/or structure may have optimal stress and/or strains when manufactured with conformal or custom surfaces that match or substantially match contours. When a structure is manufactured flat or planar, and it is bent to positioned within a helmet or a curved surfaces, the structure experiences higher stress and/or strain. The strain is the amount which a material deforms under stress or force and it is measured by the change in length divided by the original length. The stress is a measure of force applied on a structure over the area. Ultimately, for smaller strains, most structures may behave elastically and return to their original shape after the force is removed. However, the greater the strain that exceeds the elastic limit of the structure, the structure may permanently deform or eventually break. However, conformal or custom surfaces reduces or eliminates stress or strain that a structure may experience. Conformal or custom surfaces contains at least one surface matches at least one contour within a helmet or curved surface and bending is not required to be positioned within the helmet or a curved surface within a helmet or wearer's head.

The various improved microlattice structures and/or layers provided herein are depicted with respect to American football, but it should be understood that the various devices, methods and/or components may be suitable for use in protecting players in various other athletic sports, as well as other occupations that require personal protective equipment, such as law enforcement, military, construction and/or informal training session uses. For example, the embodiments of the present invention may be suitable for use by individuals engaged in athletic activities such as baseball, bowling, boxing, cricket, cycling, motorcycling, golf, hockey, lacrosse, soccer, rowing, rugby, running, skating, skateboarding, skiing, snowboarding, surfing, swimming, table tennis, tennis, or volleyball, or during training sessions related thereto.

In one embodiment, the microlattice layer may comprise at least one surface that conforms to an anatomical feature of a wearer. The microlattice layer at least one surface can generally match, match or substantially match the wearer's unique anatomical features, namely the topography and contours of the wearer's head and facial region, including the jaw region. Accordingly, the microlattice layer may comprise a first surface (or top surface) and a second surface (or a bottom surface), the first surface or second surface can generally match, match or substantially match at least one anatomical feature of a wearer and/or at least one contour of a wearer's head. Such custom surfaces provide an improved fit and comfort for the wearer, and interchangeability.

In another embodiment, the microlattice layer and/or structure comprises a plurality of filaments, the plurality of filaments having or sharing at least one interconnection or node to an adjacent plurality of filaments. The plurality of filaments having a longitudinal axis and/or the adjacent plurality of filaments having a longitudinal axis, the plurality of filaments longitudinal axis and the adjacent plurality of filaments longitudinal axis extending in different directions. The different directions may comprise lateral direction, perpendicular direction, non-perpendicular direction. The non-perpendicularity may comprise having an interior angle of 1 degree to 89 degrees. Alternatively, the non-perpendicularity may comprise an interior angle of 15 degrees to 75 degrees. The plurality of filaments and/or the adjacent plurality of filaments having a 3:1 or greater aspect ratio and having a cross-section, the cross-section is solid or hollow. The cross-section may further comprise a circle, a regular polygon or irregular polygon. The plurality of filaments and/or the adjacent plurality of filaments are spaced apart, and positioned parallel in a straight line, with repeating rows or non-repeating rows. Alternatively, the plurality of filaments and/or the adjacent plurality of filaments are positioned offset or staggered, repeating rows and/or non-repeating rows that are staggered, offset, and/or diagonal alignment from the adjacent or preceding row—the staggered, offset and/or diagonal alignment may be a 15 to 60 degree alignment. The microlattice layer and/or structure may further comprise at least one material layer. Alternatively, the microlattice layer and/or structure may further comprise a first material layer and a second material layer. The microlattice layer and/or structure may be a single structure and/or layer, and/or a plurality of layers or structures. The plurality of layers and/or structures may be stacked longitudinally, or positioned adjacent to preceding plurality of layers or structures.

In another embodiment, the microlattice layer and/or structure comprises a first plurality of filaments and a second plurality of filaments, the first plurality of filaments having or sharing at least one interconnection (or node) with the second plurality of filaments. The first plurality of filaments having a longitudinal axis and/or the second plurality of filaments having a longitudinal axis, the first plurality of filaments longitudinal axis and the second plurality of filaments longitudinal axis extending in different directions. The non-perpendicularity may comprise having an interior angle of 1 degree to 89 degrees. Alternatively, the non-perpendicularity may comprise an interior angle of 15 degrees to 75 degrees. The first plurality of filaments and/or the second plurality of filaments having a 3:1 or greater aspect ratio and having a cross-section, the cross-section is solid and/or hollow. The cross-section may further comprise a circle, a regular polygon or irregular polygon. The first plurality of filaments and/or the second plurality of filaments are spaced apart, and positioned parallel in a straight line, with repeating rows, non-repeating rows and/or random rows. Alternatively, the first plurality of filaments and/or the second plurality filaments are positioned offset or staggered, repeating rows, non-repeating rows and/or random rows that are staggered, offset, and/or diagonal alignment from the adjacent or preceding repeating row or non-repeating row—the staggered, offset and/or diagonal alignment may be a 15 to 60 degree alignment. The microlattice layer and/or structure may further comprise at least one material layer. Alternatively, the microlattice layer and/or structure may further comprise a first material layer and a second material layer. The microlattice layer and/or structure may be a single structure and/or layer, and/or a plurality of layers or structures. The plurality of layers and/or structures may be stacked longitudinally, or positioned adjacent to preceding plurality of layers or structures.

In another embodiment, the microlattice layer and/or structure comprises at least three filaments, at least one node and a plurality of interior angles. The at least three filaments having a longitudinal axis, the at least three filaments longitudinal axis extending in different directions from the at least one node. The at least three filaments connecting, coupling and/or fusing to the adjacent at least three filaments to create a matrix or microlattice. The plurality of interior angles disposed between each of the at least three filaments. The plurality of interior angles comprises perpendicular and/or non-perpendicular angles. The non-perpendicularity may comprise having an interior angle of 1 degree to 89 degrees. Alternatively, the non-perpendicularity may comprise an interior angle of 15 degrees to 75 degrees. The at least three filaments having a 3:1 or greater aspect ratio and having a cross-section, the cross-section is solid and/or hollow. The cross-section may further comprise a circle, a regular polygon or irregular polygon. The at least three filaments are spaced apart, and positioned parallel in a straight line, with repeating rows, non-repeating rows and/or random rows. Alternatively, the at least three filaments are positioned offset or staggered, repeating rows, non-repeating rows and/or random rows that are staggered, offset, and/or diagonal alignment from the adjacent or preceding row—the staggered, offset and/or diagonal alignment may be a 15 to 60 degree alignment. The microlattice layer and/or structure may further comprise at least one material layer. Alternatively, the microlattice layer and/or structure may further comprise a first material layer and a second material layer. The microlattice layer and/or structure may be a single structure and/or layer, and/or a plurality of layers or structures. The plurality of layers and/or structures may be stacked longitudinally, or positioned adjacent to preceding plurality of layers or structures.

In another embodiment, the microlattice layer and/or structure comprising a plurality of filament units. The plurality of filament units comprises a plurality of interconnected filaments arranged into an array of geometric shapes. The plurality of interconnected filaments having at least one node disposed at the intersections between the plurality of interconnected filaments. The geometric shapes may comprise regular or irregular polygons. The geometric shapes may comprise 2D or 3D shapes. The geometric shapes may further comprise a 2D or 3D triangular, cubic, star, octet, hexagonal, diamond, tetrahedron, kegome and/or any combination thereof. The plurality of filaments having a cross-sectional shape, the cross-sectional shape may be solid or hollow. The cross-sectional shape may be circular, oval, regular polygon and/or irregular polygon. the plurality of interconnected filaments extending from the at least one node. The microlattice layer and/or impact mitigation layer further comprising interior angles, the interior angles disposed between the plurality of interconnected filaments. The interior angle(s) comprising 1 degree to 89 degrees. Alternatively, the interior angle(s) angles comprising 15 degrees to 75 degrees. The plurality of interconnected filaments having a 3:1 or greater aspect ratio and having a cross-section, the cross-section is solid and/or hollow. The cross-section may further comprise a circle, a regular polygon or irregular polygon. The plurality of geometric filament units are spaced apart, and positioned parallel in a straight line, with repeating rows, non-repeating rows and/or random rows.

In another embodiment, the microlattice layer and/or structure comprises a plurality of nodes, a plurality of filaments and a plurality of interior angles. The plurality of filaments extends from each of the plurality of nodes. The plurality of interior angles disposed between the plurality of filaments. The plurality of interior angles comprises perpendicular or non-perpendicular angles. The plurality of interior angles comprises a range of 1 to 89 degrees. Alternatively, the interior angle(s) angles comprising 15 degrees to 75 degrees. The plurality of filaments having a 3:1 or greater aspect ratio and having a cross-section, the cross-section comprising a solid and/or hollow cross-section. The solid or hollow cross-section may further comprise a circle, a regular polygon or irregular polygon. The plurality of filaments and/or each of the plurality of filaments extending in the same direction and/or different directions from each of the plurality of nodes. Alternatively, the plurality of filaments and/or each of the plurality of filaments extending in the same plane and/or different planes.

In another embodiment, the microlattice layer and/or structure comprises a plurality of filaments, an additional plurality of filaments and a plurality of interior angles. The plurality of filaments or each of the plurality of filaments comprising a first end node and/or a second end node. The plurality of filaments or each of the plurality of filaments further comprising at least one mid node, the at least one mid node disposed anywhere along the length of the plurality of filaments or each of the plurality of filaments between the first and second end node. The additional plurality of filaments and/or each of the additional plurality of filaments extends from the first or second end node of the plurality of filaments or each of the first or second end node of the plurality of filaments. Accordingly, the additional plurality of filaments and/or each of the additional plurality of filaments extends from the first end and second end of the plurality of filaments or each of the first end and second end of the plurality of filaments. Furthermore, the additional plurality of filaments and/or each of the additional plurality of filaments extends from the first end node, second end node, and the at least one mid node of the plurality of filaments or each of the first end of the plurality of filaments. Alternatively, the additional plurality of filaments and/or each of the additional plurality of filaments extends from the first end node or second end node, and the at least one mid node of the plurality of filaments or each of the first end of the plurality of filaments. The plurality of interior angles disposed between the plurality of filaments and the additional plurality of filaments. The plurality of interior angles comprises perpendicular or non-perpendicular angles. The plurality of interior angles comprises a range of 1 to 89 degrees. Alternatively, the interior angle(s) angles comprising 15 degrees to 75 degrees. The plurality of filaments having a 3:1 or greater aspect ratio and having a cross-section, the cross-section comprising a solid and/or hollow cross-section. The solid or hollow cross-section may further comprise a circle, a regular polygon or irregular polygon. The plurality of filaments and/or each of the plurality of filaments extending in the same direction and/or different directions from each of the plurality of nodes. Alternatively, the additional plurality of filaments and/or each of the additional plurality of filaments extending in the same plane and/or different planes as the plurality of filaments or each of the plurality of filaments.

In another embodiment, the microlattice layer and/or structure comprises a plurality of filaments, a plurality of nodes and a plurality of interior angles. The plurality of filaments intersects creating the plurality of nodes at the intersection. The plurality of nodes comprising a first end node and/or a second end node. The first and second end node disposed on the top or bottom portion of the plurality of filaments. The plurality of nodes further comprising at least one mid node, the at least one mid node disposed anywhere along the length of the plurality of filaments or each of the plurality of filaments between the first and second end node. The plurality of nodes comprising 1 to 10 nodes. The plurality of filaments and/or each of the plurality of filaments extends from the plurality of nodes. In another embodiment, the plurality of filaments extends from the first end or second end node. In another embodiment, the plurality of filaments and/or each of the plurality of filaments extends non-perpendicular from the first end node, second end node, and the at least one mid node. Alternatively, the plurality of filaments and/or each of the plurality of filaments extends from the first end node or second end node, and the at least one mid node. The plurality of interior angles disposed between the plurality of filaments. The plurality of interior angles comprises perpendicular or non-perpendicular angles. The plurality of interior angles comprises a range of 1 to 89 degrees. Alternatively, the interior angle(s) angles comprising 15 degrees to 75 degrees. The plurality of filaments having a 3:1 or greater aspect ratio and having a cross-section, the cross-section comprising a solid and/or hollow cross-section. The solid or hollow cross-section may further comprise a circle, a regular polygon or irregular polygon. The plurality of filaments and/or each of the plurality of filaments extending in the same direction and/or different directions from each of the plurality of nodes.

In another embodiment, the microlattice layer may comprise a plurality microlattice layers and/or structures that are stacked. The stacking may comprise a plurality of microlattice layers disposed or arranged on top of each other longitudinally. The plurality of microlattice layers and/or each of the plurality of microlattice layers having the same microlattice density, microlattice compressive strain, microlattice compressive strength, filament dimensions, filament units, interior angles, and/or the any combination thereof. Alternatively, the plurality of microlattice layers and/or each of the plurality of microlattice layers having the different microlattice densities, microlattice compressive strain, microlattice compressive strength, filament dimensions, filament units, interior angles, and/or the any combination thereof. The plurality of microlattice layers and/or each of the plurality of microlattice layers may be aligned or non-aligned (e.g. offset) with one or more nodes, and/or one or more filaments.

In another embodiment, the microlattice layer and/or structure may further comprise at least one material layer. The at least one material layer may comprise a single, continuous structure and/or layer. The least one material layer extends laterally across at least a portion of the plurality of filaments, at least a portion of the additional plurality of filaments, at least a portion of the plurality of interconnected filaments and/or the plurality of nodes. The plurality of filaments, the plurality of additional filaments, and/or the plurality of interconnected filaments having at least one end that is coupled, contacts, mates, abuts to the at least one material layer, and/or the second material layer. The plurality of nodes having at least a portion that is coupled, contacts, mates, abuts to the at least one material layer. The at least one material layer may comprise a material that is the same or different than the plurality of filaments, the plurality of additional filaments, and/or the plurality of interconnected filaments. Alternatively, the at least one material layer may comprise a plurality of segments. The plurality of segments extends laterally across at least a portion of the plurality of filaments, the plurality of additional filaments, the plurality of interconnected filaments and/or the plurality of nodes. The plurality of segments is spaced apart and positioned in a repeating rows, non-repeating rows, and/or random rows. Each of the repeating rows may be parallel to the preceding or adjacent repeating row or non-repeating row. The at least one material layer maybe disposed on top and/or bottom surface of the microlattice layer.

In another embodiment, the microlattice layer and/or structure may further comprise a first material layer and a second material layer. The first and second material layer may be disposed on top surface and/or a bottom surface of a microlattice layer and/or structure. The first and/or second material layer extends laterally across at least a portion of the microlattice layer. At least a portion of the plurality of filaments, at least a portion of the additional plurality of filaments, at least a portion of the plurality of interconnected filaments and/or at least a portion of the plurality of nodes couples, contacts, mates, abuts to the at least a portion of first material layer, and/or the second material layer. At least a portion of the plurality of filaments, at least a portion of the additional plurality of filaments, at least a portion of the plurality of interconnected filaments extends substantially perpendicular or perpendicular from at least a portion of the first material layer and/or the second material layer. Alternatively, the at least a portion of the plurality of filaments, at least a portion of the additional plurality of filaments, at least a portion of the plurality of interconnected filaments extends substantially non-perpendicular or non-perpendicular from at least a portion of the first material layer and/or the second material layer. The non-perpendicularity may comprise 1 degree to 89 degrees. The first and second material layer may comprise a material that is the same or different than the plurality of filaments, the additional plurality of filaments, the plurality of interconnected filaments. The first and/or second material layer may comprise a single, continuous layer. Alternatively, the first and/or second material layer may comprise a plurality of segments. The single, continuous layer and/or the plurality of segments extends laterally across at least a portion of the plurality of filaments, at least a portion of the plurality of interconnected filaments, at least a portion of the additional plurality of filaments and/or the plurality of nodes. The single, continuous layer and/or the plurality of segments comprises a shape, the shape being a circle, oval, regular polygon or irregular polygon. The regular or irregular polygons comprises a triangle, square, pentagon, hexagon, septagon, octagon, nonagon, decagon and/or any combination thereof. The plurality of segments are spaced apart, and positioned in a repeating rows, non-repeating rows and/or random, each of the repeating rows or non-repeating rows may be parallel to the preceding or adjacent repeating and/or non-repeating row. The first material layer may comprise the same material as the second material layer. Alternatively, the first material layer may comprise a different material than the second material layer.

In another embodiment, the microlattice layer and/or structure may further comprise an intermediate material layer. The intermediate layer may be disposed between the plurality of microlattice layers. The intermediate material layer may comprise a single, continuous structure and/or layer. The intermediate material layer extends laterally across at least a portion of the plurality of filaments, at least a portion of the additional plurality of filaments, at least a portion of the plurality of interconnected filaments and/or the plurality of nodes. The plurality of filaments having at least one end that is coupled, contacts, mates, abuts to the intermediate material layer. The plurality of nodes having at least a portion that is coupled, contacts, mates, abuts to the at least one material layer. The intermediate material layer may comprise a material that is the same or different than the plurality of filaments, the first material layer, and/or second material layer. Alternatively, the intermediate material layer may comprise a plurality of segments. The plurality of segments extends laterally across at least a portion of the plurality of filaments and/or the plurality of nodes. The plurality of segments is spaced apart and positioned in a repeating row, a non-repeating row, and/or random. Each of the repeating rows or non-repeating rows may be parallel to the preceding or adjacent repeating row. The at least one material layer maybe disposed on at least one surface, a top and/or a bottom surface of the microlattice layer and/or structure.

In one embodiment, an improved microlattice can be incorporated into a protective helmet. The protective helmet comprising an outer shell and an impact mitigation layer. The impact mitigation layer adjacent to an inner surface of the outer shell and/or is coupled to an inner surface of the outer shell. The impact mitigation layer comprises an impact mitigation layer, the plurality of impact mitigation layer comprises at least one microlattice structure and/or layer. The protective helmet may further comprise an inner shell. The impact mitigation layer disposed between the outer shell and inner shell. The microlattice structure and/or layer extends from the inner surface of the outer shell to an outer surface of the inner shell. Alternatively, at least a portion of the microlattice structure and/or layer does not fully extend from the inner surface of the outer shell to an outer surface of the inner shell.

BRIEF DESCRIPTION OF THE SEVERAL VIEWS OF THE DRAWINGS

FIGS. 5A-5F depicts various views of an alternate embodiment of microlattice layer and/or structure;

FIGS. 6A-6B depicts magnified views of one embodiment of a microlattice layer having a plurality of interconnected filaments;

FIGS. 12A-12G depicts various embodiments of stacked microlattice layers;

DETAILED DESCRIPTION OF THE INVENTION

Figure 1A:
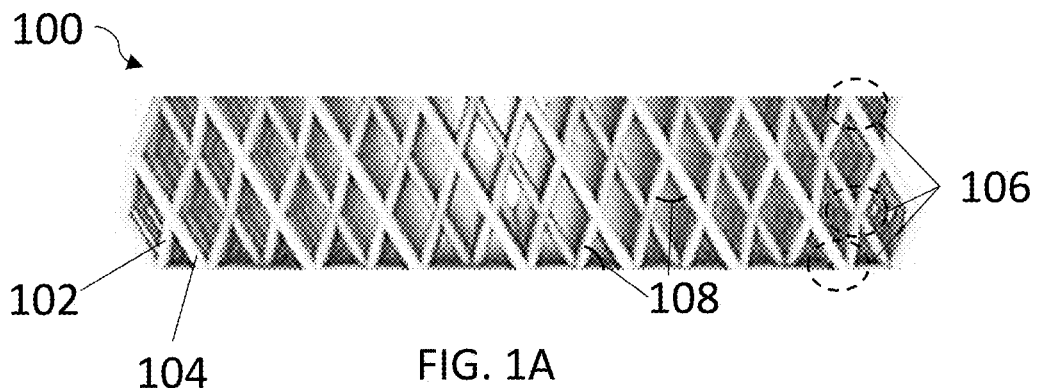
FIGS. 1A-1E depicts a front view of one embodiment of microlattice layer and/or structure.
Figure 1B:
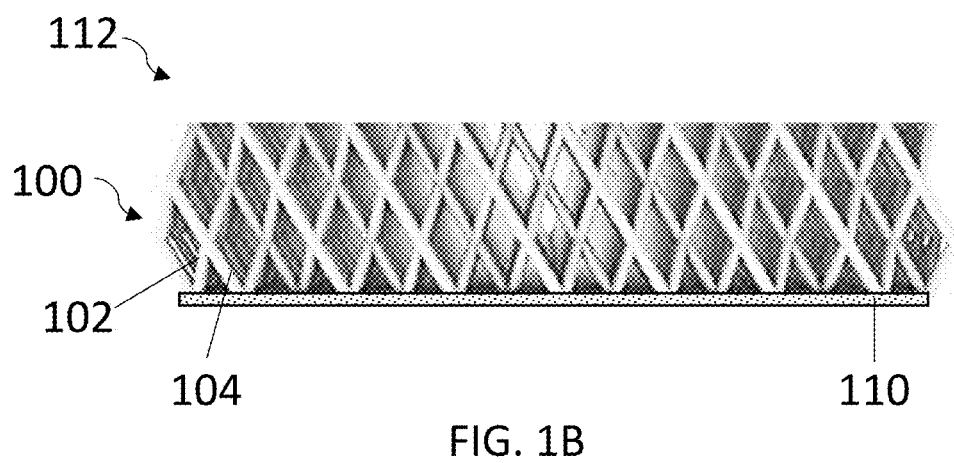
Figure 1C:
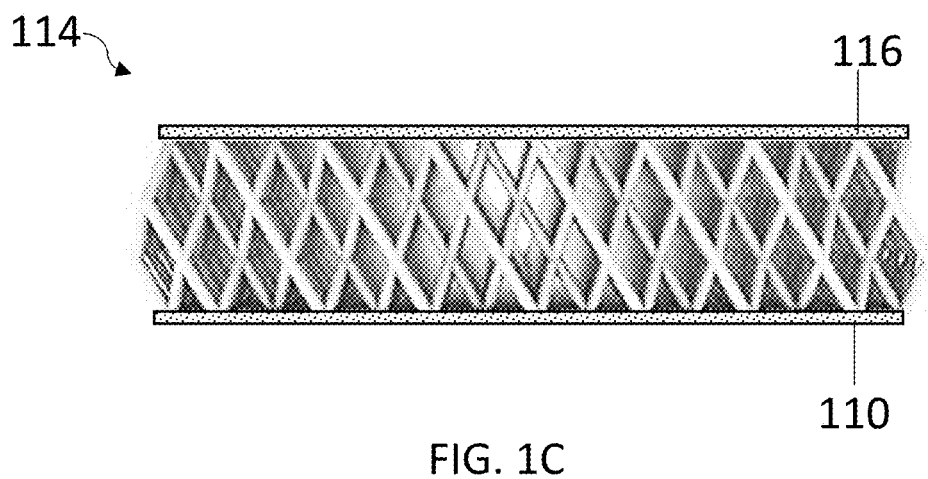

The present disclosure is directed to various embodiments of a 3D microlattice layer and/or structure having a plurality of interconnected filaments and/or and one or more material layers. The 3D microlattice layer provides many advantages because they can endure sequential impacts without complete failure, but also absorb energy equal to or improved to conventional impact absorbing materials. The microlattice structures of the present disclosure may be incorporated into any desired protective garment necessary for impact protection, vibration protection, comfort and/or acoustic damping.

The various improved microlattice structures provided herein are depicted with respect to American football, but it should be understood that the various devices, methods and/or components may be suitable for use in protecting players in various other athletic sports, and other occupations that require personal protective equipment, such as auto, aerospace, law enforcement, military, construction and/or informal training session uses. For example, the embodiments of the present invention may be suitable for use by individuals engaged in athletic activities such as baseball, bowling, boxing, cricket, cycling, motorcycling, golf, hockey, lacrosse, soccer, rowing, rugby, running, skating, skateboarding, skiing, snowboarding, surfing, swimming, table tennis, tennis, or volleyball, or during training sessions related thereto.

In one embodiment, the 3D microlattice layers may comprise one or more material layer(s) to improve the mechanical properties of the microlattice layer or structure. The one or more material layers may be configured to increase the compressive strength and stiffness of the microlattice structure. In one or more embodiments, the material layer transversely and rotationally constrains a plurality of nodes of the microlattice structure and thereby increases the overall compressive strength and stiffness of the microlattice structure. The one or more material layers may be fixed or removably coupled to the 3D microlattice layer.

In another embodiment, the microlattice layer and/or structures can receive multiple impacts and recover to its original shape after impact. During the impact load, at least a portion of the microlattice layer and/or structure may experience a large deflection with global and/or local elastic buckling of the plurality of filaments and/or the one or more nodes where the plurality of filaments intersect. Once the impact load is removed, the microlattice layer recovers to its original shape and height after experiencing compressive strains in excess of 50% without plastic deformation. The buckling being a sudden lateral deflection away from the plurality interconnected filaments' longitudinal axis. The buckling of the microlattice layer may comprise buckling in a single direction or in multiple directions. The buckling may be asymmetrical or symmetrical throughout the microlattice layer.

In another embodiment, the microlattice layer and/or structure can be optimized for uniform energy absorption. The filament dimensions, filament material, the filament units, interior angles, the connecting members, and the material layers can be tuned to design the appropriate buckling strength and buckling location, compression strength and shear strength depending on the application and loading conditions. For example, the compression and shear properties (modulus and strength) are highly dependent on the filament interior angles. Therefore, for the same material and density, the filament interior angle can be changed to either increase or decrease the buckling strength.

In another embodiment, the microlattice layer and/or structure can be optimized for specific impact absorption that requires non-uniform impact absorption in different regions. Different sports and occupations include differences in the type, severity and/or frequency of impacts that a wearer could experience. The microlattice layer and/or structure may comprise one or more segments and/or one or more regions that have specific impact absorption properties. For example, a single microlattice layer may comprise non-uniform mechanical properties and/or impact absorption properties. The non-uniform mechanical characteristics comprises two or more regions having different impact absorption properties. The impact absorption properties may be modified in each region by changing the filament dimensions, filament material, filament units, interior angles, compressive strength, compressive strain, and/or density of the microlattice. Alternatively, the microlattice layer may comprise a plurality of microlattice segments, the plurality of microlattice segments having different impact absorption and/or mechanical properties to the adjacent plurality of microlattice structures. Alternatively, at least one of the microlattice segments from the plurality of microlattice segments have different impact absorption and/or mechanical properties. The microlattice layer may comprise a uniform density or a non-uniform density. The microlattice layer may comprise a uniform compressive strain or a non-uniform compressive strain. The microlattice layer may comprise the same filament geometric units throughout the microlattice layer and/or different filament geometric units throughout the microlattice layer.

3D Microlattice Geometric Design

A 3D microlattice layer and/or structure may be designed by using a variety methods or techniques. Such methods include the optimization of the network or array of interconnecting filaments, the network or array of filament units and/or the network or array of filament geometric cells. FIG. 6A depicts a magnified view one embodiment of a microlattice layer and/or structure defined by the array of interconnecting filaments. The microlattice layer and/or structure comprises an array of a plurality of interconnected filaments 602 and a plurality of nodes 604, the plurality of nodes 604 being the intersections between the plurality of interconnected filaments. Each of the plurality of interconnected filaments comprising a top portion 608 and a bottom portion 606, the plurality of nodes disposed on the top portion 608 and/or the bottom portion 606 of the plurality of interconnected filaments 602. Each of the plurality of interconnected filaments 602 further comprising a mid-portion 610, the plurality of nodes 604 disposed on the center portion or mid portion 610. The plurality of nodes 604 may comprise 1 to 10 nodes disposed on the plurality of interconnecting filaments 602 and/or each of the plurality of interconnecting filaments 602. The plurality of interconnected filaments 602 may extend in different orientations and/or directions. The array of the plurality of interconnected filaments 602 may be spaced apart and arranged in parallel or offset to create repeating rows or non-repeating rows, or randomly arranged, the repeating rows or non-repeating rows are colinear or non-colinear to the preceding and/or adjacent row. The plurality of interconnected filaments 602 may be oriented at an angle 612 that is perpendicular to a surface or the plurality of nodes 604. The plurality of interconnected filaments 602 may be oriented at an angle 612 that is non-perpendicular to a surface or the plurality of nodes 604. The angle 612 that is perpendicular to a surface or the plurality of nodes 604 is 90 degrees. The angle 612 that is non-perpendicular to a surface or a plurality of nodes 604 being less than or greater than 90 degrees. In one embodiment, angle 612 is 1 degree to 89 degrees. In another embodiment, the angle 612 is 15 degrees to 75 degrees. In another embodiment, the angle 612 is 30 degrees to 60 degrees. The filament dimensions (e.g. filament width or diameter and filament length) and/or filament interior angles can be modified to provide optimal mechanical properties.

FIG. 6B depicts a magnified an alternate embodiment of a microlattice layer and/or structure defined by the array of interconnecting filaments. The microlattice layer and/or structure comprises a first plurality of filaments 602 and a second plurality of filaments 614, the first plurality of filaments 602 having a first orientation, the second plurality of filaments 614 having a second orientation, first plurality of filament orientation is different than the second plurality of filaments orientation. The first plurality of filaments 602 and the second plurality of filaments 614 intersect in one or more locations along a longitudinal axis of the first plurality of filaments 602 and/or second plurality of filaments 614 creating one or more nodes 604. The one or more nodes disposed at a top portion 608, a bottom portion 606 and/or a center portion 610 of the first plurality of filaments 602 and/or the second plurality of filaments 614. The one or more nodes 604 may comprise 1 to 10 nodes. The first plurality of filaments orientation comprising a first angle relative to a surface or the one or more nodes 604 and a second plurality of filaments orientation comprising a second angle relative to a surface or the one or more nodes 604. The first angle and the second angle are different. The first angle and the second angle is the same. The first and/or second angle comprises a perpendicular angle to a surface or node and/or non-perpendicular angle to a surface or a node. The first and/or second angle that is perpendicular to a surface or node being 90 degrees. The first and/or second angle that is non-perpendicular to a surface or node being less than or greater than 90 degrees. In one embodiment, first and/or second angle is 1 degree to 89 degrees. In another embodiment, the first and/or second angle is 15 degrees to 75 degrees. In another embodiment, the first and/or second angle is 30 degrees to 60 degrees. The filament dimensions (e.g. filament width or diameter and filament length) and/or filament interior angles can be modified to provide optimal mechanical properties.

In another embodiment, the microlattice layer and/or structure comprises at least three filaments, at least one node and a plurality of interior angles. The at least three filaments having a longitudinal axis, the at least three filaments longitudinal axis extending in different directions from the at least one node. The at least three filaments coupling and/or fusing to the adjacent at least three filaments to create a matrix. The plurality of interior angles disposed between each of the at least three filaments. The plurality of interior angles comprises perpendicular and/or non-perpendicular angles. The non-perpendicularity may comprise having an interior angle of 1 degree to 89 degrees. Alternatively, the non-perpendicularity may comprise an interior angle of 15 degrees to 75 degrees. The at least three filaments having a 3:1 or greater aspect ratio and having a cross-section, the cross-section is solid and/or hollow. The cross-section may further comprise a circle, a regular polygon or irregular polygon. The at least three filaments are spaced apart, and positioned parallel in a straight line, with repeating rows, non-repeating rows and/or random rows. Alternatively, the at least three filaments are positioned offset or staggered, repeating rows, non-repeating rows and/or random rows that are staggered, offset, and/or diagonal alignment from the adjacent or preceding row—the staggered, offset and/or diagonal alignment may be a 15 to 60 degree alignment. The microlattice layer and/or structure may further comprise at least one material layer. Alternatively, the microlattice layer and/or structure may further comprise a first material layer and a second material layer. The microlattice layer and/or structure may be a single structure and/or layer, and/or a plurality of layers or structures. The plurality of layers and/or structures may be stacked longitudinally, or positioned adjacent to preceding plurality of layers or structures.

FIGS. 7A-7E depicts alternate embodiments the microlattice layer and/or structure defined by the plurality of filament units. The plurality of filament units is the smallest repeatable 3D geometric unit that can be identified within the microlattice layer. The geometric unit structures comprise a body centered cubic or pyramidal square 702, a body centered cubic or pyramidal square with central filament 704, a pyramidal triangle 700, a tetrahedral, a face centered cubic with z-direction reinforcement 706, a face and body cantered cubic with z-direction reinforcement 708, a 3D kagome, a diamond textile, a diamond colinear, a square. The plurality of filaments 710 are arranged in different configurations to create 3D geometric structure or geometric units or filament units 700, 702, 704, 706, 708. In one embodiment, the microlattice layer comprises a plurality of filament units 700, 702, 704, 706, 708 coupled to the adjacent plurality of filament units 700, 702, 704, 706, 708 to create an array. The plurality of filament units 700, 702, 704, 706, 708 comprises a plurality of filaments 710, one or more nodes 712, and a plurality of interior angles 714. The plurality of filaments 710 extend from each of the one or more nodes 712 and the plurality of interior angles 714 disposed between the plurality of filaments 710. The one or more nodes 712 comprises 1 to 10 one or more nodes. The plurality of interior angles 714 comprise 1 to 89 degrees. Each of the plurality of filaments interior angles 714 may be the same and/or they may be different. The filament unit size, filament dimensions (e.g. filament width or diameter and filament length) and/or filament interior angles can be modified to provide optimal mechanical properties. Furthermore, the filament unit density and filament unit orientation (not shown) may also be varied to achieve the specific performance attributes. The filament unit orientation may be perpendicular to a surface and/or non-perpendicular to a surface.

Figure 8A:
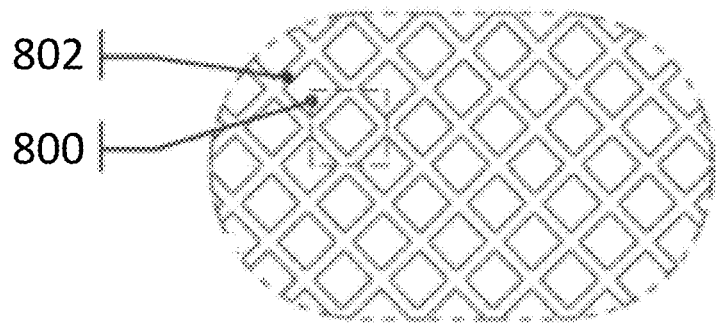
FIGS. 8A-8J depicts various embodiments of filament cells.
Figure 8B:
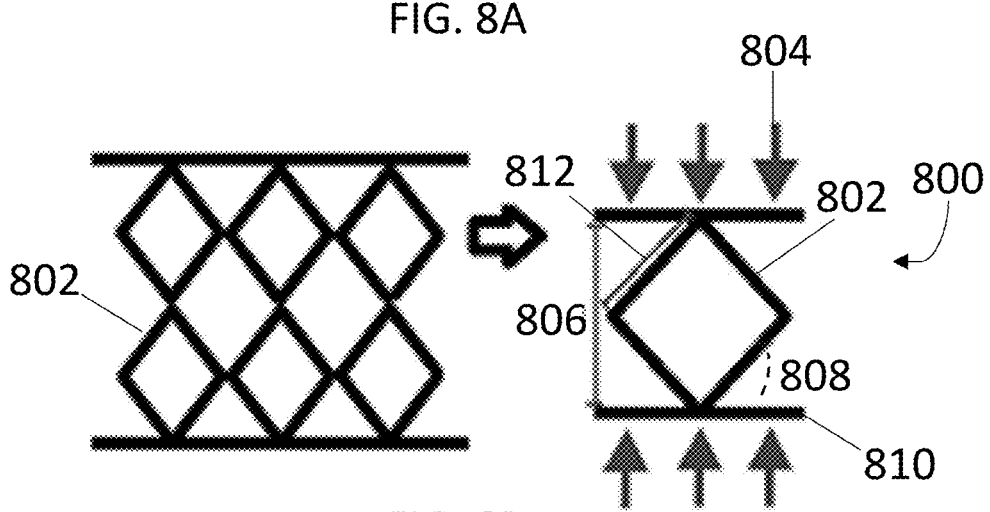
Figure 8C:
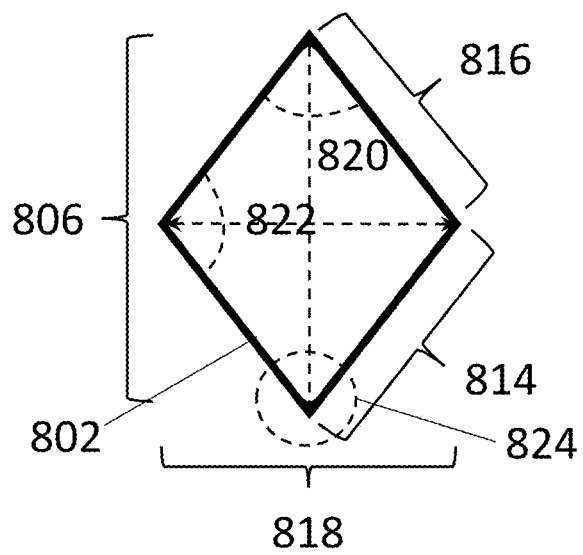
Figure 8D:
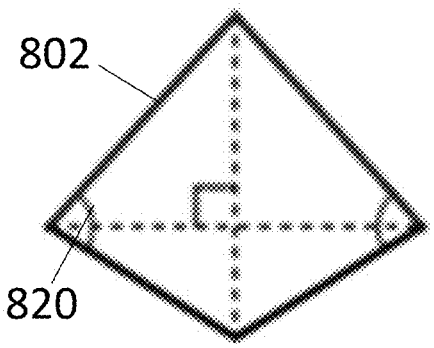
Figure 8E:
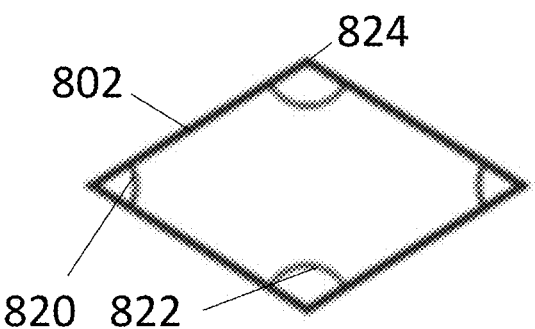
Figure 8F:
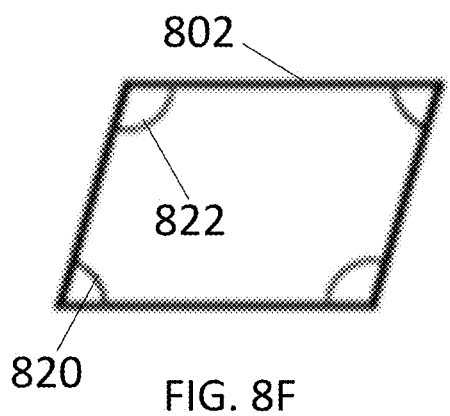
Figure 8G:
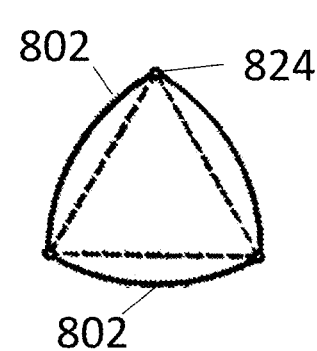

In one embodiment, each of the plurality filament units 700, 702, 704, 706, 708 comprises a three or more filaments 710, one or more nodes 712, and a plurality of interior angles 714. The three or more filaments 710 extend from each of the one or more nodes 712 and the plurality of interior angles 714 disposed between each of the three or more filaments 710. At least three nodes of the one or more nodes 712 is coupled to each of the plurality of material segments. The plurality of interior angles 714 comprise 1 to 89 degrees. The plurality of interior angles 714 comprise 15 to 75 degrees. The plurality of interior angles 714 comprise 45 to 85 degrees. Each of the plurality of filaments interior angles 714 may be the same and/or they may be different. The filament unit size, filament dimensions (e.g. filament width or diameter and filament length) and/or filament interior angles can be modified to provide optimal mechanical properties. Furthermore, the filament unit density and filament unit orientation (not shown) may also be varied to achieve the specific performance attributes. The filament unit orientation may be perpendicular to a surface and/or non-perpendicular to a surface FIGS. 8A-8C depicts alternate embodiments of the microlattice layer and/or structure defined by a plurality of filament cells 800. The plurality of filament cells 800 is also a repeatable 2D geometric structure that can be identified within the microlattice layer. The geometric cell structures 800 comprise a circle, an oval, a triangle, a square, a pentagon, a hexagon, and/or any regular polygon or irregular polygon. Such plurality of filament cells may be analyzed via standard truss analysis to determine the forces in each filament and node resulting in optimization of the microlattice layer. As a result, factors such as filament cell height (H) 806, filament cell width (W) 818, filament lengths (L1 and L2) 814, 816, filament width/diameter (not shown), connecting member(s) 826, and/or the plurality of interior angles (θ1, θ2 and θ3) 808, 820, 822 may be varied to enhance or optimize the microlattice layer. The 3D microlattice layer comprising a plurality of filament cells 800 may further comprise at least one material layer 810. A 3D microlattice layer can be created by having a plurality of filament cells 800 being coupled to the adjacent plurality of filament cells in repeating or non-repeating rows. The plurality of interior angles 808, 820, 822 comprise 1 to 89 degrees. The plurality of interior angles 808, 820, 822 may be disposed between the plurality of filaments 802, adjacent to a node 824, and/or between the plurality of filaments 802 and a surface 810. Each of the plurality of interior angles 808, 820, 822 may comprise the same angles or it comprises different angles. The filament angles 820, 822 may be the same angle as the surface-to-filament angle 808 or it may be a different angle.

Figure 8H:
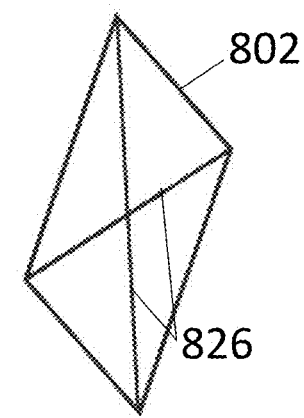
Figure 8I:
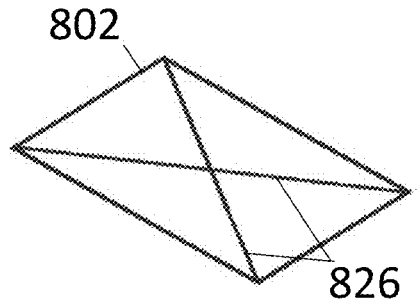
Figure 8J:
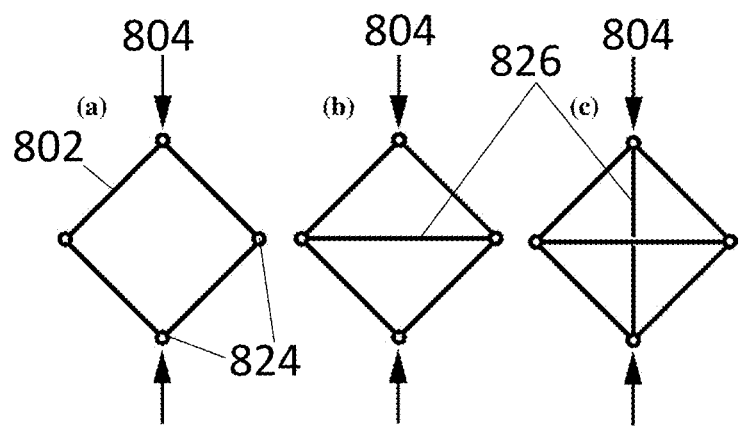

Furthermore, FIGS. 8D-8G illustrate filament cell structures with non-equiaxed geometry by modifying the factors disclosed herein, including filament cell height (H) 806, filament cell width (W) 818, filament lengths (L1 and L2) 814, 816, filament width/diameter (not shown), connecting member(s) 826, and/or the plurality of interior angles (θ1, θ2 and θ3) 808, 820, 822 may be varied to enhance or optimize the microlattice layer. Also, FIGS. 8H-8J illustrate alternate embodiments of filament cell structures with non-equiaxed geometry and equiaxed geometry that comprises connecting members 826. The connecting members extend laterally and/or longitudinally within the plurality of filament cells.

Filament Optimization

Figure 9A:
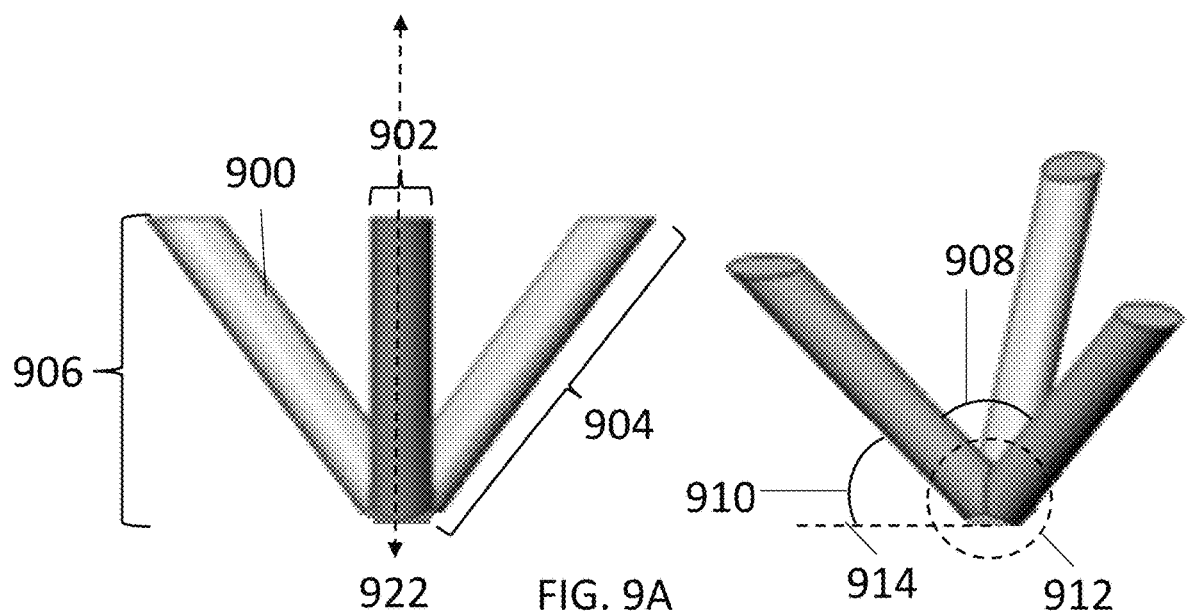
FIGS. 9A-9B depicts different views of the plurality of filaments.

Besides the possibility of adjusting the mechanical properties through the microlattice geometry, it's also possible to adjust the filaments' material properties, dimensions and interior angles to optimize the mechanical properties as shown in FIG. 9A. "Filaments" 900 may be used interchangeably to mean a plurality of filaments, an additional plurality of filaments, the adjacent filaments, and/or the plurality of interconnected filaments. In one embodiment, the filament unit height (H) 906, filament unit cell height (H), filaments dimensions within the microlattice layer and/or structure may be varied. The filament unit height (H) 906, filament unit cell height (H), filaments dimensions within the microlattice layer and/or structure may be the same throughout the microlattice layer for uniformity. Alternatively, the filament unit height (H), filament unit cell height (H), filaments dimensions within the microlattice layer and/or structure may be different in at least a portion of the microlattice layer and/or structure.

Figure 9B:
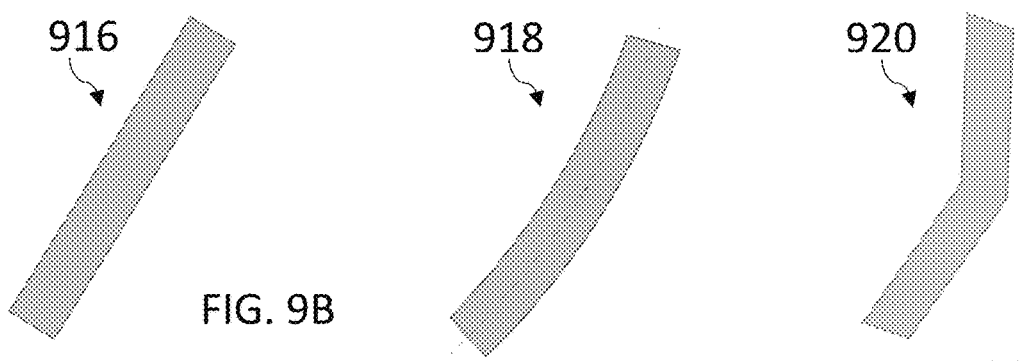

The filaments 900 having a longitudinal axis 922, a width and/or diameter (W/D) 902 and a length (L) 904. The width and/or diameter 902 of the filaments comprises a range between 0.1 mm to 5 mm. The filaments length may be 0.3 mm to 15 mm, and/or 15 mm or greater. The filaments 900 may further comprise an aspect ratio, the aspect ratio may be 3:1 or greater. The length of the filaments may be uniform and/or non-uniform along its longitudinal axis 922. The filaments 900 comprising the same width and/or length. At least two of the filaments 900 having the same width and/or length. At least two the plurality of filaments 900 having different width and/or length. Furthermore, FIG. 9B illustrate filaments 900 having a shape, the shape comprises a straight filament 916, pre-bent filament 918 and/or kinked filament 920. The filaments straight shape is straight along the entire longitudinal length. The pre-bent filament 918 may comprise a curved or radiused portion, the curved or radiused portion may be disposed in any position along the length of the longitudinal axis 922. In one embodiment, the curved or radiused portion is disposed in the center of the longitudinal axis. Alternatively, the plurality of filaments, the additional plurality of filaments and/or the plurality of interconnected filaments 900 may comprise a pre-bent shape 918, and/or arched shape, where the pre-bent shape or arched shape is bent along the longitudinal length and/or substantially along the longitudinal length. Accordingly, the kinked plurality of filaments, the additional plurality of filaments and/or the plurality of interconnected filaments 920 may have one or more kinks along the filaments' longitudinal axis.

In another embodiment, the filaments 900 comprise a cross-section within the microlattice layer and/or structure and the cross-section may be varied. The filaments 900 may comprise a cross-section, the cross-section being solid or hollow. The solid or hollow cross-section may be uniform or substantially uniform along the longitudinal axis 922. Alternatively, the solid or hollow cross-section may be non-uniform or substantially non-uniform along the longitudinal axis 922. The cross-section comprises a circle, an oval, a regular polygon and/or an irregular polygon. The polygons comprise a triangle, a square, a rectangle, a pentagon, a hexagon, a septagon, an octagon, a nonagon, a decagon, and/or any combination thereof. The filaments 900 having a uniform and/or a non-uniform cross-section along the longitudinal axis. The non-uniform cross-section comprises a frustum or tapered cross-section, and/or undulated cross-section. The cross-section may further comprise a cross-sectional area, the cross-sectional area is 0.01 mm$^2$ or greater, 1 mm$^2$ or greater, 10 mm$^2$ or greater, 20 mm$^2$ or greater. Accordingly, the cross-sectional area is between 0.01 to 1 mm$^2$, or between 1 to 10 mm$^2$, or between 10 to 20 mm$^2$ or between 0.01 to 20 mm$^2$.

In another embodiment, the filaments 900 comprises a material within the microlattice layer and the material may be varied. The filaments 900 may comprise a material, the material including thermoplastic elastomers, thermoset elastomers, thermosets, and/or thermoplastics. The filaments 900 may comprise a material, the material being a foam. The foam can include polymeric foams, quantum foam, polyethylene foam, polyurethane foam (PU foam rubber), XPS foam, polystyrene, phenolic, memory foam (traditional, open cell, or gel), impact absorbing foam, compression foam, latex rubber foam, convoluted foam ("egg create foam"), EVA foam, VN 600 foam, Evlon foam, Ariaprene or Ariaprene-like material, PORON XRD, impact hardening foam, and/or any combination thereof. The at least one foam layer may have an open-cell structure or closed-cell structure. The foam layer can be further tailored to obtain specific characteristics, such as anti-static, breathable, conductive, hydrophilic, high-tensile, high-tear, controlled elongation, and/or any combination thereof. The material may be uniform throughout the microlattice layer, and/or non-uniform throughout the microlattice layer. Furthermore, the filament material may comprise a material able to resist a strain deformation of a minimum 100%. Also, the filament material may comprise a material able to resist a strain deformation of a minimum 100% without permanent plastic deformation.

In some embodiments, the Young's modulus of the material used to fabricate the filaments 900 can be at least 1 MPa, at least 10 MPa, at least 100 MPa, at least 1000 MPa, and/or at least 10,000 MPa. In other embodiments, the Young's modulus comprises between 1 MPa and 100 MPa, between about 1 MPa and 1000 MPa, between 1 MPa and 10,000 MPa, between 10 MPa and 1000 MPa, between 10 MPa and 10,000 MPa, and/or any combination thereof. Also, the Young's modulus can be between 100 MPa to 1000 MPa and 1000 MPa to 10,000 MPa. In some instances, the ratio of the Young's modulus of the material used to fabricate the filaments 900 can be at least about 0.001:1, at least about 0.01:1, at least about 0.1:1, at least about 1:1, at least about 10:1, at least about 100:1, at least about 1000:1 and/or less than about 10,000:1, less than about 1000:1, less than about 100:1, less than about 10:1, less than about 1:1, less than about 0.1:1, or less than about 0.01:1.

In another embodiment, the filaments comprise interior angles (θ1 and θ2) 908, 910 within the microlattice layer and the interior angles 908, 910 may the same throughout the entire microlattice layer, and/or different interior angles 908, 910 throughout at least a portion of the microlattice layer. The interior angles 908, 910 are disposed between the filaments adjacent to one or more nodes 912 and/or disposed between the filaments and a surface 914. The interior angles 908,910 may comprise an angle that is perpendicular to one or more nodes 912 and/or non-perpendicular to a surface 914 or one or more nodes 912. The interior angle 908, 910 that is perpendicular to a surface 914 or one or more nodes is 90 degrees. The interior angle 908,910 that is non-perpendicular to a surface 914 or one or more nodes 912 being less than or greater than 90 degrees. In one embodiment, the interior angle 908, 910 is 1 degree to 89 degrees. In another embodiment, the interior angle 908, 910 is 15 degrees to 75 degrees. In another embodiment, the interior angle 908,910 is 30 degrees to 60 degrees. The interior angle 908,910 on the first microlattice layer and/or structure may comprise the same interior angle on the intermediate microlattice layer and/or structure and/or the second microlattice layer and/or structure. Alternatively, the interior angle 908, 910 on the first microlattice layer and/or structure may comprise a different angle than the on the intermediate and/or second microlattice layer and/or structure.

Accordingly, the number of filaments 900 extending from each node 912 may also be varied. In one embodiment, a plurality of filaments 900 may extend from each node 912. The plurality of filaments 900 extending in different directions from each node 912. A plurality of interior angles 908, 910 disposed between each of the plurality of filaments 900. The plurality of filaments 900 coupling and/or fusing to the adjacent plurality of filaments to create an array. Alternatively, a three or more filaments 900 may extend from each node 912, the three or more filaments 900 extending in different directions from each node 912. A plurality of interior angles 908, 910 disposed between each of the three or more plurality of filaments 900. At least one of the three or more plurality of filaments 900 and/or a plurality of nodes 912 coupling and/or fusing to the at least one adjacent three or more plurality of filaments to create an array. At least three nodes of the one or more nodes 912 is coupled to each of the plurality of material segments. Furthermore, four or more filaments 900 may extend from each node 912, the four or more filaments 900 extending in different directions. A plurality of interior angles 908, 910 disposed between each of the four or more plurality of filaments 900. At least one of the four or more plurality of filaments 900 coupling and/or fusing to the at least one adjacent four or more plurality of filaments to create an array. In an embodiment, five or more filaments 900 may extend from each node 912, the five or more filaments 900 extending in different directions from each node 912. A plurality of interior angles 908, 912 disposed between each of the five or more plurality of filaments 900. At least one of the five or more plurality of filaments 900 coupling and/or fusing to the at least one adjacent five or more plurality of filaments 900 to create an array.

Figure 10A:
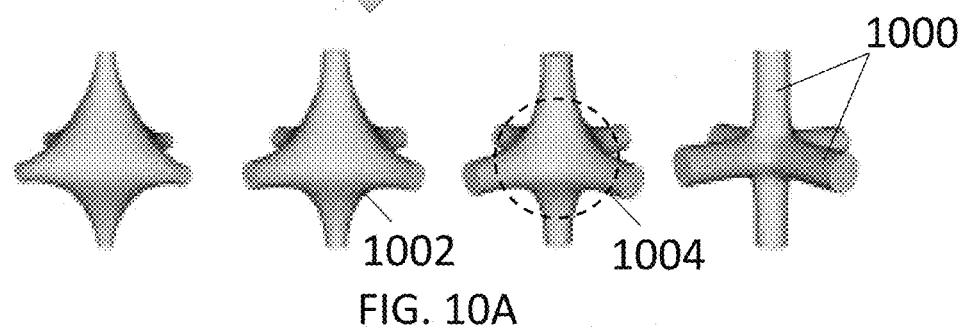
FIGS. 10A-10B depicts various isometric views of filleted filament units.
Figure 10B:
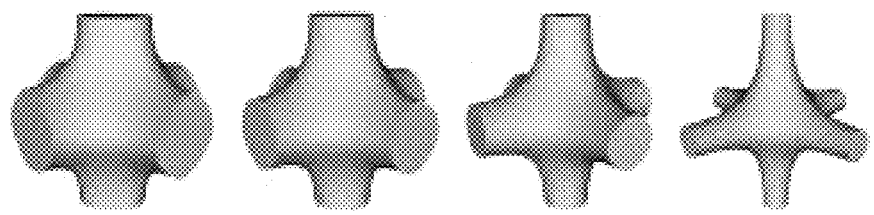

FIGS. 10A-10B depict various views of one embodiment of a filament units and/or filaments 1000 comprising fillets 1002, the fillets 1002 may be incorporated into any of the microlattice structures disclosed herein. The fillets 1002 distribute the stress over a broader surface area and effectively make the filament unit and/or filaments 1000 more durable and capable of bearing larger loads. The addition of fillets 1002 may be used in combination with the one or more material layers to enhance impact absorption. The filament unit and/or filaments 1000 comprises at least one node 1004, one or more central filaments and a plurality of filaments. The plurality of filaments 1000 extends laterally from the at least one node 1004. The plurality of filaments 1000 extends in different directions from each node 1004. The plurality of filaments 1000 having a plurality of interior angles, the plurality of interior angles positioned between the plurality of filaments 1000 and/or between the plurality of filaments and a surface. The plurality of interior angles may be 1 degree to 90 degrees. The one or more central filaments extends longitudinally from the at least one node, the one or more central filaments are positioned perpendicular to the at least one node. A second interior angle is positioned between the one or more central filaments and the plurality of filaments. Second interior angle may be 1 degree to 90 degrees. In another embodiment, the filament units may comprise one or more fillets. The fillets 1002 may be positioned between the plurality of filaments 1000. The one or more fillets 1002 may be positioned between the plurality of filaments 1000 and the one or more central filaments. The one or more fillets 1002 may comprise the same size and/or a different size between the plurality of filaments and/or the one or more central filaments 1000. The fillets 1002 may comprise the same size and shape in a plurality of filament units and/or the same size and shape throughout the microlattice layer. The fillets 1002 may comprise a different size and shape in a plurality of filament units and/or the different size and shape throughout the microlattice layer.

Material Layer Optimization

Figure 11A:
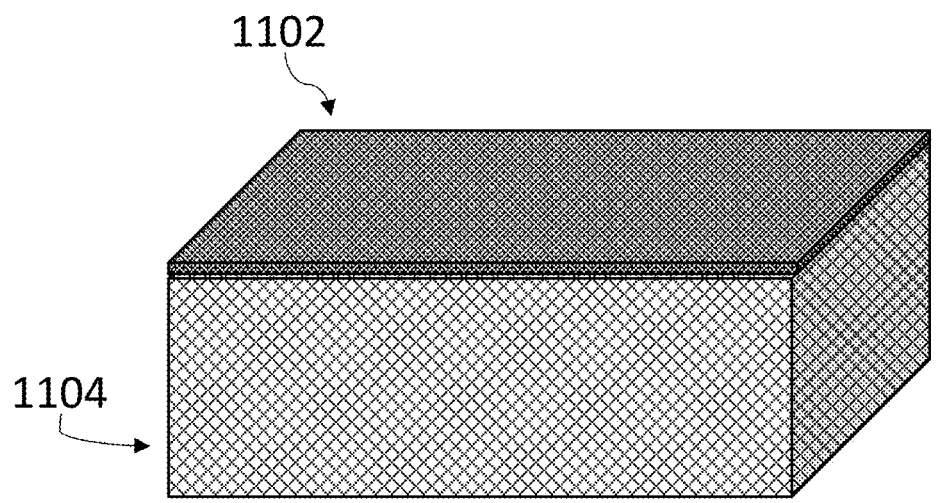
FIGS. 11A-11C depicts various embodiment of a microlattice layer with one or more material layers.
Figure 11B:
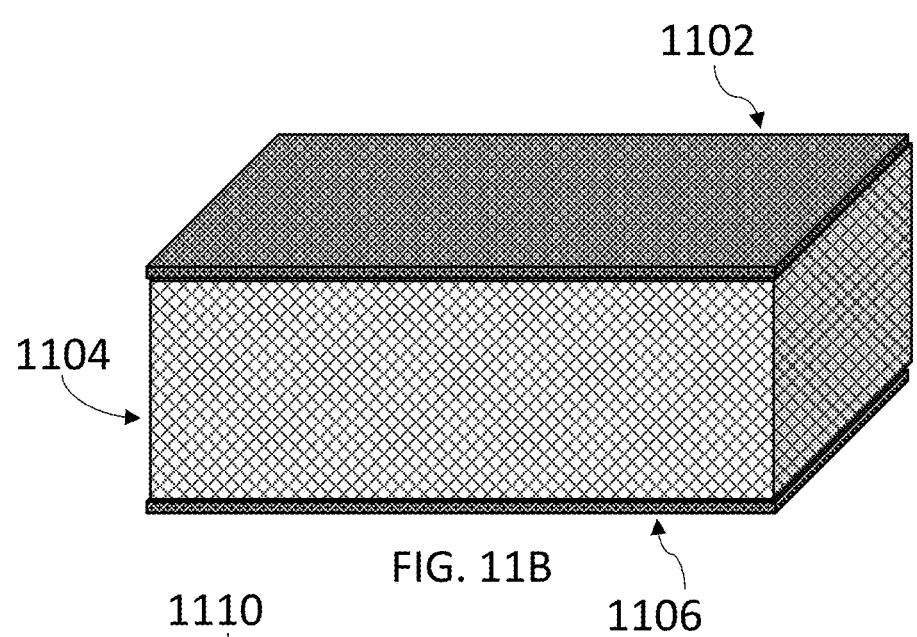
Figure 11C:
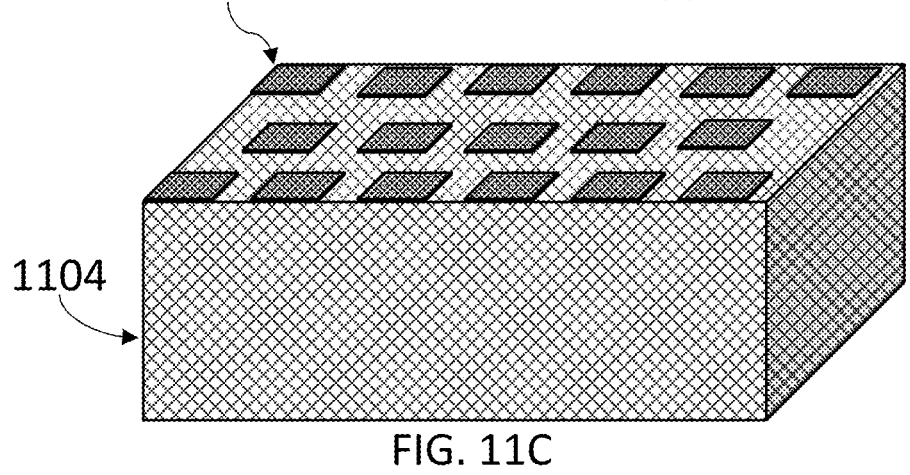

The microlattice layer and/or structure 1104 may further comprise one or more material layers 1102, 1106, 1110 as shown in FIGS. 11A-11C. Adding such one or more material layers 1102, 1106, 1110 to the microlattice structure 1104 can transversely and rotationally constrain the one or more nodes and/or filaments and thereby increasing the overall compressive strength and stiffness of the microlattice layer 1104 compared to a microlattice layer 1104 without one or more material layers. In other words, the one or more material layers 1102, 1106, 1110 may eliminate or reduce the translational and/or rotational movement of the one or more nodes and/or filaments when the microlattice layer is subject to a compressive load. In one embodiment, the one or more material layers 1102, 1106, 1110 is configured to transversely and rotationally constrain the one or more nodes and/or filaments and thereby increasing compressive strength and stiffness.

In one embodiment, the one or more material layers 1102, 1106, 1110 may extend parallel to a lateral or horizontal axis of the microlattice layer and/or structure 1104. The one or more material layers 1102, 1106, 1110 may be disposed on at least one surface of the microlattice layer, a top surface of the microlattice layer (see FIG. 11A), a bottom surface of the microlattice layer, a top surface and a bottom surface of the microlattice layer (see FIG. 11B) and/or an intermediate surface (not shown) of the microlattice layer. The intermediate surface of the microlattice layer is defined as any lateral surface between the top surface and the bottom surface. Alternatively, the intermediate layer may be disposed in any suitable position along the height of the microlattice layer, and/or any suitable position between the top surface and/or bottom surface. The one or more material layers 1102, 1106, 1110 may be interconnected, coupled and/or fused with one or more nodes, and/or one or more filaments. Accordingly, at least three nodes of the one or more nodes is coupled to each of the plurality of material segments. The interconnection and/or coupling being any coupling methods known in the art, including adhesive, welding, Velcro, etc. The fusing being any photopolymerization, bonding, depositing and/or binding as expected from additive manufacturing methods. Alternatively, the one or more material layers extends laterally and/or perpendicular to the entire microlattice layer and/or structure. The one or more material layers 1102, 1106, 1110 extends laterally and/or perpendicular to at least a portion of the microlattice layer and/or structure 1104. The one or more material layers 1102, 1106, 1110 may connect, mate, abut, and/or couple to one or more filaments and/or one or more nodes. Such words as attach, couple, interconnect, and/or fuse may be used interchangeably as a method to attach the material layer to the microlattice structure itself.

The one or more material layers 1102, 1106, 1110 may comprise any suitable shape depending on the intended application and desired compressive strength and stiffness of the microlattice structure. The shape of the one or more material layers 1102, 1106, 1110 may comprise a circle, an oval, a regular polygon and/or an irregular polygon. The one or more material layers comprises a cross-section, the cross-section is hollow or solid. The cross-section is non-uniform and/or uniform. The one or more material layers 1102, 1106, 1110 having a thickness, the thickness being a range of 1 mm to 5 mm.

The one or more material layers 1102, 1106, 1110 may comprise any suitable material that is compatible with the filaments. For instance, one or more material layers 1102, 1106, 1110 may comprise polymer materials (e.g., thermosets or thermoplastics), metal (e.g., aluminum or stainless steel), composites (e.g., carbon fiber, glass fiber reinforced polymer, fiberglass, or ceramic fibers), organic materials (e.g., wood, paper, or card board), ceramic cloth, natural cloth, polymeric cloth, metallic cloth, rubber, plastic, or any combination thereof. Additionally, in one embodiment, the one or more material layers 1102, 1106, 1110 may comprise the same or similar material as the filaments. Alternatively, the one or more material layers 1102, 1106, 1110 may comprise a different material as the filaments.

In one embodiment, the microlattice layer 1104 may comprise at least one material layer 1102, 1106, 1110, the at least one material layer 1102, 1106, 1110 disposed on a top surface or a bottom surface of the microlattice layer as shown in FIG. 11A. In one embodiment, the microlattice layer 1104 may comprise a first material layer 1102 and a second material layer 1106 as shown in FIG. 11B. The first material layer 1102 may be disposed on a top surface of the microlattice layer 1104, the second material layer 1106 may be disposed on a bottom surface of the microlattice layer 1104. In another embodiment, the microlattice layer 1104 may comprise a first material layer 1102, a second material layer 1106, and an intermediate layer or third material layer (not shown). The first material layer 1102 and the second material layer 1106 may be the same material, and/or the first material layer 1102 and the second material layer 1106 may be a different material. The intermediate layer (not shown) may be the same material as the first and/or second material layer. Alternatively, the intermediate layer may be a different material as the first and/or second material layer.

In another embodiment, the one or material layers 1102, 1106, 1110 may have any suitable configuration for the intended application and/or the desired performance characteristics. In one embodiment, the one or more material layers 1102, 1106, 1110 may comprise continuous, flat, planar plates or sheet(s) that extends laterally across the entire microlattice layer and/or a portion of the microlattice layer. The continuous, flat, planar sheet having a cross-section, the cross-section being solid or hollow.

Alternatively, the one or more material layers 1102, 1106, 1110 may comprise a plurality of material segments as shown in FIG. 11C. The plurality of material segments extends laterally across the microlattice layer 1104 and/or perpendicular to the microlattice layer 1104. The plurality of material segments having a cross-section, the cross-section being circular, oval, and/or a polygon, the polygon may comprise a regular polygon and/or an irregular polygon. The cross-section may further comprise a solid and/or hollow structure. The plurality of material segments and/or the one or more material layers 1102, 1106, 1110 may comprise connecting members or filaments. The plurality of material segments may mate, abut, couple and/or interconnect to one or more nodes and/or one or more filaments, the plurality of additional filaments, and/or the plurality of interconnecting filaments. Accordingly, at least three nodes of the one or more nodes is coupled to each of the plurality of material segments. The plurality of filaments, the plurality of additional filaments, and/or the plurality of interconnecting filaments may extend perpendicular or non-perpendicular from at least a portion from the continuous, flat planar sheets, the plurality of material segments and/or each of the plurality of material segments. The plurality of material segments may be disposed on a top surface, a bottom surface, and/or an intermediate surface of a microlattice layer. The plurality of material segments may be spaced apart and arranged into a plurality of repeating rows, non-repeating rows and randomly, the plurality of repeating rows or non-repeating rows may be positioned in parallel or offset to the preceding and/or adjacent preceding repeating row or non-repeating row.

Figure 12A:
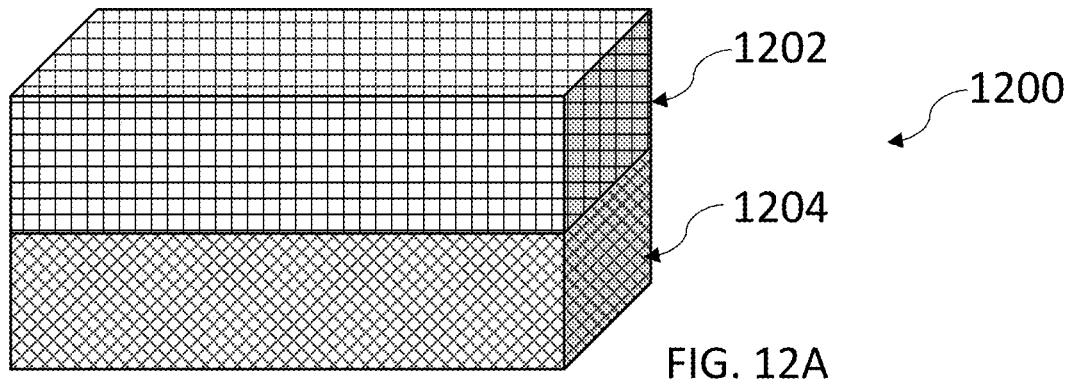
Figure 12B:
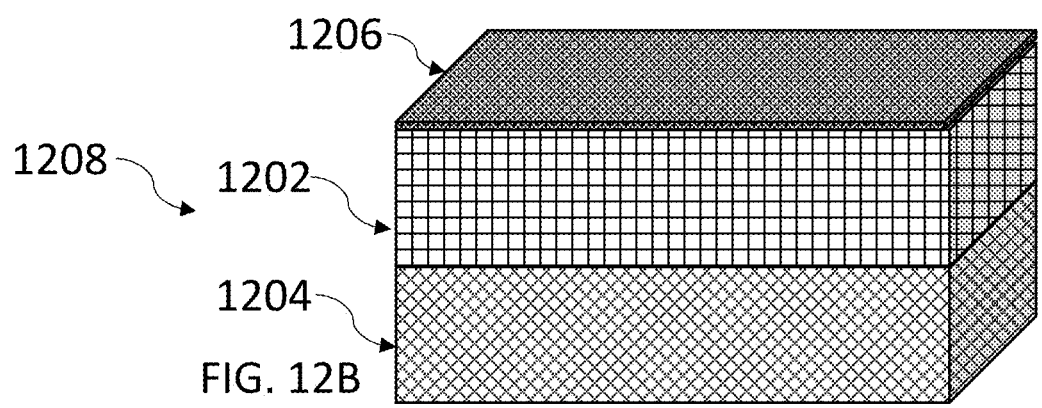
Figure 12C:
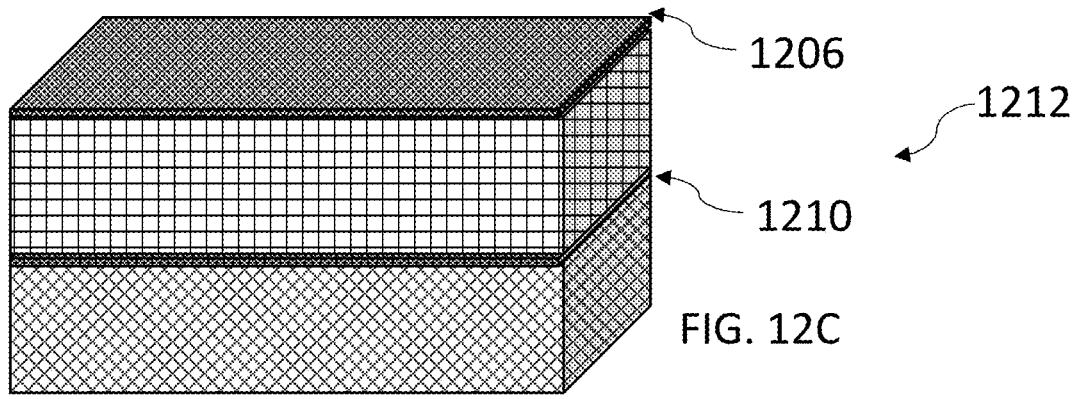
Figure 12D:
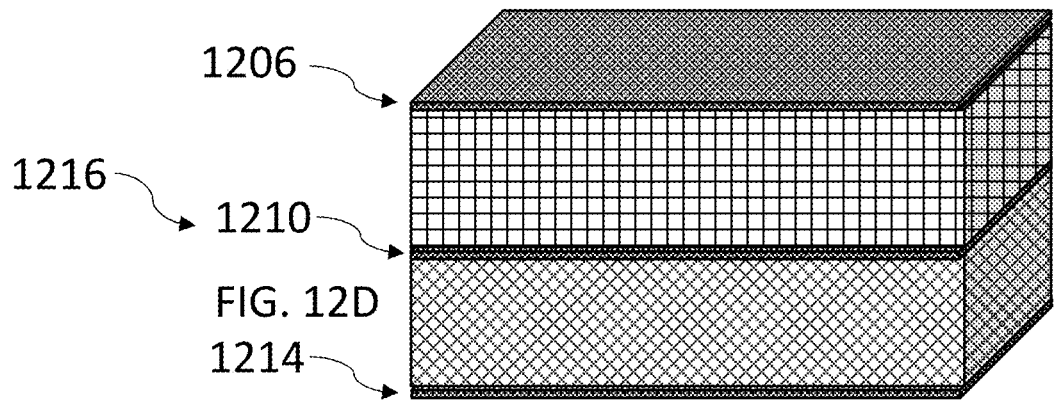

In another embodiment, the one or more material layers 1102, 1106, 1110 may comprise one or more perforations and/or holes (as shown in FIGS. 12E-12F). Furthermore, the one or more material layers 1102, 1106, 1110 comprising one or more material segments, the one or more perforations disposed on the one or more material segments. The one or more perforations having a size, shape and a spacing. The one or more material layers having a top surface and a bottom surface. The one or more perforations may be disposed on the top surface and/or the bottom surface. The one or more perforations may be disposed on the top surface and extend towards a portion to the bottom surface. Alternatively, the one or more perforations may be disposed on the bottom surface and extend towards a portion to the top surface. The one or more perforations may extend fully from the top surface to the bottom surface. The one or more perforations having a shape, the shape may comprise an oval, a circle, a regular polygon and/or an irregular polygon. The one or more perforations having a uniform spacing, sizing, orientation and/or shape. Alternatively, the one or more perforations having a non-uniform spacing, sizing, orientation and/or shape. The one or more perforations being spaced apart, and positioned in a plurality of repeating rows, non-repeating rows and/or randomly, the plurality of repeating rows or non-repeating rows may be positioned in parallel or offset to the preceding and/or adjacent plurality of repeating rows or non-repeating rows.

In one embodiment, the microlattice layer may comprise at least one material layer including at least one surface that conforms to an anatomical feature of a wearer. The at least one material layer including at least one surface can generally match, match or substantially match the wearer's unique anatomical features, namely the topography and contours of the wearer's head and facial region, including the jaw region. Accordingly, the at least one material layer may comprise a first surface (or top surface) and a second surface (or a bottom surface), the first surface or second surface can generally match, match or substantially match the wearer's anatomical features and/or the contours of a wearer's head. Such custom surfaces provide an improved fit and comfort for the wearer, and interchangeability.

Microlattice Layer Stacking

The stacked microlattice layer and/or structure 1200, 1208, 1212, 1216 comprising one or more microlattice layers and/or structures 1202, 1204 stacked on top of each other as shown in FIGS. 12A-12D. The stacking of the one or more microlattice layers 1202, 1204 may be colinear and/or offset with the preceding or adjacent one or more microlattice layers 1202, 1204. Accordingly, the stacked microlattice layers 1200, 1208, 1212, 1216 may comprise one or more microlattice structures 1202, 1204. In one embodiment, the stacked microlattice layer 1200, 1208, 1212, 1216 may comprise a first microlattice layer 1202 and a second microlattice layer 1204, the first microlattice layer 1202 and second microlattice layer 1204 are stacked on top of each other. The first microlattice layer 1202 may be coupled or fused to the second microlattice layer 1204. The interconnection and/or coupling being any coupling methods known in the art, including adhesive, welding, Velcro, etc. The fusing being any photopolymerization, bonding, depositing and/or binding as expected from additive manufacturing methods. The second microlattice layer 1204 may be further aligned and/or offset with the one or more nodes and/or one or more filaments of the first microlattice layer 1202. Such words as attach, couple, interconnect, and/or fuse may be used interchangeably as a method to attach the material layer to the microlattice structure itself.

Each of the first microlattice layer 1202 and second microlattice layer and/or structure 1204 may comprise the same compressive strength and stiffness. Alternatively, each of the first microlattice layer 1202 and second microlattice layers and/or structures 1204 may comprise a different compressive strength and stiffness. Each of the first microlattice layer 1202 and second microlattice layer and/or structure 1204 may comprise the same microlattice density. Alternatively, each of the first microlattice layer 1202 and second microlattice layer 1202 and/or structure may comprise a different microlattice density. Each of the first microlattice layer 1202 and second microlattice layer and/or structure 1204 comprises the same microlattice compressive strain. Alternatively, each of the first microlattice layer 1202 and second layer and/or structure 1204 may comprise a different microlattice compressive strain.

In another embodiment, the stacked microlattice layer comprises a first microlattice layer, an intermediate microlattice layer, and a second microlattice layer. The first microlattice layer and/or structure may be coupled, mated, abutted, interconnected and/or fused to the intermediate microlattice layer and/or structure, and/or the intermediate microlattice layer and/or structure coupled and/or fused to the second microlattice layer and/or structure. The interconnection and/or coupling being any coupling methods known in the art, including adhesive, welding, Velcro, etc. The fusing being any photopolymerization, bonding, depositing and/or binding as expected from additive manufacturing methods. The first and second microlattice layer and/or structure plurality of nodes may be aligned colinear, non-colinear, and/or a 3D array with at least a portion of the one or more nodes of the intermediate microlattice layer and/or structure. Alternatively, the first and second microlattice layer and or structure plurality of nodes may be aligned offset with at least a portion of the one or more nodes of the intermediate microlattice layer and/or structure. Each of the first, second and intermediate microlattice layer and/or structure may comprise the same strength and stiffness. Alternatively, each of the first, second and intermediate microlattice layer and/or structure may comprise a different strength and stiffness. Each of the first, second and intermediate microlattice layer and/or structure may comprise the same microlattice density. Alternatively, each of the first, second and intermediate microlattice layer and/or structure may comprise a different microlattice density. Each of the first, second and intermediate microlattice layer and/or structure comprises the same microlattice compressive strain. Alternatively, each of the first, second and intermediate microlattice layer and/or structure may comprise a different microlattice compressive strain.

In another embodiment, the stacked microlattice layer 1200, 1208, 1212, 1216 comprises a first microlattice layer 1202 and a second microlattice layer 1204, and one or more material layers 1206, 1210, 1214. For example, the stacked microlattice layer 1200, 1208, 1212, 1216 comprises a first microlattice layer 1202, a second microlattice layer, a first material layer 1206, and a second material layer 1214. The first material layer 1206 disposed on a top surface of the first microlattice layer 1202, and a second material layer 1214 disposed on a bottom surface of a second microlattice layer 1204. The first material layer 1206 and/or the second material layer 1214 comprises a continuous, flat planar sheet that extends laterally across at least a portion of the first microlattice layer 1202 and/or second microlattice layer 1204. Alternatively, the first material layer 1206 and/or the second material layer 1214 comprises a plurality of material segments that extends laterally across at least a portion of the first microlattice layer 1202 and/or second microlattice layer 1204. The stacked microlattice layer 1200, 1208, 1212, 1216 may further comprise an intermediate material layer 1210. The intermediate material layer 1210 may be disposed between the first microlattice layer 1202 and the second microlattice layer 1204. The intermediate material layer 1210 may be disposed between a top surface and bottom surface of the first microlattice layer 1202. Alternatively, the intermediate material layer 1210 may be disposed between a top surface and bottom surface of the second material layer 1204. The intermediate material layer 1210 may be coupled, mated, abutted and/or fused to the first microlattice layer 1202 and/or second microlattice layers 1204. The first material layer 12026 may be coupled, mated, abutted and/or fused to the first microlattice layer 1202, and the second material layer 1214 may be coupled, mated, abutted and/or fused to the second microlattice layer 1204. The interconnection and/or coupling being any coupling methods known in the art, including adhesive, welding, Velcro, etc. The fusing being any photopolymerization, bonding, depositing and/or binding as expected from additive manufacturing methods.

FIGS. 12E-12G depicts various views of an alternate embodiment of a stacked microlattice layer 1218. The stacked microlattice layer 1218 comprises at least one impact mitigation layer 1224, at least one microlattice layer 1222 and at least one first material layer 1226. The at least one impact mitigation layer 1224 comprises a plurality of impact mitigation structures, the plurality of impact mitigation structures comprises a plurality of filaments, a plurality of laterally supported filaments (LSF), auxetic structures, undulating structures, and/or any combination thereof. The at least one first material layer 1226 may be disposed, coupled and/or fused onto a bottom surface of the at least one impact mitigation layer 1224. The at least one microlattice layer 1222 may include a second material layer 1220, the second material layer 1220 comprises a plurality of material layer segments. The second material layer 1220 is disposed laterally on a top surface of the at least one microlattice layer 1222. At least two or more nodes are fused to each of the plurality of material layer segments. The stacked microlattice layer may further comprise an intermediate material layer 1228. The intermediate layer 1228 may be disposed, coupled and/or fused between the at least one microlattice layer 1222 and the at least one impact mitigation layer 1226. Alternatively, the intermediate layer 1228 may be disposed along a longitudinal axis of the stacked microlattice layer 1218. The first material layer 1226, the second material layer 1220 and the intermediate layer 1228 may comprise a plurality of holes or perforations 1230. The first material layer 1226, the second material layer 1220 or the intermediate layer 1228 may comprise a plurality of holes or perforations 1230.

The at least one microlattice layer 1224 comprise a plurality of nodes, a plurality of filaments and a plurality of interior angles. The plurality of filaments extending in different orientations and/or directions from each node. The plurality of interior angles disposed between each plurality of filaments, adjacent to each of the plurality of nodes and/or disposed between the plurality of filaments a surface of the first material layer 1226, second material layer 1220 or the intermediate material layer 1228. The plurality of interior angles being 1 degree to 89 degrees. The at least one microlattice layer 1224 comprises a second material layer 1220. The second material layer 1220 being coupled or fused to the plurality of nodes. The second material layer 1220 comprising a plurality of segments, the plurality of segments disposed laterally across the at least one microlattice layer 1224 top surface, and/or disposed parallel to the at least one microlattice layer 1224 top surface. The plurality of segments comprises a polygonal shape, an oval shape, a circle and/or any combination thereof.

The at least one impact mitigation layer 1224 comprises a plurality of impact mitigation structures. The plurality of impact mitigation structures deforms elastically upon impact, and returns to its original configuration after impact. The plurality of impact mitigation structures comprises a plurality of filaments 1232. The plurality of filaments having a longitudinal length, a diameter and a shape. The shape comprising a circle, an oval, a polygonal shape, and/or any combination thereof. The shape being solid or hollow. The shape being uniform along the length of its longitudinal axis, or the shape being non-uniform along its longitudinal axis. Each of the plurality of filaments are spaced apart from the adjacent plurality of filaments to provide room or space for buckling, the buckling being a sudden instability of the plurality of filaments leading to a lateral displacement along its longitudinal axis.

Microlattice Layer Customization

The one or more microlattice layers and/or structures may further comprise a continuous, one-piece microlattice layer. The continuous, one-piece microlattice layer may be shaped and configured to any anatomical feature of the body. The continuous, one-piece microlattice layer may match or substantially match any anatomical feature of the body. In one embodiment, the microlattice layer comprises a continuous, one-piece microlattice layer that may be shaped and configured to a head of a wearer. The continuous, one-piece microlattice layer may match or substantially match the bones of the skull to maximize protection. Such regions comprise parietal, temporal, occipital, ethmoid, sphenoid, temporal, nasal, lacrimal, maxilla, zygomatic, mandible, and/or any combination thereof. The continuous, one-piece microlattice layer may comprise a uniform and/or non-uniform compressive strength and stiffness. The continuous, one-piece microlattice layer may comprise a uniform and/or non-uniform microlattice density. The continuous, one-piece microlattice layer comprises a uniform microlattice compressive strain. Alternatively, the plurality of microlattice segments or each of the plurality of microlattice segments may comprise a different microlattice compressive strain. The continuous, one-piece microlattice layer may be coupled to a surface of a protective garment.

The one or more microlattice layers and/or structures may further comprise a plurality of microlattice segments (not shown). The plurality of microlattice segments may be shaped and configured to any anatomical feature of the body. The plurality of microlattice segments or each of the plurality of microlattice segments may match or substantially match any anatomical feature of the body and/or at least one anatomical feature of the body. In one embodiment, the microlattice layer comprises a plurality of microlattice segments, the plurality of microlattice segments may be shaped and configured to a head of a wearer. The plurality of segments may match or substantially match the bones of the skull to maximize protection. Such regions comprise parietal, temporal, occipital, ethmoid, sphenoid, temporal, nasal, lacrimal, maxilla, zygomatic, mandible, and/or any combination thereof. The plurality of microlattice segments or each of the plurality of microlattice segments may comprise the same microlattice layer compressive strength and stiffness. Alternatively, plurality of microlattice segments or each of the plurality of microlattice segments may comprise a different compressive strength and stiffness. The plurality of microlattice segments or each of the plurality of microlattice segments may comprise the same microlattice density. Alternatively, the plurality of microlattice segments or each of the plurality of microlattice segments may comprise a different microlattice density. The plurality of microlattice segments or each of the plurality of microlattice segments comprises the same microlattice compressive strain. Alternatively, the plurality of microlattice segments or each of the plurality of microlattice segments may comprise a different microlattice compressive strain. The plurality of microlattice segments may be coupled to a surface of a protective garment.

In another embodiment, the microlattice layer may comprise microlattice pads or microlattice pad assemblies (not shown). The microlattice pad assemblies may comprise at least one microlattice layer and/or structure and at least one base layer. Alternatively, the microlattice pads may comprise a first base layer, a second base layer and a microlattice layer and/or structure. The microlattice pads or pad assemblies may further comprise one or more foam layers. Alternatively, the microlattice pads may comprise a microlattice layer and/or structure and one or more foam layers, the one or more foam layers coupled to a surface of the microlattice layer. The microlattice pads may further comprise one or more material layers. The one or more foam layers may be coupled to the microlattice layer and/or structure, and/or the one or more foam layers positioned between the first base layer and the second base layer. Accordingly, the one or more foam layers may be coupled to a surface of the at least one base layer, the first base layer, or the second base layer. In one embodiment, the microlattice layer and/or structure, one or more impact mitigation layers and/or one or more foam layers is disposed between the first base layer and the second base layer. The first base layer may be coupled to the second base layer to fully enclose the microlattice layer and/or structure, the microlattice layer and/or structure, one or more impact mitigation layers and/or one or more foam layers. The first base layer and the second base layer may comprise the same materials or different materials. The coupling may comprise adhesive, Velcro, melting, welding, thermoforming, and/or any combination thereof.

The at least one base layer, the first base layer and/or the second base layer may comprise a foam material, Velcro material, a 2-way stretch, a 4-way stretch, a polymer, and/or any combination thereof. The foam layer may comprise a foam material, the foam material comprising polymeric foams, quantum foam, polyethylene foam, polyurethane foam (PU foam rubber), XPS foam, polystyrene, phenolic, memory foam (traditional, open cell, or gel), impact absorbing foam, compression foam, latex rubber foam, convoluted foam ("egg create foam"), EVA foam, VN 600 foam, Evlon foam, Ariaprene or Ariaprene-like material, PORON XRD, impact hardening foam, and/or any combination thereof. The at least one foam layer may have an open-cell structure or closed-cell structure. The foam layer can be further tailored to obtain specific characteristics, such as anti-static, breathable, conductive, hydrophilic, high-tensile, high-tear, controlled elongation, and/or any combination thereof. The foam material may be uniform throughout the microlattice layer, and/or non-uniform throughout the microlattice layer. The one or more foam layers may comprise a single, continuous piece, and/or a plurality of foam segments. The polymer may comprise polycarbonate (PC), polyethylene (PE), high density polyethylene (HDPE), polypropylene (PP), ethylene vinyl acetate (EVA), ABS, polyurethane (PU) and/or any combination thereof.

Microlattice Manufacturing

In one embodiment, the microlattice layer may be manufactured from standard manufacturing methods. Such standard manufacturing methods may include investment casting, deformation forming, woven textile, non-woven textile, and/or any combination thereof. Other conventional manufacturing methods may include casting, injection molding, blow molding, compression molding, rotational molding, extrusion molding, matrix molding, reaction injection molding and/or any combination thereof. Each of these methods offers unique features and benefits for fabricating custom manufactured fit pod assemblies.

Investment casting is one of the conventional methods to create microlattice structures. Castings of the microlattice structures can be created from an original pattern from wax, clay, plastic and/or other material. Then the desired investment materials are applied and cured. Finally, the final microlattice structure can complete the finishing process.

Deformation forming approach is another conventional method of producing microlattice structures by press forming operation. Using the forming and subsequent assembly process, cell sizes of millimeter to several centimeters can be obtained. It utilizes sheet perforation and shaping techniques. Perforated sheets with hexagonal or diamond shaped holes can be deformed at the nodes to produce sheets of tetrahedrons or pyramidal structure. The processed material requires annealing treatment in order to soften the strain-hardened struts.

Woven metal textile approach is a simple conventional method of weaving, braiding and sewing of thin beams of material into a microlattice structure. The orientation of the thin beams of material is possible to be arranged in any angle. The thin beams of material may be bonded together. Alternatively, the non-woven textile approach produces microlattices by layering thin beams of material on top of each other and the layered thin beams of material are subsequently joined together.

In another embodiment, the microlattice layers may be manufactured from additive manufacturing methods (AM). Such AM methods include VAT photopolymerization, material jetting, binder jetting, material extrusion or fuse deposition modelling (FDM), power bed fusion (e.g., direct metal laser sintering (DMLS), electron beam melting (EBM), selective heat sintering (SHS), selective laser melting (SLM), selective laser melting (SLS), sheet lamination, and/or directed energy disposition (DED), multi-jet fusion, digital light synthesis, and/or any combination thereof.

VAT polymerization method uses a vat of liquid photopolymer resin, out of which the microlattice structure can be constructed layer by layer. An ultraviolet (UV) light is used to cure or harden the resin where required, while a platform moves the microlattice structure being made downwards after each new layer is cured.

Material jetting approach can create a microlattice layer similar to using a two-dimensional ink jet printer. Material is jetted onto a build platform using either a continuous or Drop on Demand (DOD) approach. Material is jetted onto the build surface or platform, where it solidifies and the microlattice is built layer by layer. Material is deposited from a nozzle which moves horizontally across the build platform. The material layers are then cured or hardened using ultraviolet (UV) light.

The binder jetting approach uses two materials; a powder-based material and a binder. The binder acts as an adhesive between powder layers. The binder is usually in liquid form and the build material in powder form. A print head moves horizontally along the x and y axes of the machine and deposits alternating layers of the build material and the binding material. After each layer, the microlattice being printed is lowered on its build platform.

Fuse deposition modelling (FDM) is a common material extrusion process and is a technique used in domestic or hobby 3D printers. Material is drawn through a nozzle while under continuous pressure, where it is heated and is then deposited layer by layer into the desired cross-sectional area. The nozzle can move horizontally, and a platform moves up and down vertically after each new layer is deposited. Then the layers are fused together upon deposition as the material is in its melted state.

Powder bed fusion (PBF) methods use either a laser or electron beam to melt and fuse material powder together. All PBF processes involve the spreading of the powder material over previous layers into desired cross-sections. The powders are sintered, layer by layer. The platform lowers the microlattice to add additional layers, accordingly.

Directed Energy Deposition (DED) is a complex printing process commonly used to repair or add additional material to existing components. A typical DED machine consists of a nozzle mounted on a multi axis arm, which deposits melted material onto the specified surface and cross-section, where it solidifies. The process is similar in principle to material extrusion, but the nozzle can move in multiple directions and is not fixed to a specific axis. The material, which can be deposited from any angle due to 4 and 5 axis machines, is melted upon deposition with a laser or electron beam. The process can be used with polymers, ceramics but is typically used with metals, in the form of either powder or wire. Both conventional and additive manufacturing methods may be used together to create the desired microlattice layer, microlattice pads, and/or any combination thereof.

The microlattice structure may be manufactured with standard methods known in the art. Desirably, the microlattice structure may be fabricated by an additive manufacturing process to print a 3D matrix composite part utilizing a nanofuncationalization process created by HRL Laboratories. As disclosed in U.S. Pat. No. 8,663,539, entitled "Process of Making a Three-Dimensional Micro-Truss Structure," which is incorporated by reference herein in its entirety, discloses a method that forms micro-trusses by using a fixed light input (collimated UV) light to cure (polymerize) polymer optical waveguides, which can self-propagate in a 3D pattern—the propagated polymer optical waveguides form the micro-truss. Furthermore, the microlattice structure may comprise at least a portion of materials such as a metal, polymer, foam and/or any combination thereof. More specifically, it may be a metal, such as magnesium, aluminum, titanium, chromium, iron, cobalt, nickel, copper, zinc and/or an alloy. The polymeric material may include polycarbone, aramid, high impact polysterene, nylon, ultra-high molecular weight polyethylene, poly (p-xylene), and/or any combination of such materials.

Protective Garments

In one embodiment, a protective garment assembly comprises a microlattice layer. The protective garment assembly may further comprise an impact mitigation layer. The microlattice layer may be optimized to enhance the performance and/or protection of any protective garment assembly. For example, the microlattice layer may be used to optimize the comfort, strength, stiffness, weight, and/or the density of a protective garment assembly. In one embodiment, the protective garment assembly may comprise a first garment layer, a second garment layer, and a microlattice layer. The microlattice layer disposed between the first garment layer and the second garment layer. The microlattice layer may comprise a single, continuous layer. Alternatively, the microlattice layer comprises a plurality of microlattice segments. The microlattice layer may be configured as a flat, planar matrix that easily conforms to any anatomical feature of a wearer. The microlattice layer may comprise at least one surface that conforms to any anatomical feature of a wearer.

Figure 13:
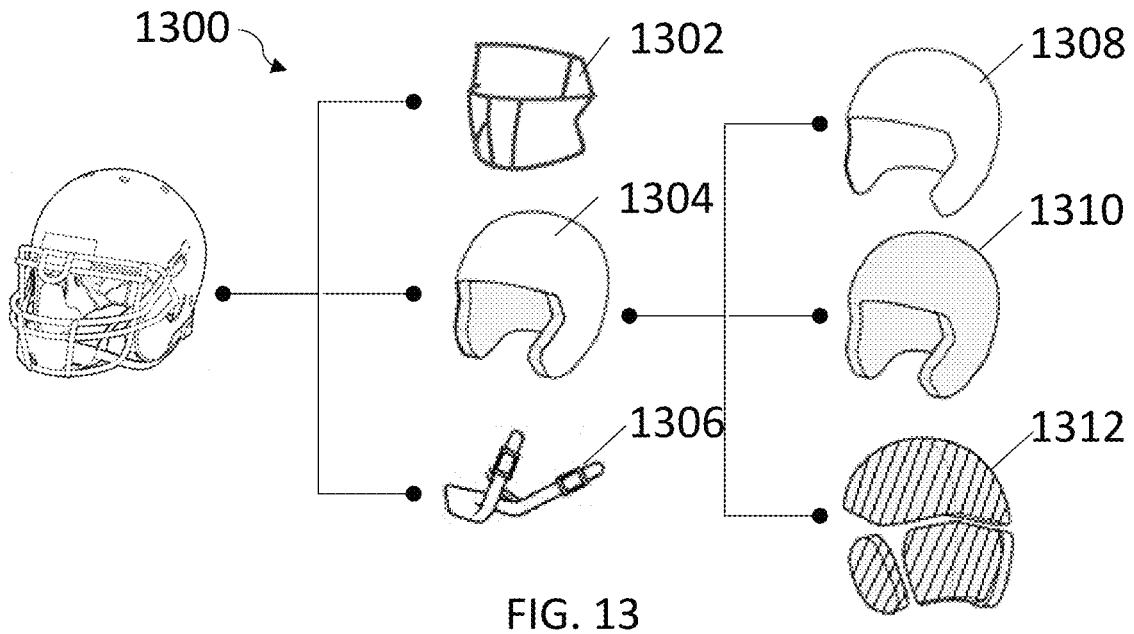
FIG. 13 depicts one embodiment of a protective helmet assembly.

FIG. 13 depicts a side view of one embodiment of a protective helmet assembly 800 with a microlattice layer and/or structure. The protective helmet assembly 1300 comprises a facemask 1302, a helmet 1304, and a chinstrap 1306. The helmet 1304 comprises an outer shell 1308 and a microlattice layer 1312. The helmet 1304 further comprises an inner shell 1310. The outer shell 1308 having an external surface and an internal surface. The microlattice layer 1312 coupled to the inner surface of the outer shell 1308. Furthermore, the microlattice layer 1312 may be disposed between the outer shell 1308 and the inner shell 1310. The microlattice layer 1312 may extend from an external surface of the inner shell 1310 to an internal surface of the outer shell 1308. Alternatively, the microlattice layer 1312 may extend from an external surface of the inner shell 1310 to a portion of the internal surface of the outer shell 1308. Also, the microlattice layer 1312 may extend from the internal surface of the outer shell to at least a portion towards the external surface of the inner shell 1310. The helmet 1304 may comprise the assembly of the different helmet components, which the helmet components are manufactured in individual pieces and assembled together.

In another embodiment, the helmet 1304 comprises an outer shell 1308 and a microlattice layer 1312. The helmet 1304 further comprises an inner shell 1310. The outer shell 1308 having an external surface and an internal surface. The microlattice layer 1312 coupled to the inner surface of the outer shell 1308. Furthermore, the microlattice layer 1312 may be disposed between the outer shell 1308 and the inner shell 1310. The microlattice layer 1312 may extend from an external surface of the inner shell 1310 to an internal surface of the outer shell 1308. Alternatively, the microlattice layer 1312 may extend from an external surface of the inner shell 1310 to a portion of the internal surface of the outer shell 1308. Also, the microlattice layer 1312 may extend from the internal surface of the outer shell to at least a portion towards the external surface of the inner shell 1310.

In another embodiment, the helmet 1304 may be manufactured into a single, unit. Such ability to manufacture the helmet 1304 in a single unit may require the use of additive manufacturing methods known in the art. Such a manufacturing technique allows the use of 3D modeling software and the specific layering material for each component of the helmet. The helmet 804 comprises an outer shell 1308 and a microlattice layer 1312. The helmet 804 further comprises an inner shell 1310. The outer shell 808 having an external surface and an internal surface. The microlattice layer 1312 coupled to the inner surface of the outer shell 808. Furthermore, the microlattice layer 1312 may be disposed between the outer shell 1308 and the inner shell 1310. The microlattice layer 1312 may extend from an external surface of the inner shell 810 to an internal surface of the outer shell 1308. Alternatively, the microlattice layer 1312 may extend from an external surface of the inner shell 1310 to a portion of the internal surface of the outer shell 1308. Also, the microlattice layer 812 may extend from the internal surface of the outer shell to at least a portion towards the external surface of the inner shell 1310.

The outer shell 1308 may be initially programmed for additive manufacturing to be the base layer of the helmet 804 with a first material and first material properties. From the outer shell 1308 the microlattice layer 1312 may be a second layer with a second material and/or second material properties. Should an inner shell 1310 be required, the inner shell will be a third layer with a third material and/or a third material properties. Furthermore, should a comfort liner (not shown) be introduced, it can be a fourth layer with a fourth material and/or a fourth material properties. The layering would continue until the single, unit helmet 1304 is complete. The single, unit helmet 1304 may comprise at least one surface that conforms to a head of a wearer.

Figure 14:
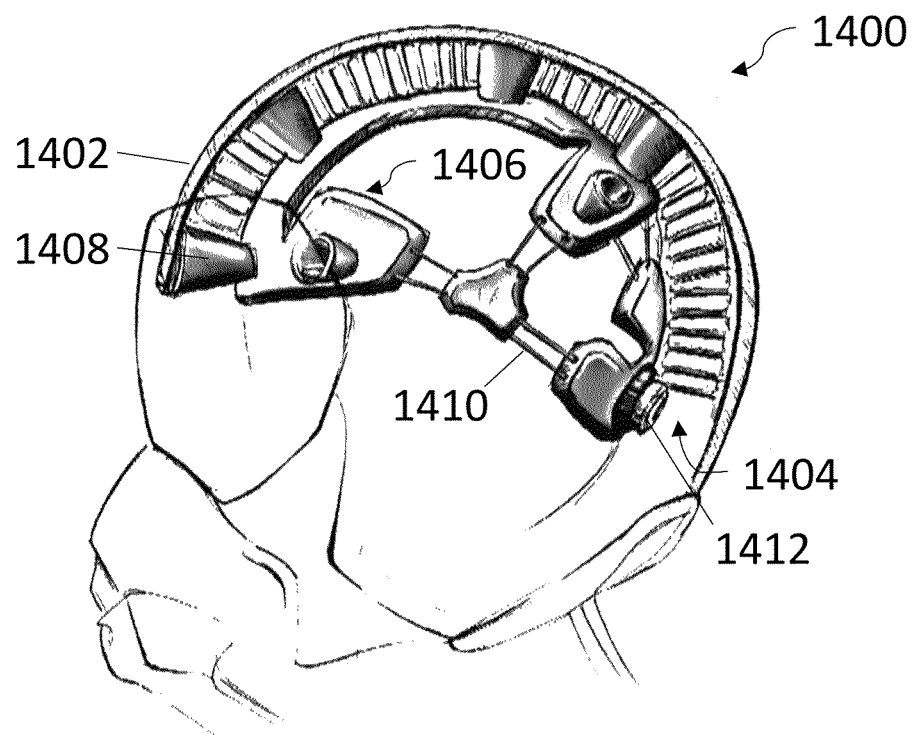
FIG. 14 depicts a cross-section view of one embodiment of a protective garment assembly.

FIG. 14 depicts a cross-sectional view of an alternate embodiment of a protective garment assembly 1400. The protective garment assembly 1400 desirably accommodates an air crew protective helmet assembly. The protective garment assembly 1400 comprises an outer shell 1402, an impact mitigation layer 1404, an inner frame 1406. The impact mitigation layer 1404 disposed between an inner surface of the outer shell 1402, and an outer surface of the inner frame 1406. The impact mitigation layer 1404 comprises a plurality of impact mitigation structures, the plurality of impact mitigation structures includes at least one or more of a plurality of filaments, a plurality of laterally supported filaments, a plurality of auxetic structures, a plurality of undulated structures, microlattice structures and/or any combination thereof. However, the protect garment assembly 1400 can accommodate and/or be optimized for any sport and/or occupation that requires protection from impacts. Accordingly, air crew protective helmets require protection to the airmen's head from blunt impact traumas or high velocity impacts in the case of an ejection from their planes or jets. Current air crew protective helmets do not have embed impact mitigation structures for mitigating such impacts. Additionally, air crew protective helmets do not alleviate discomfort when large temperature increases are observed within the cockpit during the first twenty minutes of flight leading to excessive perspiration and dehydration—the excessive perspiration and dehydrations is known to reduce an airmen's tolerance to G-forces.

Thus, the need exists to create an impact absorbing, lightweight, comfortable, breathable impact mitigation layer that can be tuned to respond optimally for appropriate impact velocities or blunt force traumas. The impact mitigation layer may be a single, continuous layer, and/or a plurality of impact mitigation layer modular segments. The impact mitigation layer may comprise uniform and/or non-uniform thicknesses, composition, and impact absorption properties, and/or the impact. The impact mitigation layer may comprise an active or passive cooling system for thermal management—allowing evaporation of sweat through the active or passive cooling system. The impact mitigation layer may match or substantially match the contours of the wearer's head.

In one embodiment, the protective garment assembly 1400 comprises an outer shell 1402, an impact mitigation layer 1404, an inner frame 1406. The protective garment assembly 1400 further comprises a comfort layer or comfort liner (not shown). The impact mitigation layer 1404 disposed between an inner surface of the outer shell 1402, and an outer surface of the inner frame 1406. The impact mitigation layer 1404 comprises a plurality of impact mitigation structures, the plurality of impact mitigation structures includes at least one or more of a plurality of filaments, a plurality of laterally supported filaments, a plurality of auxetic structures, a plurality of undulated structures, microlattice structures and/or any combination thereof. The impact mitigation layer 1404 may further comprise a comfort layer and/or comfort liner. The comfort layer and/or comfort liner may be coupled and/or fused to an outer surface and/or inner surface of the impact mitigation layer 1404. Alternatively, the comfort layer and/or comfort liner may be coupled or fused to an inner surface of the inner frame 1406. The comfort layer and/or comfort liner may comprise a single, continuous layer, and/or a plurality of modular comfort layer or liner segments. The comfort layer may comprise at least one microlattice layer. The comfort layer may further comprise at least one foam layer and/or at least one polymer layer. The polymer layer and/or the outer shell 1402 comprising polycarbonate (PC), polyethylene (PE), high density polyethylene (HDPE), polypropylene (PP), ethylene vinyl acetate (EVA), ABS, polyurethane (PU) and/or any combination thereof.

The inner frame 1406 comprising a tensioning mechanism and retention mechanism 1408. The inner frame 1406 being coupled to the outer shell 1402, impact mitigation layer 1404, and/or the outer shell 1402 and the impact mitigation layer 1404. The inner frame 1406 comprising a plurality of frame segments. The plurality of frame segments or each of the plurality of frame segments are spaced apart. The tensioning mechanism being movable from a relaxed, untensioned state to a tensioned state for optimal fitting around the wearer's head. The tensioning mechanism. The tensioning mechanism comprising at least one dial 1412 and elastomeric bands 1410. At least a portion of the tensioning mechanism is coupled to each of the plurality of frame segments, the tensioning mechanism moves each of the plurality of frame segments towards each other by closing the space between the segments to create a tighter fit. The dial 1412 may have tuned rotational increments that correlate to linear distance. Each turn of the dial moves the plurality of frame segments together by $1/8$" or greater. Alternatively, it can be a linear distance comprising $1/16$" or greater.

The retention mechanism 1408 may comprise a plurality of impact mitigation structures. The plurality of impact mitigation structures of the retention mechanism 1408 may be the same or different impact structures as the impact mitigation layer 1404. The plurality of impact mitigation structures including laterally supported filament structures (LSF). The laterally supported filament structures comprising a plurality of filaments arranged into a polygonal shape, a plurality of walls between each of the plurality of filaments. The laterally supported filament structures deforming elastically upon impact and returning to its original configuration once the impact force is removed. The laterally supported filament structures may further comprise a top plate, the top plate is disposed on at least one end of the laterally supported filament structures. The top plate having a through-hole. The through-hole is sized and configured to receive a screw, bolt, rivet, and/or any other mechanical fastener known in the art. The retention mechanism 1408 may comprise a screw, bolt, rivet and/or any other mechanical fastener known in the art.

In another embodiment, the protective garment assembly 1400 may further comprise a balancing system (not shown).

The balancing system would facilitate proper weight balancing to a wearer's head when multiple head-mounted accessories are coupled to the protective garment. The multiple head-mounted accessories add significant weight to a wearers head, and if the weight is misaligned, it can generate tremendous neck fatigue. The balancing system would provide a counter balancing mechanism that counterbalances the weight added to the head with multiple-head mounted accessories by adjusting the protective garment assembly's center of gravity, as well as providing a "quick-release" feature for the head mounted accessories. Such balancing system would help mitigate any future chronic neck and/or back problems.

Figure 15:
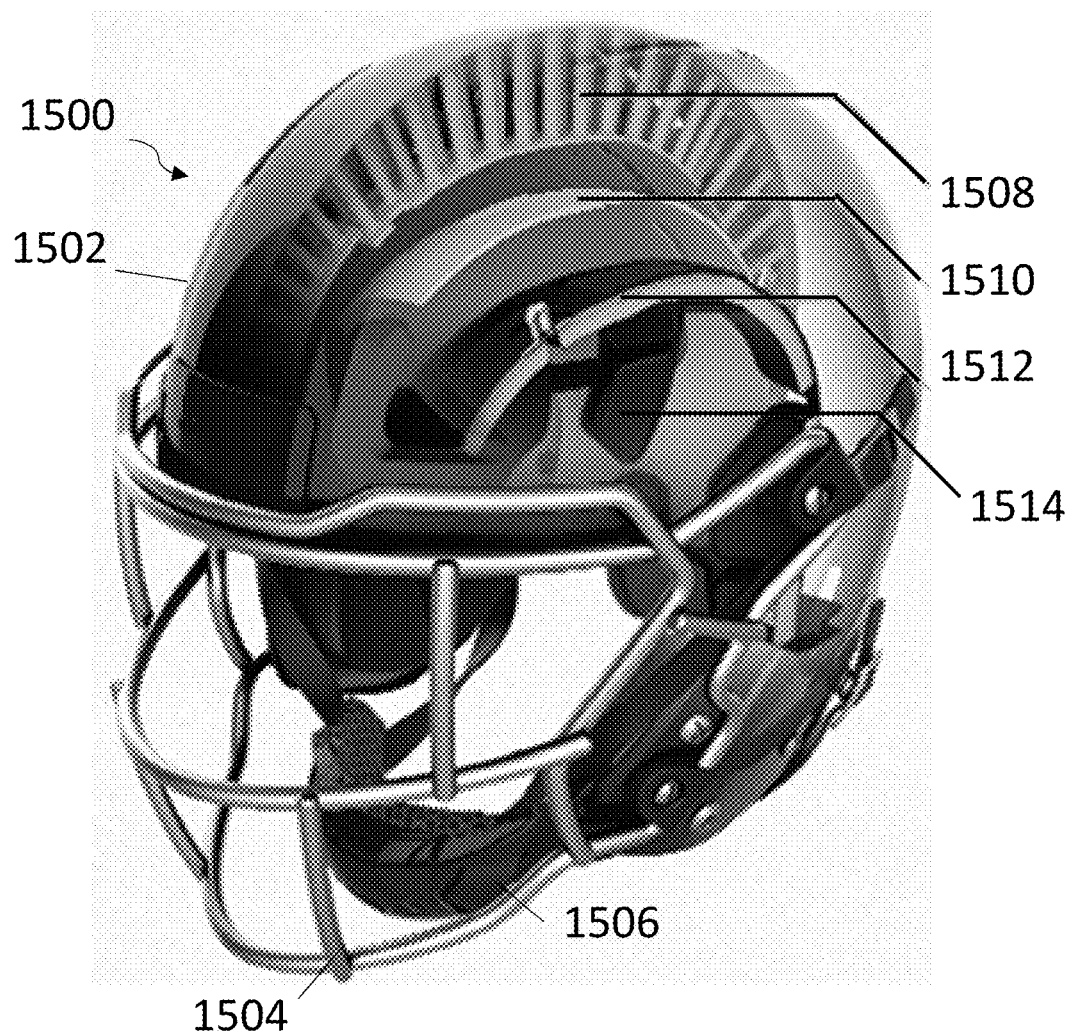
FIG. 15 depicts a perspective view of an alternative embodiment of a protective garment assembly.

FIG. 15 depicts a side view of one embodiment of a protective helmet assembly 1500 with an impact mitigation layer. The protective helmet assembly 1500 comprises a facemask 1504, a helmet, and a chinstrap 1506. The helmet comprises an outer shell 1502 and an impact mitigation layer 1508. The helmet further comprises an inner shell or a force distribution layer 1510. The outer shell 1502 having an external surface and an internal surface. The impact mitigation layer 1508 coupled to the inner surface of the outer shell 1502. Furthermore, the impact mitigation layer 1508 may be disposed between the outer shell 1502 and the inner shell 1510. The impact mitigation layer 1510 may extend from an external surface of the inner shell 1510 to an internal surface of the outer shell 1502. Alternatively, the impact mitigation layer 1312 may extend from an external surface of the inner shell 1510 to a portion of the internal surface of the outer shell 1308. Also, the impact mitigation layer 15082 may extend from the internal surface of the outer shell 1502 to at least a portion towards the external surface of the inner shell 1510. The helmet may further comprise a foam layer 1514, a comfort liner 1514 and/or a microlattice layer (not shown).

The outer shell 1308, 1402, 1502 and/or the inner shell/force distribution layer/inner frame 1310, 1406, 1510 may comprise a rigid or a relatively rigid material, such as polyethylene, high density polyethylene, nylon, polycarbonate, polyurethane, acrylonitrile Butadiene Styrene (ABS), polyester resin with fiberglass, thermosetting plastics, and/or any other rigid thermoplastic materials. Alternately, the outer shell 1308, 1402, 1502 and/or the inner shell/force distribution layer/inner frame 1310, 1406, 1510 may comprise a relatively deformable material, such as polycarbonate, polyurethane and/or high-density polyethylene, where such material allows local deformation upon impact. The outer shell 1502 and/or the inner shell/force distribution layer 1310, 1510 may comprise a single, continuous shell. Alternatively, the outer shell 1502 and/or the inner shell/force distribution layer may comprise a plurality of shell segments.

The impact mitigation layer 1404, 1508 comprises a plurality of impact mitigation structures. Each of the plurality of impact mitigation structures may be spaced apart from the adjacent plurality of impact mitigation structures. The plurality of impact mitigation structures may comprise a plurality of filaments, a plurality of laterally supported filaments, a plurality of auxetic structures, a plurality of undulated structures, a microlattice structure or layer, and/or any combination thereof. Alternatively, the impact mitigation layer 1404, 1508 may comprise a continuous, single piece layer that is coupled to the outer shell 1502 and/or the inner surface of the outer shell 1502. The impact mitigation layer 1404, 1508 may further comprise a top layer and a bottom layer, the impact mitigation structure and/or the plurality of impact mitigation structures are disposed between the top and bottom layer. The top and bottom layers are thin, flexible layers to facilitate coupling to the helmet.

Figure 25A:
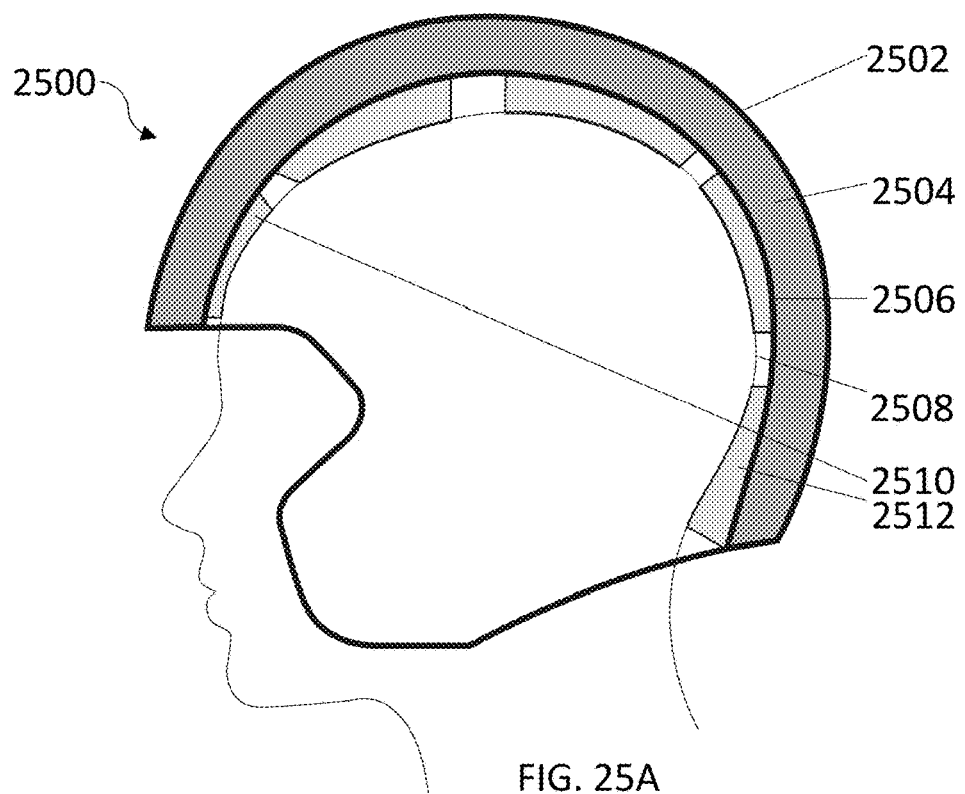
FIGS. 25A-25B depicts a cross-section view of a helmet system with custom impact mitigation pads.

FIG. 25A depicts a cross-sectional view of one embodiment of a protective helmet assembly 2500. The protective helmet assembly 2500 comprises an outer shell 2502, and inner shell 2506 and an impact mitigation layer 2504. The impact mitigation layer 2504 is disposed between the outer shell 2502 and the inner shell 2506. The protective helmet assembly 2500 further comprises a custom pad liner 2510, the custom pad liner includes a plurality of pad assemblies. The protective helmet assembly 2500 may further comprise a chinstrap (not shown) and a facemask (not shown). The custom pad liner 2510 may be disposed onto an inner surface of the inner shell 2506. The custom pad liner 2510, the plurality of pad assemblies and/or each of the plurality of pad assemblies comprises a first pad layer 2510, the first pad layer 2512 comprises a microlattice structure, the microlattice structure includes a first surface and a second surface. At least a portion of the first surface matches or substantially matches the contours of the inner surface of the inner shell 2506. At least a portion of the second surface matches or substantially matches the wearer's anatomical features, namely the wearer's head. The plurality of pad assemblies and/or each of the plurality of pad assemblies. Alternatively, the microlattice structure comprises at least one surface that matches or substantially matches the contours of a wearers head.

Figure 25B:
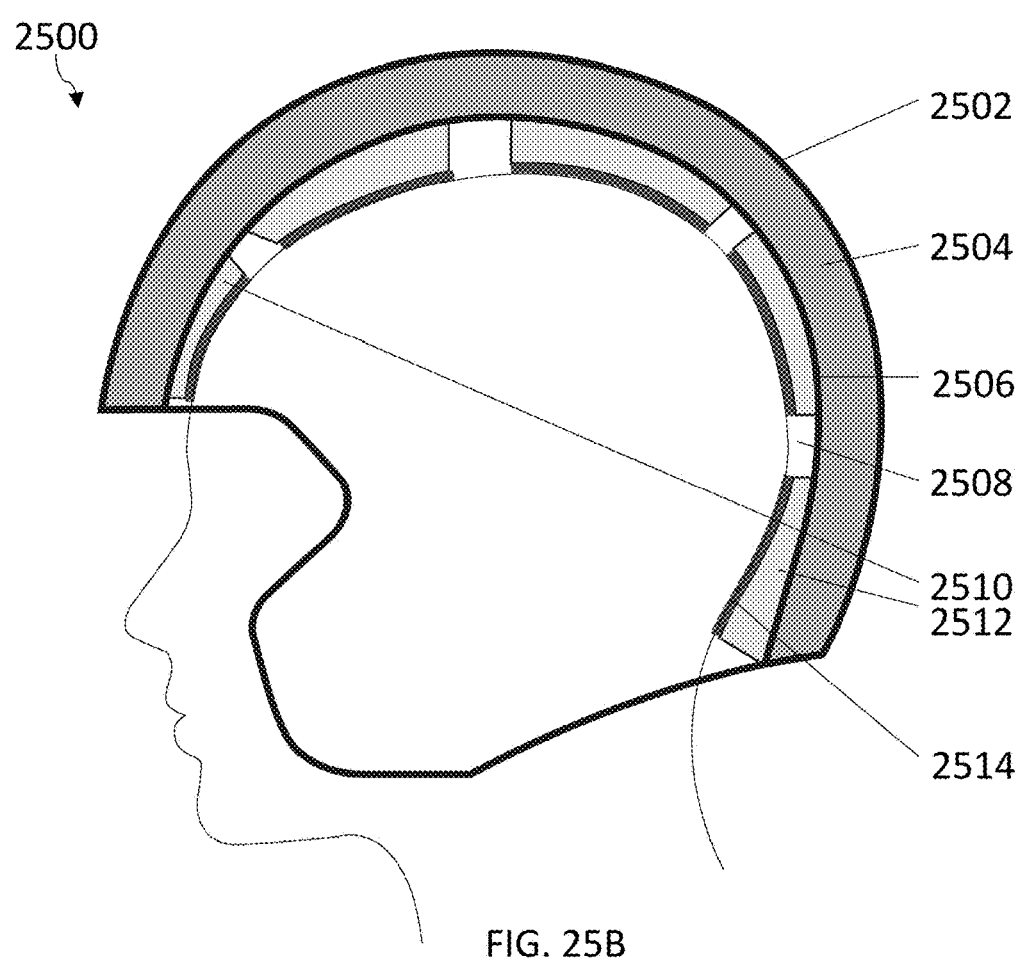

FIG. 25B depicts a cross-sectional view of one embodiment of a protective helmet assembly 2500. The protective helmet assembly 2500 comprises an outer shell 2502, and inner shell 2506 and an impact mitigation layer 2504. The impact mitigation layer 2504 is disposed between the outer shell 2502 and the inner shell 2506. The protective helmet assembly 2500 further comprises a custom pad liner 2510, the custom pad liner includes a plurality of pad assemblies. The protective helmet assembly 2500 may further comprise a chinstrap (not shown) and a facemask (not shown). The custom pad liner 2510 may be disposed onto an inner surface of the inner shell 2506. The custom pad liner 2510, the plurality of pad assemblies and/or each of the plurality of pad assemblies comprises a first pad layer 2512 and a second layer 2514. The first pad layer 2512 includes a microlattice structure, the microlattice structure includes a first surface and a second surface. At least a portion of the first surface matches or substantially matches the contours of the inner surface of the inner shell 2506. At least a portion of the second surface matches or substantially matches the wearer's anatomical features, namely the wearer's head. The plurality of pad assemblies and/or each of the plurality of pad assemblies. Alternatively, the microlattice structure comprises at least one surface that matches or substantially matches the contours of a wearers head.

The second pad layer 2512 is disposed or coupled onto a surface of the first pad layer 2510. The second pad layer 2512 may comprise one or more foam layers. The one or more foam layers of the second pad layer 2512 may comprise a comfort foam layer and an impact layer. The second pad layer may further comprise a top layer and a bottom layer that encloses the one or more foam layers. The one or more foam layers are disposed between the top and bottom layer. Each of the one or more foam layers may comprise the same foam material or different foam materials. The top layer and the bottom layer may comprise the same foam material or different foam materials. The top layer and the bottom layer may comprise the same foam materials or different foam materials compared to the one or more foam layers. The second pad layer 2512 may be manufactured from custom manufacturing methods, such as additive manufacturing or it may be a separate piece that is coupled to the first foam layer.

Figure 26:
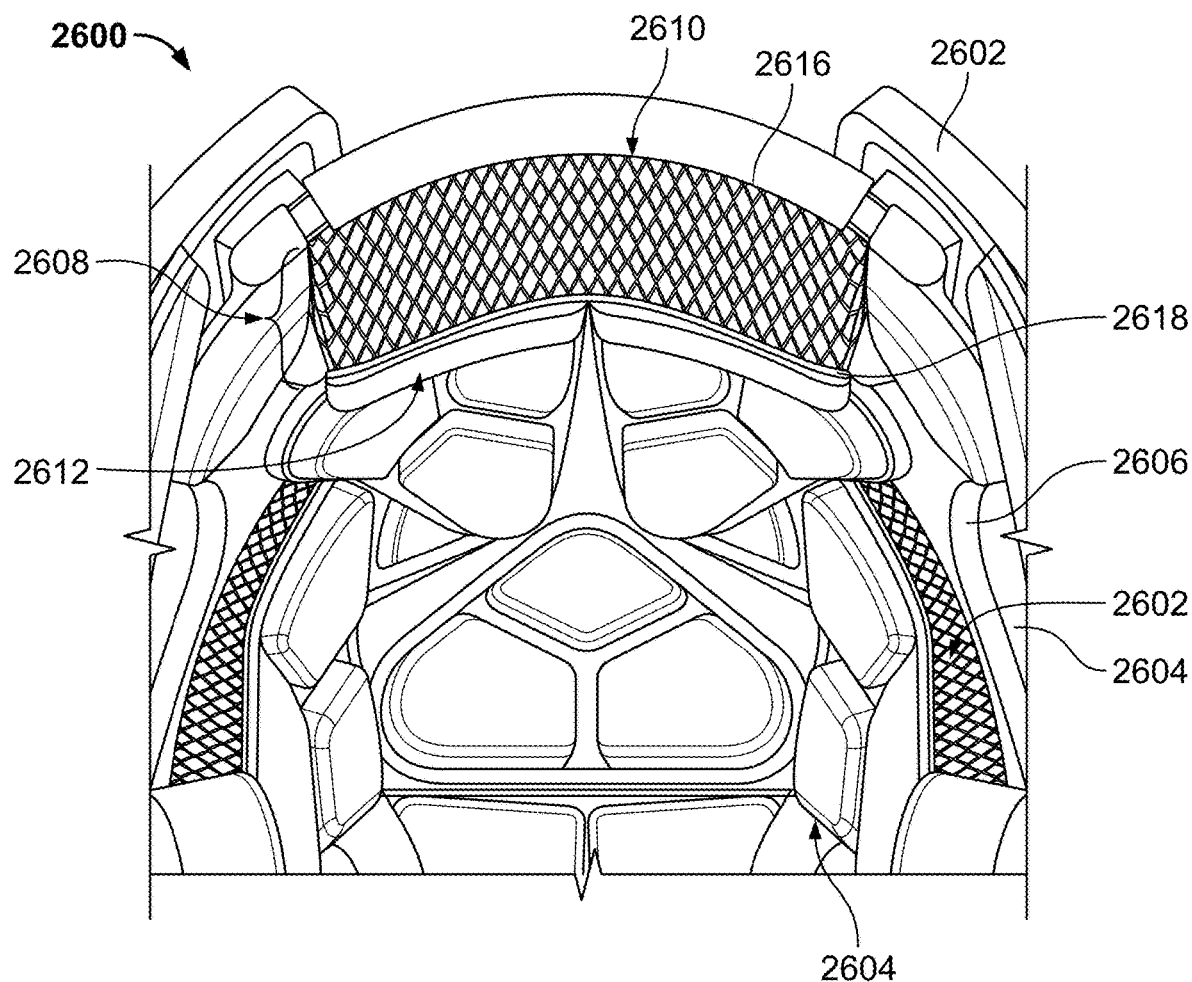
FIG. 26 depicts a bottom view of one embodiment of a protective helmet assembly.

FIG. 26 depicts a cross-sectional view of one embodiment of a protective helmet assembly 2600. The protective helmet assembly 2600 comprises an outer shell 2602, and inner shell 2606 and an impact mitigation layer 2604. The impact mitigation layer 2604 is disposed between the outer shell 2602 and the inner shell 2606. The protective helmet assembly 2600 further comprises a custom pad liner 2608, the custom pad liner 2608 includes a plurality of pad assemblies. The protective helmet assembly 2600 may further comprise a chinstrap (not shown) and a facemask (not shown). The custom pad liner 2608, the plurality of pad assemblies and/or each of the plurality of pad assemblies comprises a first pad layer 2610 and a second layer 2612. The first pad layer 2610 includes a microlattice structure, the microlattice structure includes a first surface and a second surface. The first pad layer 2610 further comprising a portion of the first surface that matches or substantially matches the interior surface of the inner shell 2606 and/or a portion of the second surface that matches or substantially matches at least one contour of a wearer's anatomical features, or namely the wearer's head. The second pad layer 2612 disposed or coupled onto the second surface of the first pad layer 2610 or at least a portion of the second surface. The second pad layer 2612 may comprise at least one surface that matches or substantially matches at least one contour of a wearer's anatomical features, or namely the wearer's head.

The first pad layer 2610 may further comprise a bottom material layer or a first material layer 2616 and a second material layer or a top material layer 2618. The bottom material layer 2616 and/or the second material layer 2618 may extend laterally across the first and/or second surface of the microlattice structure. The bottom material layer 2616 and/or the second material layer 2618 may extend laterally across the first and/or second surface of the microlattice structure to match or substantially align with the perimeter of the first pad layer 2610.

Impact Mitigation Structures

In one embodiment, the impact mitigating structures can comprise a plurality of filaments 1602. FIGS. 16A-16D depicts that the plurality of filaments may be thin, longitudinally extending members or be shaped and configured to deform non-linearly in response to an impact force. The non-linear deformation behavior is expected to provide improved protection against high-impact forces, and/or oblique forces. The non-linear deformation behavior is described by at least a portion of the filaments stress-strain profile. The non-linear stress-strain profile illustrates that there can be an initial rapid increase in force (region I) followed by a change in slope that may be flat, decreasing or increasing slope (region II), followed by a third region with a different slope (region III).

In another embodiment, the at least a portion of the plurality of filaments and/or the plurality of filaments may comprise filaments that buckle in response to an incident force, where buckling may be characterized by a localized, sudden failure of the filament structure subjected to high compressive stress, where the actual compressive stress at the point of failure is less than the ultimate compressive stress that the material is capable of withstanding. Furthermore, the plurality of filaments may be configured to deform elastically, allowing the at least a portion of the filaments to substantially return to their initial configuration once the external force is removed. The at least a portion of filaments may extend between two surfaces, the at least a portion of filaments having at least one end coupled to the outer layer and/or the inner layer.

In another embodiment, the plurality of filaments having a cross-section and a longitudinal axis. The cross-section of the plurality of filaments being solid or hollow, the solid or hollow cross-section being uniform throughout the entire length of the longitudinal axis. Accordingly, the solid or hollow cross-section being uniform at least a portion of the length of the longitudinal axis. The cross-section may further comprise a shape. The shape including an oval, a circle, a polygon, and/or a combination thereof. The polygon shape comprises a triangle, a square, a rectangle, a heptagon, a hexagon, a heptagon, an octagon, a nonagon, a decagon, and/or any combination thereof. The plurality of filaments having an aspect ratio, the aspect ratio being at least 3:1 or greater.

Figure 16A:
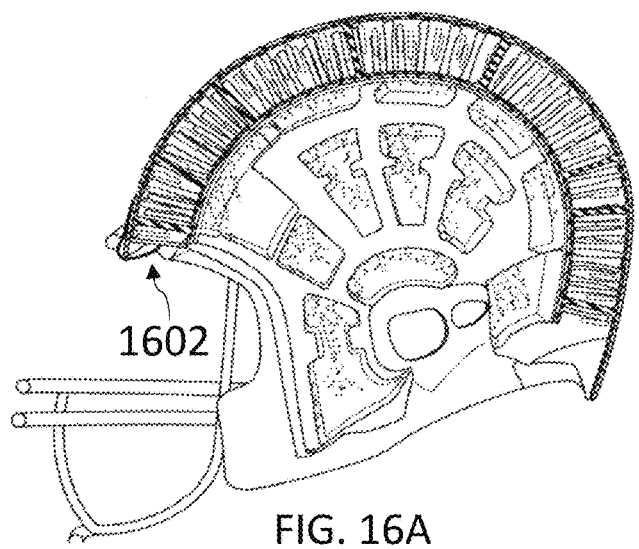
FIG. 16A-16D depicts cross-section views of one embodiment of a protective garment assembly comprising a plurality of filaments.
Figure 16B:
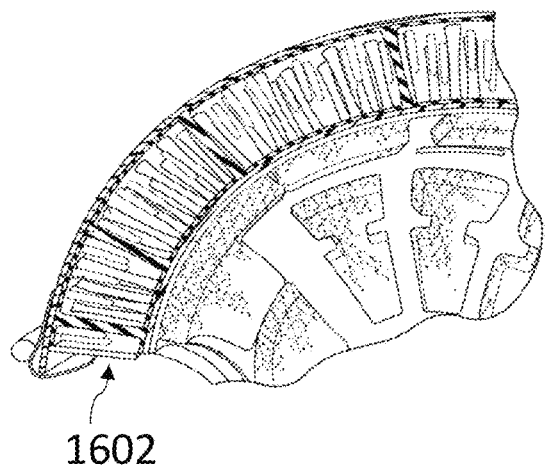
Figure 16C:
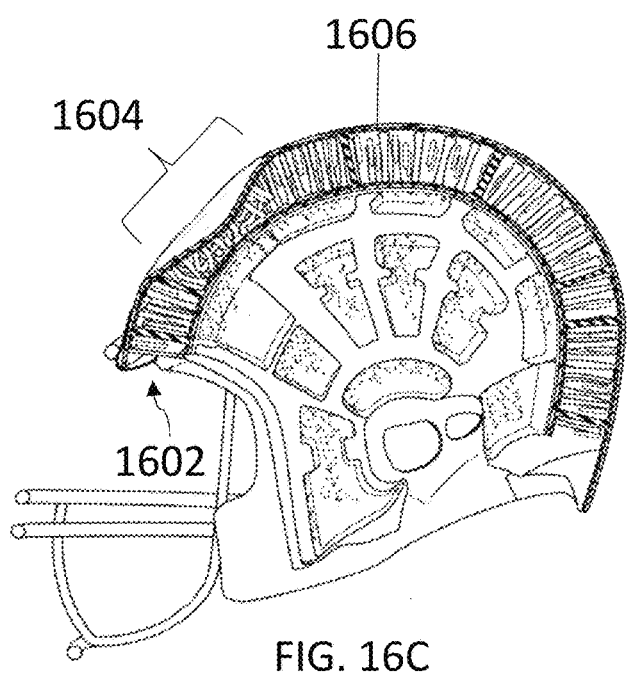
Figure 16D:
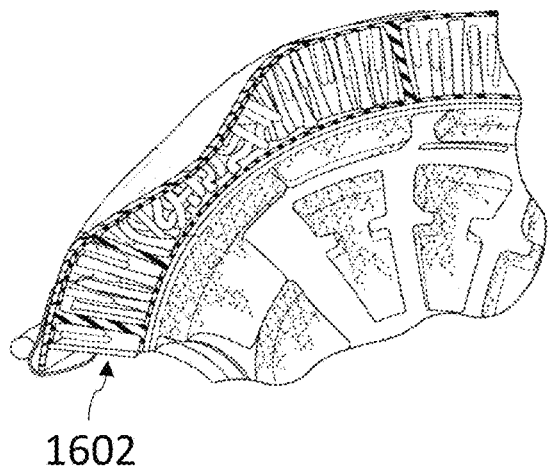

In another embodiment, the protective garment assembly may experience local deformation 1604 as shown in FIG. 16C-16D. The helmet and/or the impact mitigation layer deforms non-linearly in response to the impact force incident. The deformation can be elastic, such that after impact the outer shell 1606 and/or the impact mitigation layer return to their original configurations. In some embodiments, the helmet can be configured such that upon application of between about 100 and 500 static pounds of force, the outer shell and/or the impact mitigation layer deform between about 0.75 to 2.25 inches. The deformability distance can be tuned by varying the composition, number, and configuration of the filaments, and by varying the composition and configuration of the outer shell and/or impact mitigation layer.

Figures 17A, 17B, 17C:
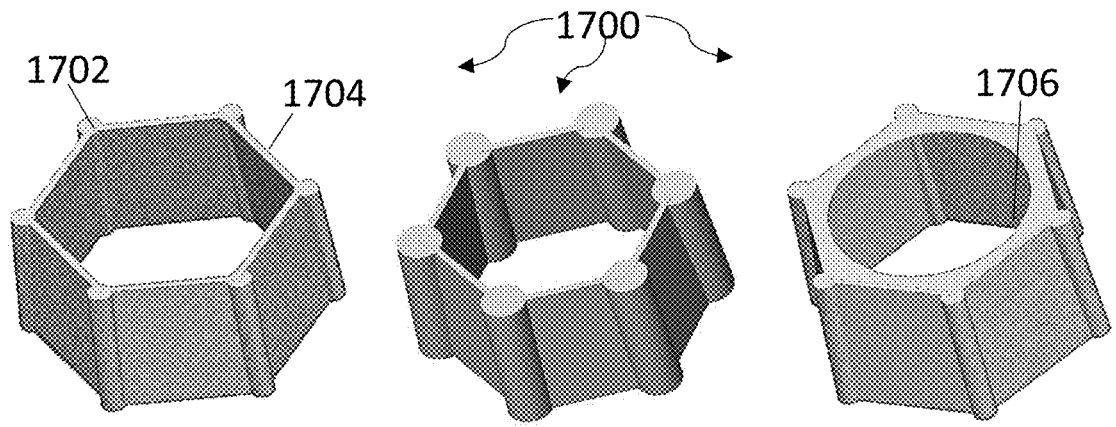
FIG. 17A-17C depicts perspective views of one embodiment of impact mitigation structures comprising a plurality of laterally supported filament (LSF) structures.

In another embodiment, the impact mitigating structures can comprise laterally supported filaments (LSF) 1700. Laterally supported filaments comprise a plurality of filaments 1702 that are interconnected by laterally positioned walls or sheets 1704 in a polygonal configuration. FIGS. 17A-17C illustrate LSF structures 1700, where the filaments 1702 are arranged in a hexagonal pattern interconnected by laterally positioned walls 1704. Alternatively, other regular or irregular polygonal structures and/or configurations known in the art may be contemplated, such as triangular, square, pentagonal, hexagonal, septagonal, octagonal, and/or any combination thereof. A plurality of sheets or lateral walls 1704 can be secured between adjacent pairs of filaments 1702 with each filament having a pair of lateral walls 1704 attached thereto. Alternatively, each of the plurality of filaments 1702 may comprise a lateral wall 1704 extending outwardly therefrom to at least one adjacent filament. In the disclosed embodiment, the lateral walls 1704 can be oriented approximately 120 degrees apart about the filament axis, with each lateral wall 1704 extending substantially along the longitudinal length of the filament 1702. Accordingly, the orientation of the lateral walls 1704 may be asymmetric, which at least one lateral wall 1704 may be oriented approximately 75 to 135 degrees apart about the filament axis. The shape, wall thickness or diameter, height, and configuration of the lateral walls 1704 and/or filaments 1702 may vary as shown in FIGS. 17A-17C to "tune" or "tailor" the structures to a desired performance. For example, one embodiment of a hexagonal structure may have a tapered or frustum configuration as shown in FIG. 17A. The frustum or tapered hexagonal and/or polygonal LSF structure can have a top surface and a bottom surface, with the bottom surface perimeter (and/or bottom surface thickness/diameter of the individual elements) that may be larger than the corresponding top surface perimeter (and/or individual element thickness/diameter). In another example, the hexagonal and/or polygonal LSF structure can have an upper ridge 1706 as shown in FIG. 17C. The upper ridge 1706 can also facilitate connection to another structure, such as an inner surface and/or external surface of a helmet, an item of protective clothing, and/or a mechanical connection (e.g., a grommet or plug having an enlarged tip that is desirably slightly larger than the opening in the upper ridge of the hexagonal and/or polygonal LSF element).

Figures 18A, 18B:
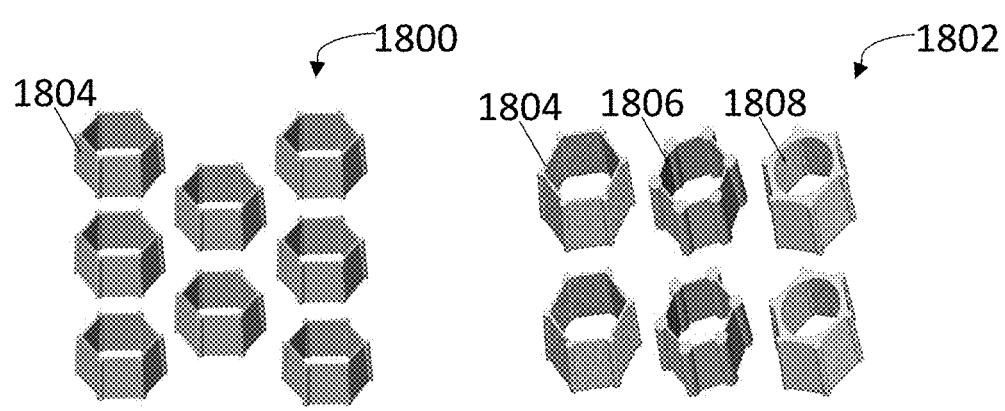
FIG. 18A-18C depicts perspective views of one embodiment of impact mitigation structures comprising a laterally supported filament (LSF) arrays.
Figure 18C:
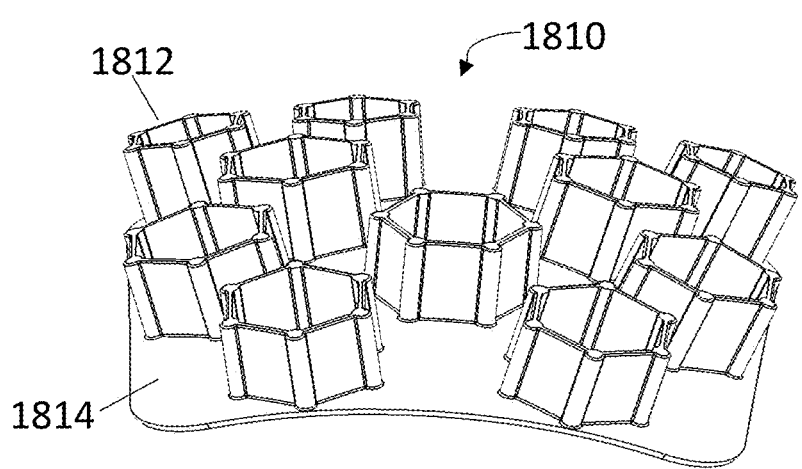

Furthermore, the polygonal or hexagonal LSF structures may be manufactured as individual structures or in a patterned array 1800 (see FIGS. 18A-18C). The individual LSF structures 1802 can be manufactured using an extrusion, investment casting or injection molding process. Also, the patterned array 1800 may comprise LSF structures 1804 may have the same shape and configuration with repeating symmetrical arrangement or asymmetrical arrangement (offset). Alternatively, the patterned array 1802 may comprise different LSF structures 1804, 1806, 1808 shape and configurations with repeating symmetrical arrangement or asymmetrical arrangement (offset). Each of the polygonal and/or hexagonal LSF structures 1802 may be spaced apart from the adjacent polygonal and/or hexagonal LSF structures to allow buckling to occur.

Figure 19A:
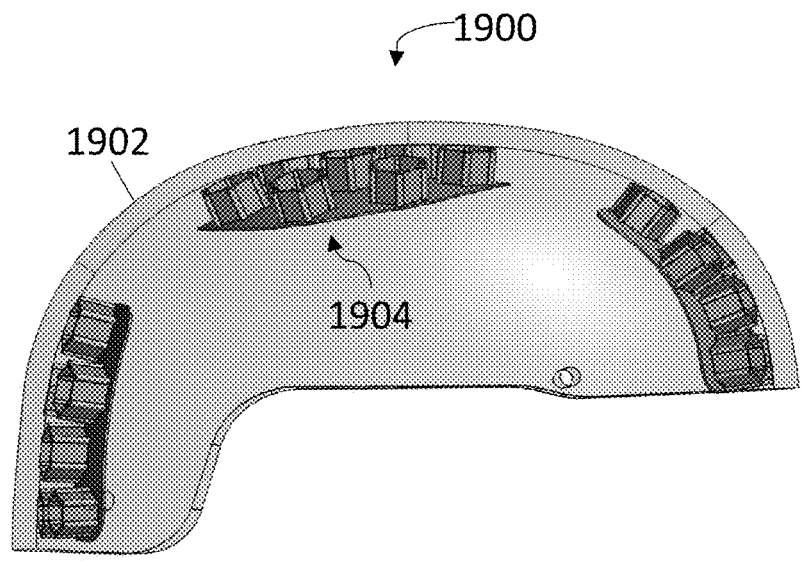
FIG. 19A-19B depicts a cross-section view of a protective garment assembly comprising a laterally supported filament (LSF) arrays.
Figure 19B:
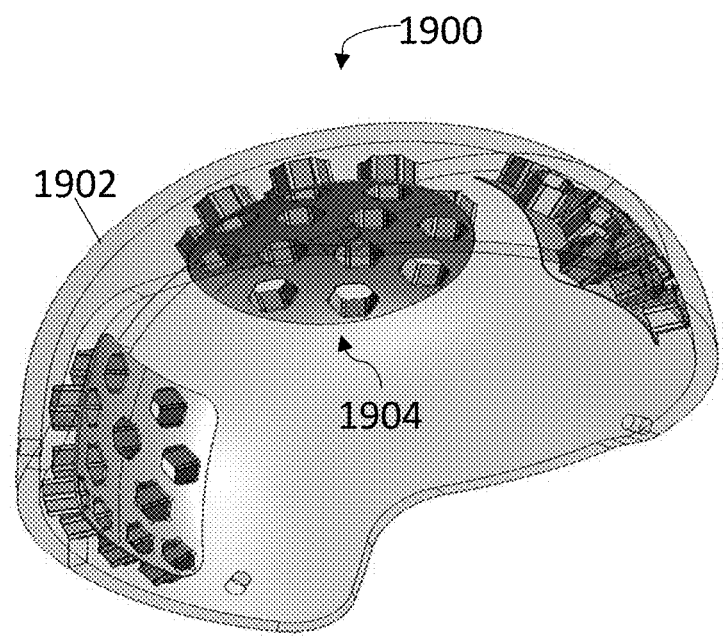

Conversely, the patterned array 1810 may comprise polygonal or hexagonal LSF structures 1812 and at least one base membrane 1814. At least a portion of the polygonal or hexagonal LSF structures 1812 may be affixed to at least one base membrane or base layer 1814. The base membrane 1814 may be manufactured with a polymeric or foam material. The polymeric or foam material may be flexible and/or elastic to allows it to be easily bent, twisted or flexed to conform to complex surfaces. Alternatively, the polymeric and/or foam material may be substantially rigid. The base layer or base membrane 1814 may comprise a plurality of holes and/or perforations to allow ventilation. Affixing each polygonal or hexagonal structures 1812 to at least one base membrane 1814 may be arranged in single, continuous array or plurality of segmented, modular arrays. FIGS. 19A-19B illustrate a side view and perspective view of a plurality of LSF patterned arrays 1904 affixed to different regions within a shell 1902. The shell 1902 having an exterior surface and an interior surface, the plurality of LSF patterned arrays 1904 affixed to different regions on the inner surface of the shell 1902. The different regions may comprise one frontal region (or front), an occipital region (or lower-back), a mid-back region, a parietal region (or midline), and a temporal region (right and/or left sides), the orbit region, the mandible (front, right and/or left side) region, the maxilla region, the nasal region, zygomatic region, the ethmoid region, the lacrimal region, the sphenoid region and/or any combination thereof.

Figure 20A:
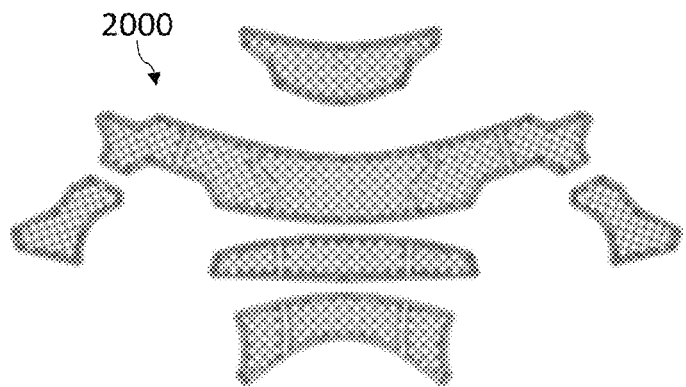
FIG. 20A-20B depicts a front and magnified view of one embodiment of impact mitigation structures comprising auxetic structures.
Figure 20B:
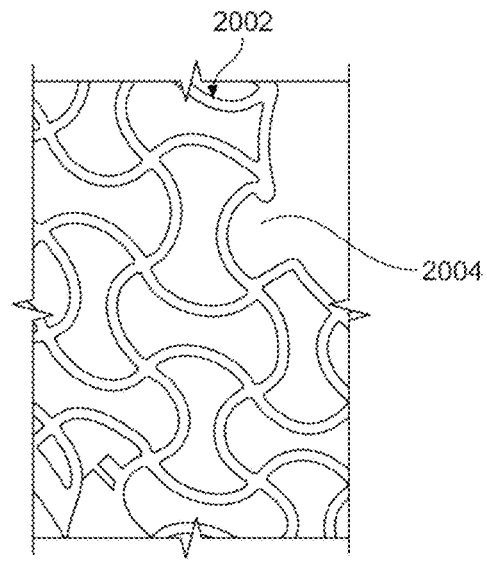
Figure 21:
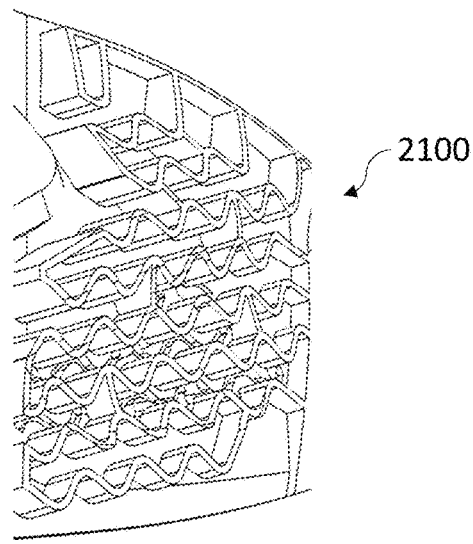
FIG. 21 depicts a perspective view one embodiment of impact mitigation structures comprising undulated structures.

In another embodiment, the impact mitigation structure may comprise auxetic structures 2000 as shown in FIGS. 20A-20B. The auxetic structure 2000 may comprise a single, continuous layer, and/or a plurality of auxetic structures. The auxetic structures 2000 may include a plurality of interconnected members 2002 forming an array of reentrant shapes. The auxetic structures 2000 may be affixed to a base membrane 2004 or directly onto an outer shell and/or a shell. The term "auxetic" generally refers to a material or structure that has a negative Poisson ratio, when stretched, auxetic materials or structures become thicker (as opposed to thinner) in a direction perpendicular to the applied force. Such auxetic structures can result in high energy absorption and/or fracture resistance. In particular, when a force is applied to the auxetic material or structure, the impact can cause it to expand (or contract) in one direction, resulting in associated expansion (or contraction) in a perpendicular direction. It should be recognized that those skilled in the art could utilize auxetic structures 2000 to include differently shaped reentrant shapes or interconnected members 2002 or other structural members and different shaped voids. For example, FIG. 20B illustrates an amplified view of one embodiment of an auxetic structure that is "bone" or "ribbon" shaped with radiused or arced re-entrant shapes.

In another embodiment, the impact mitigation structures may comprise undulated structures 2100. The undulated structures 2100 may comprise chevron pattern, herringbone pattern, and/or zig zag pattern. Such undulated structures 2100 allow large elastic deformations by releasing strain—a structural deformation, then returning to its original configuration after the impact is removed.

In another embodiment, the impact mitigation layer, the first material layer and/or the second material layer may further comprise at least one foam layer, a plurality of foam layers and/or a foam material. The at least one foam layer can include polymeric foams, quantum foam, polyethylene foam, polyurethane foam (foam rubber), XPS foam, polystyrene, phenolic, memory foam (traditional, open cell, or gel), impact absorbing foam (e.g., VN600),), Ethylene Vinyl Acetate foam (EVA), Ariaprene foam, latex rubber foam, convoluted foam ("egg create foam"), Evlon foam, impact hardening foam, 4.0 Custula comfort foam (open cell low density foam) and/or any combination thereof. The at least one foam layer may have an open-cell structure or closed-cell structure. The at least one foam layer can be further tailored to obtain specific characteristics, such as anti-static, breathable, conductive, hydrophilic, high-tensile, high-tear, controlled elongation, and/or any combination thereof. The foam layer and/or material may be positioned on the crown of the wearer's head and conform to the curvature of the wearer's head. The portion of a foam layer may have a depth, length and a height. The depth may vary at a range between 0.5 inches to 2 inches. The length and/or height may vary from 2 inches to 12 inches.

Custom Pad Assemblies

The custom manufactured pad assemblies (e.g., an internal padding system) can be fabricated via 3D printing and/or conventional manufacturing methods and coupled to a standard helmet design to create a personalized helmet system for a wearer. The custom manufactured pad assemblies may be configured to match or substantially correspond to the wearer's unique anatomical features, which provides significantly improved fit and comfort for the wearer. More specifically, the custom pad assembly is fabricated to either match or substantially correspond to the wearer's anatomical features, namely the topography and contours of the wearer's head and facial region, including the jaw region. However, other anatomical features may be considered that require protection of the body. For example, protective equipment worn by football players for production of anatomical features of the body during the course of a football game may require protection for the neck, shoulders, hip, arm, elbow, tailbone, thighs, back, knees, ribs, groin and/or any combination thereof.

Accordingly, the custom manufactured fit pod assembly (defined as one or more individual custom manufactured fit pods) that corresponds to the correct location or region within the standard helmet and/or wearer's specific anatomical region to maximize comfort, fit and/or safety.

In one exemplary embodiment, the one or more individual custom manufactured fit pod assemblies may be coupled to an inner surface of a helmet in any configuration within. In one embodiment, the pad assemblies may be positioned around the circumference of the wearer's anatomical features, namely the wearer's head. The one or more custom pad assemblies' may positioned in one or more of the following regions of a wearer's head: a frontal assembly (or front), a crown assembly, an occipital assembly (or lower-back), a mid-back assembly, a parietal assembly (or mid-line), and a temporal assembly (right and/or left sides), and/or any combination(s) thereof. The standard helmet may comprise an outer layer. The standard helmet may further comprise an inner layer, and/or an impact mitigation layer, the impact mitigation layer being disposed between the outer layer and inner layer.

The custom pad assemblies can comprise a generally triangular shaped body with rounded corners (an isosceles triangle, for example), although a variety of other shapes, including ovals, triangles, squares, pentagons, hexagons, septagons and/or octagon shapes, could be utilized in a variety of embodiments. In a similar manner, alternative shapes having rounded and/or sharp corners and/or edges may be utilized, as well as irregular and/or re-entrant shaped bodies, if desired.

The one or more custom manufactured fit pod assemblies can be provided in a series of sizes and/or thicknesses. The one or more custom manufactured fit pod assemblies may have a range of thickness between ¼" Thickness Progressively Up to 1.25" or Greater thickness (preferably, 0.25 inches or greater). Desirably, the different thickness custom manufactured fit pod assemblies can be provided with similar external dimensions (i.e., height and/or width), with only the thickness differing to any substantial degree, allowing different thickness fit pods to be "mixed and matched" for use with a single helmet liner or other component, and/or other item of protective clothing.

Figure 22:
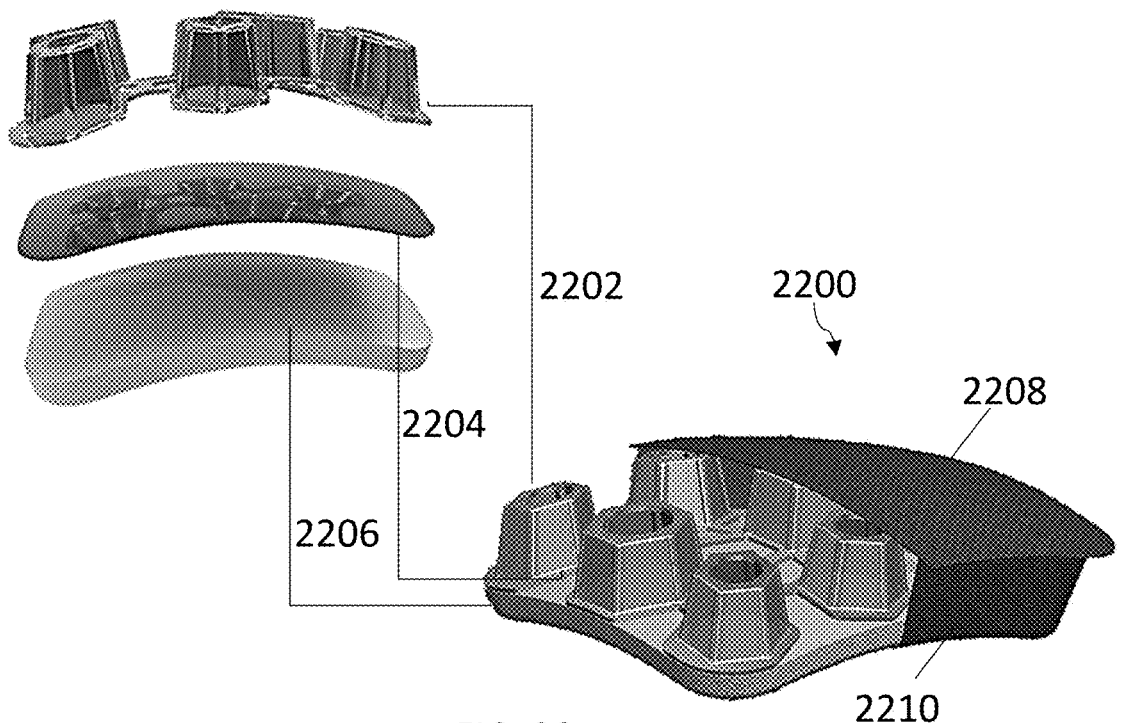
FIG. 22 depicts perspective views of one embodiment of a custom impact mitigation pad.

In another embodiment, the impact mitigation layer and/or liners may comprise one or more impact mitigation pads assemblies 2200. FIG. 22 depicts one embodiment of an impact mitigation pad or pad assembly 2200. The one or more impact mitigation pads 2200 may comprise a first material layer 2208 and a second material layer 2210. The one or more impact mitigation pads 2200 may further comprise a microlattice layer or an impact mitigation layer and/or a microlattice layer and an impact mitigation layer. The microlattice layer and/or the impact mitigation layer disposed between the first material layer 2208 and the second material layer 2210. The one or more impact mitigation pads may further comprise a microlattice layer, a force distribution layer 2204 and/or a foam layer 2206. The first material layer 2208 and/or the second material layer 2210 may comprise a 2-way stretch material, a 4-way stretch material, and/or a foam material or layer. Additionally, the first material layer 2208 and/or the second material layer 2210 may further comprise a polymeric material, such as polypropylene, polyethylene, polyester, nylon, PVC, PTFE, and/or any combination thereof. The first material layer 2208 may be the same material or a different material to the second material layer 2210. Furthermore, the first material 2208 and/or the second material layer 2210 may be breathable and wick away moisture easily from the skin while carrying out various sporting and athletic activities. For example, the first material 2208 and/or the second material layer 2210 may completely or continually cover an entire array of impact mitigating structures (not shown). Conversely, the first material 2208 and/or the second material layer 2210 may cover at least a portion of an entire array of impact mitigating structures. Furthermore, the covering may cover segmented arrays of impact mitigating structures or individual impact mitigating structures (not shown). The plurality of impact mitigation structures may comprise a plurality of filaments, one or more laterally supported filaments (LSF) structures, one or more auxetic structures, one or more undulated structures, a microlattice structure or layer, and/or any combination thereof.

Figure 23A:
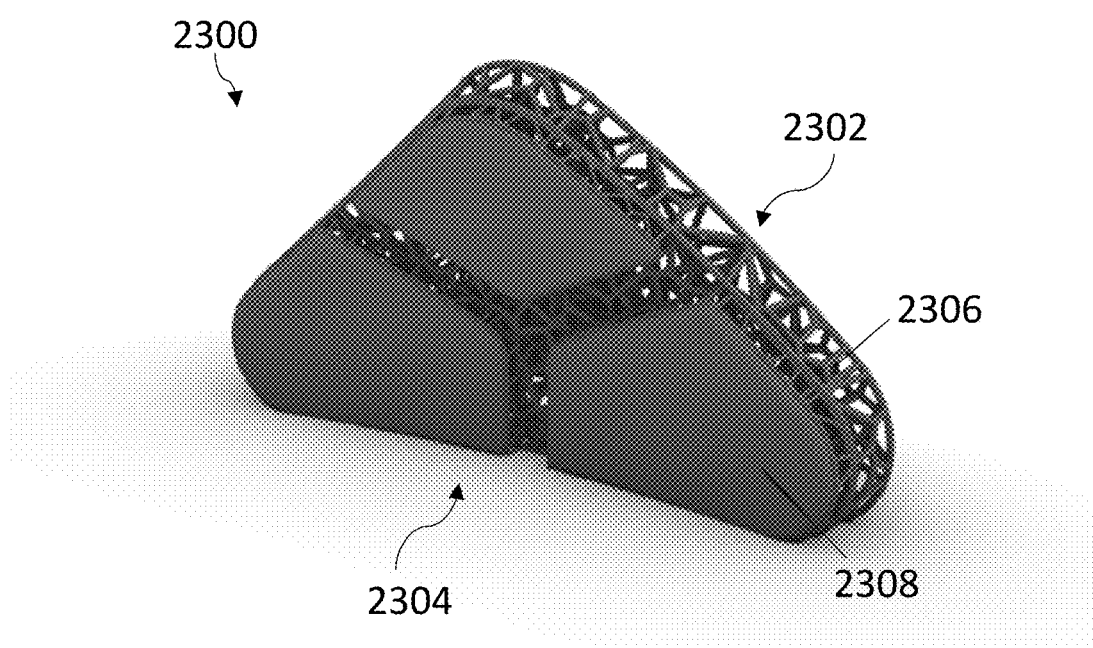
FIGS. 23A-23B depicts isometric views of an alternate embodiment of a custom impact mitigation pad.
Figure 23B:
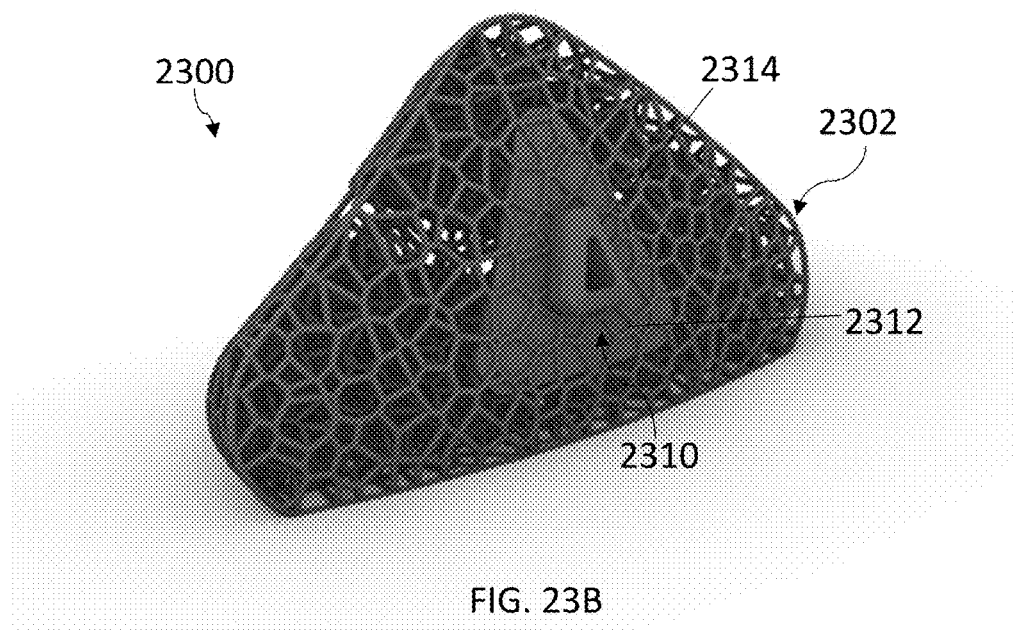

FIGS. 23A-23B depicts isometric views of an alternate embodiment of a pad assembly 2300. A pad assembly 2300 comprising: a first pad layer 2302, the first pad layer 2302 comprises one or more microlattice structures 2306, the one or more microlattice structures 2306 comprising a plurality of interconnected filament units, each of the plurality of interconnected filament units comprises a node, at least three filaments, and at least three interior angles, the at least three filaments extending in different directions from the node, the at least three interior angles disposed between each of the at least three filaments, the one or more microlattice structures 2306 including a top surface and a bottom surface; and a connection mechanism 2310, at least a portion of the connection mechanism 2310 disposed onto a portion of the bottom surface of the one or more microlattice structures 2306. The at least a portion of the top surface matches at least one contour of a wearer's anatomical feature. The at least portion of the bottom surface matches at least one contour of an interior surface of a helmet and/or an interior surface of an inner shell. The at least three filaments or the plurality of interconnected filament units having a cross-section, the cross-section having a surface area, the surface area is between 0.01-20 mm$^2$. The at least three filaments or the plurality of interconnected filament units comprising a material, the material including a thermoset elastomer or a thermoplastic elastomer. The material comprising a Young's modulus range of 1 to 10,000 MPa. The at least three interior angles comprises a range of 30 degrees to 75 degrees. The cross-section is uniform or non-uniform along a longitudinal axis of the plurality of filaments. The cross-section is solid or hollow.

The first pad layer 2302 further comprises first material layer and a second material layer, the one or more microlattice structures 2306 disposed between the first material layer and the second material layer. The at least a portion of the first material layer matches at least one contour of a wearer's anatomical feature. The at least portion of the second material layer matches at least one contour of an interior surface of a helmet and/or an interior surface of the inner shell. The first material layer or the second material layer comprises a one or more foam layers and/or foam materials. The first material layer and the second material layer comprises one or more foam layers and/or foam materials. The first material layer or second material layer may extend laterally across a top surface or bottom surface of the first pad layer. The first material layer or second material layer may comprise a plurality of plates 2308, the plurality of plates 2308 are spaced apart and arranged symmetrically. Alternatively, the plurality of plates 2308 are spaced apart and arranged asymmetrically.

The connection mechanism 2310 may comprise a mechanical attachment. The connection mechanism 2310 comprises a base 2312 and a post 2314. The post 2314 extends upwardly away from the base 2312. The post 2314 comprises a shape, the shape includes a triangle. The shape may also further include an oval, a polygon and/or irregular polygon. The shape is sized and configured to be disposed within an aperture located on an interior surface of a helmet and/or an aperture located on an interior surface of an inner shell.

Figure 24:
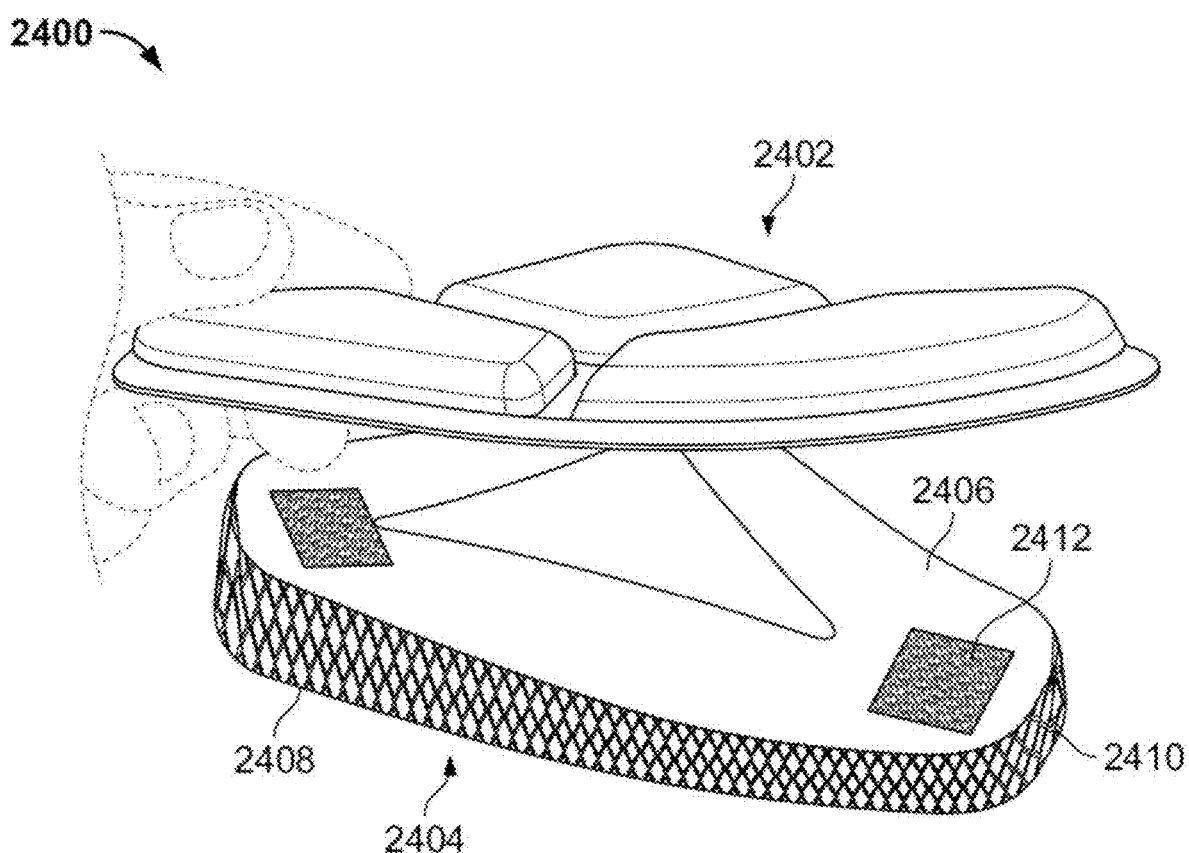
FIG. 24 depicts isometric views of an alternate embodiment of a custom impact mitigation pads.

FIG. 24 depicts an isometric view of an alternate embodiment of a pad assembly 2400. The pad assembly comprising a first pad layer 2404, the first pad layer 2404 comprises a first material layer 2406, a second material layer 2408 and at least one microlattice structure 2410, the at least one microlattice structure 2410 comprises a plurality of nodes, a plurality of filaments and a plurality of interior angles, the plurality of filaments intersecting creating the plurality of nodes, the plurality of filaments extending in different orientations, the plurality of interior angles disposed between the plurality of filaments, the at least one microlattice structure disposed between the first material layer 2406 and the second material layer 2408; a second pad layer 2402, the second pad layer 2402 disposed onto a least a first material layer 2406 of the first pad layer 2404; and a connection mechanism 2412, at least a portion of the connection mechanism 2412 disposed onto a portion of the second material layer 2408. Alternatively, the connection mechanism 2412 may be disposed onto the first material layer 2406 and/or the first material layer 2406 and the second material layer 2408 of the first pad layer 2404. The at least a portion of the first material layer 2406 matches at least one contour of a wearer's anatomical feature. The at least portion of the second material layer 2408 matches at least one contour of an interior surface of a helmet. The plurality of filaments having a cross-section, the cross-section having a surface area, the surface area is between 0.01-20 mm$^2$. The plurality of filaments comprising a material, the material including a thermoset elastomer or a thermoplastic elastomer. The material comprising a Young's modulus range of 1 to 10,000 MPa. The cross-section is solid or hollow. The at least a portion of the second pad layer comprises at least one surface that matches at least one contour of a wearer's anatomical feature. The second pad layer comprises a plurality of plates that are spaced apart.

The connection mechanism 2412 may comprise Velcro. The connection mechanism may be disposed onto a portion of the first material layer 2406, the second material layer 2408, and/or the first material layer 2406 and the second material layer 2408 of the first pad layer 2404. The connection mechanism 2412 may a single piece that extends across an entire first material layer 2406 and/or the second material layer 2408 and/or a least a portion of the first material layer 2406 or the second material layer 2408. The connection mechanism 2412 may be a plurality of connection mechanisms 2412 or pieces that are spaced apart and positioned onto a first material layer 2406 and/or the second material layer.

Microlattice Embodiments

FIGS. 1A-1E depicts side views of different embodiments of a microlattice impact mitigation layers and/or structures. The microlattice layer and/or structure 100 comprises an array of a plurality of interconnected filaments 102,104 and a plurality of nodes 106, the plurality of nodes 106 being defined as the intersections between the plurality of interconnected filaments 102,104. The array of the plurality of interconnected filaments 102,104 may be spaced apart and arranged in parallel or offset to create repeating rows, the repeating rows are colinear or non-colinear to the preceding and/or adjacent row. The plurality of interconnected filaments 102, 104 may be oriented at an angle 108 that is perpendicular to a surface or node 106 and/or non-perpendicular to a surface or node 106. The angle 108 that is perpendicular to a surface or node 106 being 90 degrees. The angle 108 that is non-perpendicular to a surface or node 106 being less than or greater than 90 degrees. In one embodiment, angle 108 is 1 degree to 89 degrees. In another embodiment, the angle 108 is 15 degrees to 75 degrees. In another embodiment, the angle is 30 degrees to 60 degrees.

In another embodiment, microlattice layer and/or structure 100 comprises a first plurality of filaments 102 and a second plurality of filaments 104, the first plurality of filaments 102 and the second plurality filaments having at least two nodes 106, the at least two nodes 106 being defined as the intersection between the first plurality of filaments 102 and the second plurality of filaments 104. The first plurality of filaments 102 and the second plurality of filaments 104 having a longitudinal axis. The first plurality of filaments 102 oriented in a first angle relative to a surface or a node 106 and a second plurality of filaments 104 oriented in a second angle relative to a surface or a node 106. The first angle and the second angle are different. The first angle and the second angle is the same. The first and/or second angle comprises a perpendicular angle to a surface or node and/or non-perpendicular angle to a surface or a node. The first and/or second angle 108 that is perpendicular to a surface or node 106 being 90 degrees. The first and/or second angle 108 that is non-perpendicular to a surface or node 106 being less than or greater than 90 degrees. In one embodiment, first and/or second angle 108 is 1 degree to 89 degrees. In another embodiment, the first and/or second angle 108 is 15 degrees to 75 degrees. In another embodiment, the first and/or second angle is 30 degrees to 60 degrees.

Figure 1D:
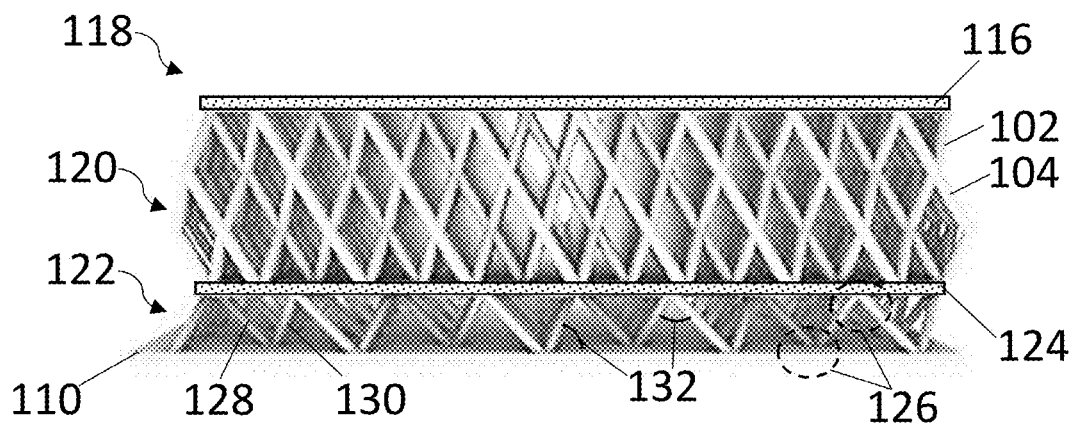
Figure 1E:
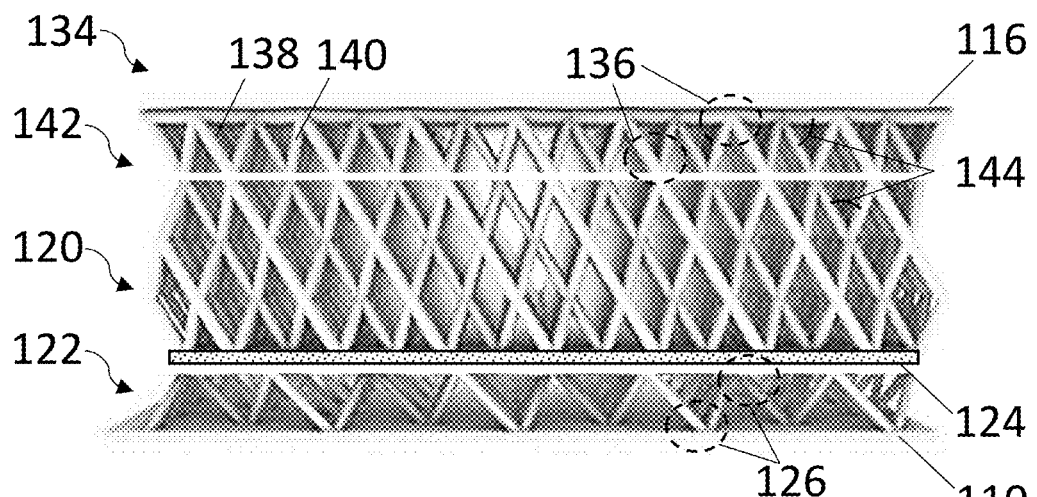

FIGS. 1D-1E depicts another embodiment of a stacked microlattice layer and/or structure 118 comprising two or more microlattice layers and/or structures 120,122 stacked on top of each other. Accordingly, the microlattice structure and/or layer 118 comprises a first microlattice layer and/or structure 120 and a second microlattice layer and/or structure 122. The stacked microlattice layers may further comprise at least material layer 110. The stacked microlattice layers may further comprise a first material layer 110, and intermediate material layer 124 and/or a second material layer 116, and/or any combination thereof. A plurality of microlattice layers 120,122 may be included. In one embodiment, each of the first and second microlattice structure and/or layers 120,122 may be the same or similar to the microlattice structure 100 described above with reference to FIGS. 1A-1C. The first microlattice layer and/or structure 120 may be coupled to the second microlattice layer and/or structure 122. The second microlattice layer and or structure 122 plurality of nodes 126 may be aligned colinear with at least a portion of the one or more nodes 106 of the first microlattice layer and/or structure 120. Alternatively, the second microlattice layer and or structure 122 plurality of nodes 126 may be aligned offset with at least a portion of the one or more nodes 106 of the first microlattice layer and/or structure 120. The first microlattice layer and/or structure 120 may comprise the same strength and stiffness as the second microlattice layer and/or structure 122. Alternatively, the first microlattice layer and/or structure 120 may comprise a different strength and stiffness as the second microlattice layer and/or structure 122. The first microlattice layer and/or structure 120 may comprise the same microlattice density as the second microlattice layer and/or structure 122. Alternatively, the first microlattice layer and/or structure 120 may have a different microlattice density as the second microlattice layer and/or structure 122. The first microlattice layer and/or structure 120 may comprise the compressive strain as the second microlattice layer and/or structure 122. Alternatively, the first microlattice layer and/or structure 120 may comprise a different compressive strain as the second microlattice layer and/or structure 122.

In the illustrated embodiment, the first and second microlattice layers 120,122 comprises an array of a plurality of interconnected filaments 128,130 and a plurality of nodes 126, the plurality of nodes 126 being defined as the intersections between the plurality of interconnected filaments 128,130. The array of the plurality of interconnected filaments 128,130 may be spaced apart and arranged in parallel or offset to create repeating rows, the repeating rows are colinear to the preceding and/or adjacent row. The plurality of interconnected filaments 128,130 may be oriented at an interior angle 132 that is perpendicular to a surface or node 126 and/or non-perpendicular to a surface or node 126. The interior angle 132 that is perpendicular to a surface or node 126 being 90 degrees. The interior angle 132 that is non-perpendicular to a surface or node 126 being less than or greater than 90 degrees. In one embodiment, angle 132 is 1 degree to 89 degrees. In another embodiment, the interior angle 108 is 15 degrees to 75 degrees. In another embodiment, the interior angle 132 is 30 degrees to 60 degrees. The interior angle 132 on the second microlattice layer and/or structure 122 may be the same angle 106 on the first microlattice layer and/or structure. Alternatively, the angle 132 on the second microlattice layer and/or structure 122 may be a different angle 106 on the first microlattice layer and/or structure.

Figure 2A:
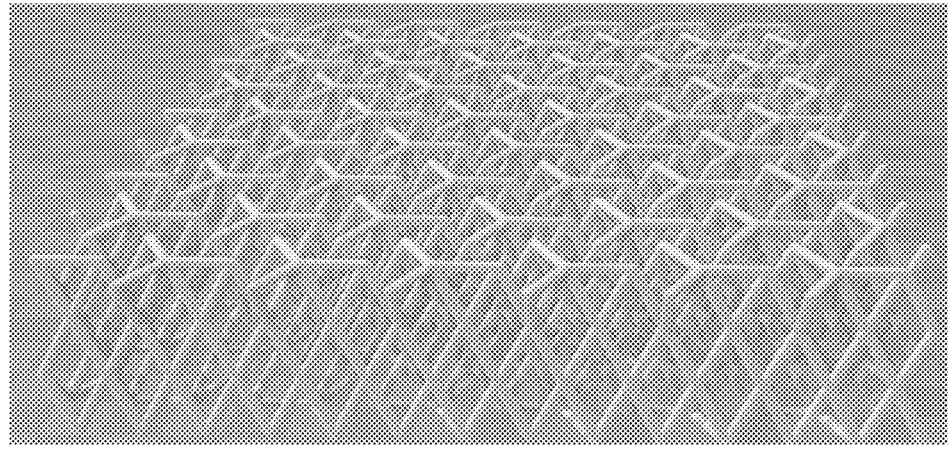
FIGS. 2A-2C depicts various views of an alternate embodiment of microlattice layer and/or structure.
Figure 2B:
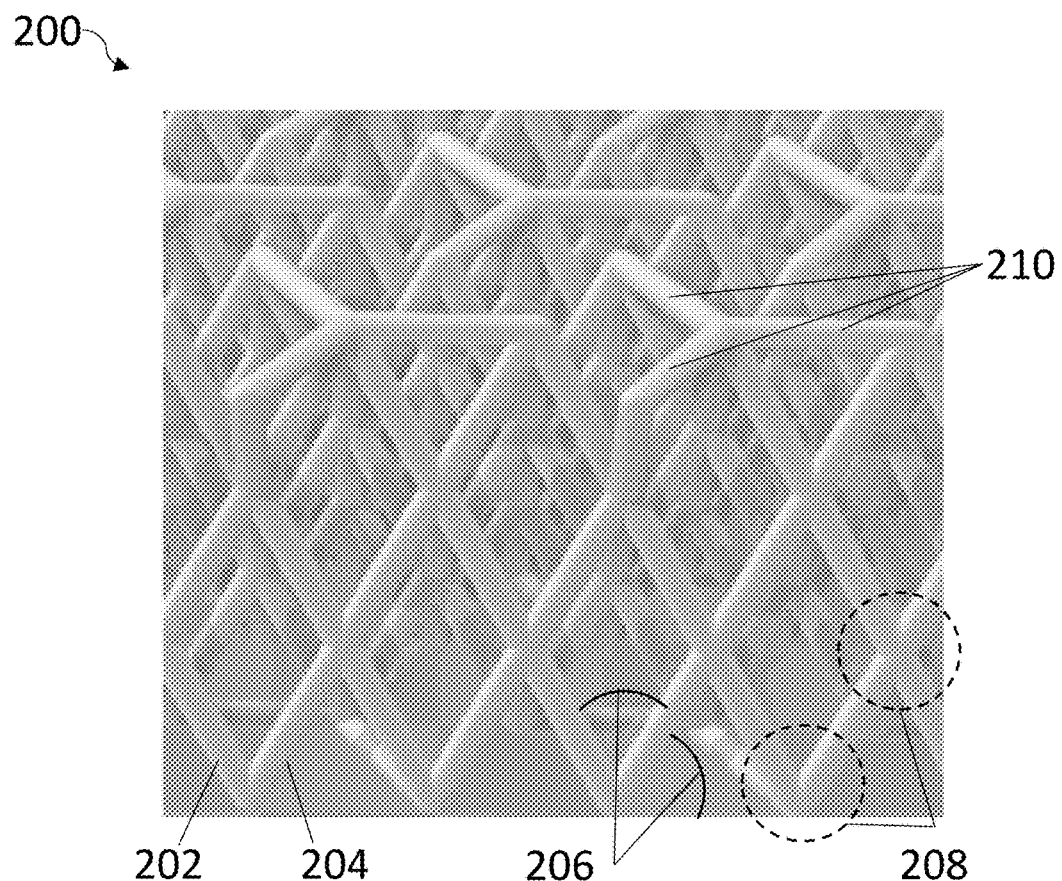

FIGS. 2A-2B depicts an isometric view and magnified view of an alternate embodiment of a microlattice layer and/or structure 200. The microlattice layers and/or structures 200 may comprise a plurality of interconnected filaments 202,204, a plurality of nodes 208 and a plurality of connecting members 210. The microlattice layer and/or structures 200 may further comprise at least one material layer (not shown). The microlattice layer and/or structures 200 may further comprise a second material layer (not shown) and/or an intermediate material layer (not shown). The plurality of nodes 208 comprising intersections between the plurality of interconnected filaments 202,204, the plurality of nodes formed at the points of convergence of between the plurality of interconnected filaments 202,204. The plurality of interconnected filaments 202,204 may extend in two or more different directions. Alternatively, the plurality of interconnected filaments 202,204 may extend in three or more different directions. The plurality of connecting members 210 connect and/or couple between the plurality of interconnected filaments 202,204, between the plurality of nodes 208, and/or between the plurality of nodes 208 and the plurality of interconnected filaments 202,204. The plurality of connecting members 210 may further connect between the plurality of interconnected filaments 202, 204 and the adjacent plurality of interconnected filaments 202, 204. The plurality of connecting members 210 may extend laterally and/or substantially laterally between the plurality of interconnected filaments 202,204 and/or the adjacent plurality of interconnected filaments 202,204. The plurality of connecting members 210 may further connect laterally and/or substantially laterally between the plurality of interconnected filaments 202, 204 and the adjacent plurality of interconnected filaments 202, 204. The plurality of connecting members 210 may be disposed on at least a top surface and/or at least a bottom surface of the microlattice layer 200. The plurality of connecting members 210 may be disposed a top portion and/or bottom portion of the plurality of interconnected filaments or the plurality of filaments 202,204. The plurality of connecting members 210 may be disposed on an intermediate portion of the plurality of interconnected filaments or the plurality of filaments 202, 204, the intermediate portion being any position between the top portion and/or bottom portion of the plurality of interconnected filaments or the plurality of filaments 202,204.

Figure 2C:
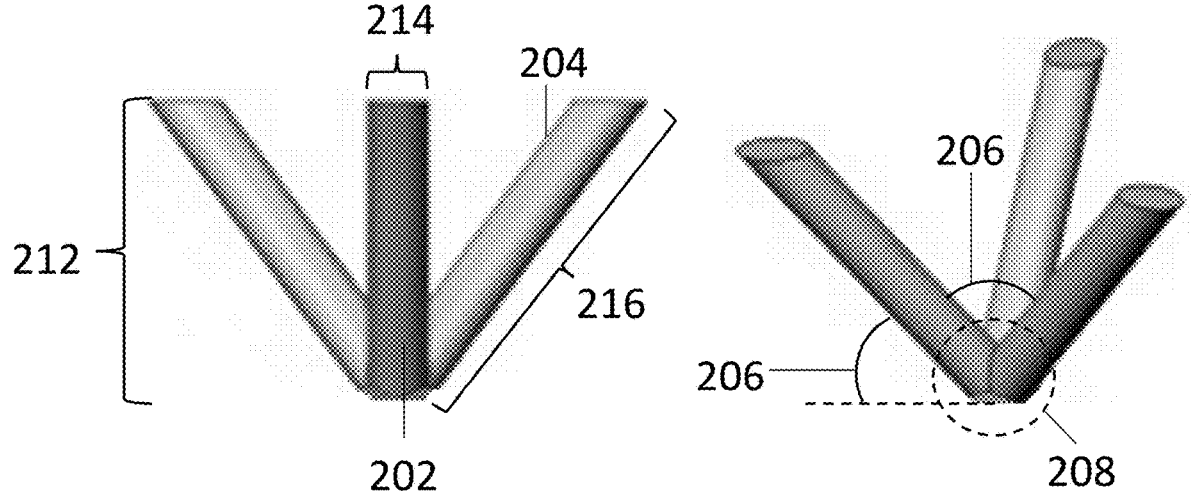

In another embodiment, the microlattice impact mitigation layer and/or structure 200 comprises a plurality of filament units 218 as shown in FIG. 2C. The microlattice layer and/or structure 200 may further comprise at least one material layer or a first material layer (not shown). Accordingly, the microlattice layer and/or structure 200 may further comprise a second material layer and/or an intermediate material layer. The plurality of filament units 218 comprise a variety of geometric shapes. The geometric shapes comprise 3D array (pyramidal square, pyramidal triangle, tetrahedral, kagome) and/or a 3D colinear array (diamond textile, diamond, hexagon, and square). The collinearity is being defined as having the plurality of filament units arranged in repeating rows, the repeating rows may be parallel or offset to the adjacent and/or preceding row. The plurality of filament units comprises a plurality of nodes 208, a plurality of filaments 202,204 and a plurality of interior angles 206, and a plurality of connecting members. The plurality of filaments 202,204 extend from each of the plurality of nodes 208. The plurality of interior angles disposed between the plurality of filaments, and the plurality of interior angles comprise 1 to 89 degrees. The filament unit size 212, filament dimensions (e.g. filament width or diameter 214 and filament length 216) and/or filament interior angles 206. Furthermore, the filament unit density and filament unit orientation (not shown) may be varied to achieve the specific performance attributes. The filament units having a longitudinal axis, the filament units being rotated 1 to 89 degrees from its longitudinal axis. The plurality of connecting members 210 may extend laterally and/or substantially laterally between the plurality of filaments 202,204 and/or the adjacent plurality of filaments 202,204. The plurality of connecting members 210 may further connect laterally and/or substantially laterally between the plurality of i filaments 202, 204 and the adjacent plurality of filaments 202, 204. The plurality of connecting members 210 may be disposed on at least a top surface and/or at least a bottom surface of the microlattice layer 200. The plurality of connecting members 210 may be disposed a top portion and/or bottom portion of the plurality of interconnected filaments or the plurality of filaments 202,204. The plurality of connecting members 210 may be disposed on an intermediate portion of the plurality of interconnected filaments or the plurality of filaments 202,204, the intermediate portion being any position between the top portion and/or bottom portion of the plurality of interconnected filaments or the plurality of filaments 202,204.

FIGS. 3A-3F and FIGS. 4A-4B depict various isometric views of an alternate embodiment of a microlattice layer and/or structure 300. The microlattice layers and/or structures 300 may comprise a plurality of interconnected filaments 302,304, a plurality of nodes 308 and a plurality of connecting members 310. The microlattice layer and/or structures 300 may further comprise at least one material layer (not shown). The microlattice layer and/or structures 300 may further comprise a second material layer (not shown) and/or an intermediate material layer (not shown). The plurality of nodes 308 comprising intersections between the plurality of interconnected filaments 302,304, the plurality of nodes 308 formed at the points of convergence of between the plurality of interconnected filaments 302,304. The plurality of interconnected filaments 302,304 may extend in two or more different directions. Alternatively, the plurality of interconnected filaments 302,304 may extend in three or more different directions. The plurality of connecting members 310 connect and/or couple between the plurality of interconnected filaments 302,304, between the plurality of nodes 308, and/or between the plurality of nodes 308 and the plurality of interconnected filaments 302,304. The plurality of connecting members 310 may further connect between the plurality of interconnected filaments 302, 304 and the adjacent plurality of interconnected filaments 302, 304. The plurality of connecting members 310 may extend laterally and/or substantially laterally between the plurality of interconnected filaments 302,304. The plurality of connecting members 310 may further connect laterally and/or substantially laterally between the plurality of interconnected filaments 302,304 and the adjacent plurality of interconnected filaments 302, 304. The plurality of connecting members 310 may be disposed on at least a top surface and/or at least a bottom surface of the microlattice layer 300. The plurality of connecting members 310 may be disposed a top portion and/or bottom portion of the plurality of interconnected filaments or the plurality of filaments 302, 304. The plurality of connecting members 310 may be disposed on an intermediate portion of the plurality of interconnected filaments or the plurality of filaments 302, 304, the intermediate portion being any position between the top portion and/or bottom portion of the plurality of interconnected filaments or the plurality of filaments 302,304.

Figure 3A:
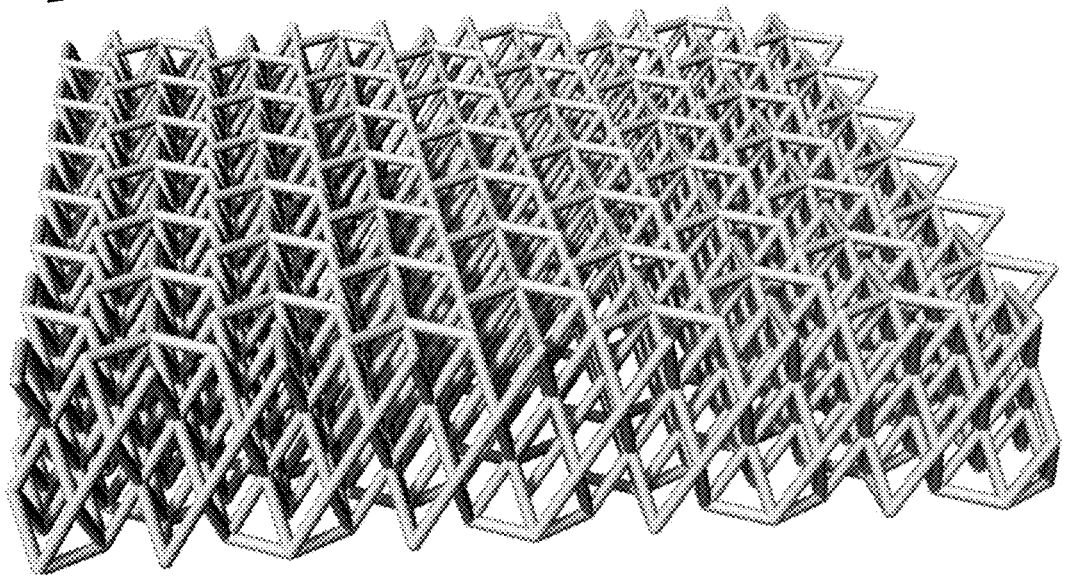
FIGS. 3A-3F depicts various views of an alternate embodiment of microlattice layer and/or structure.
Figure 3B:
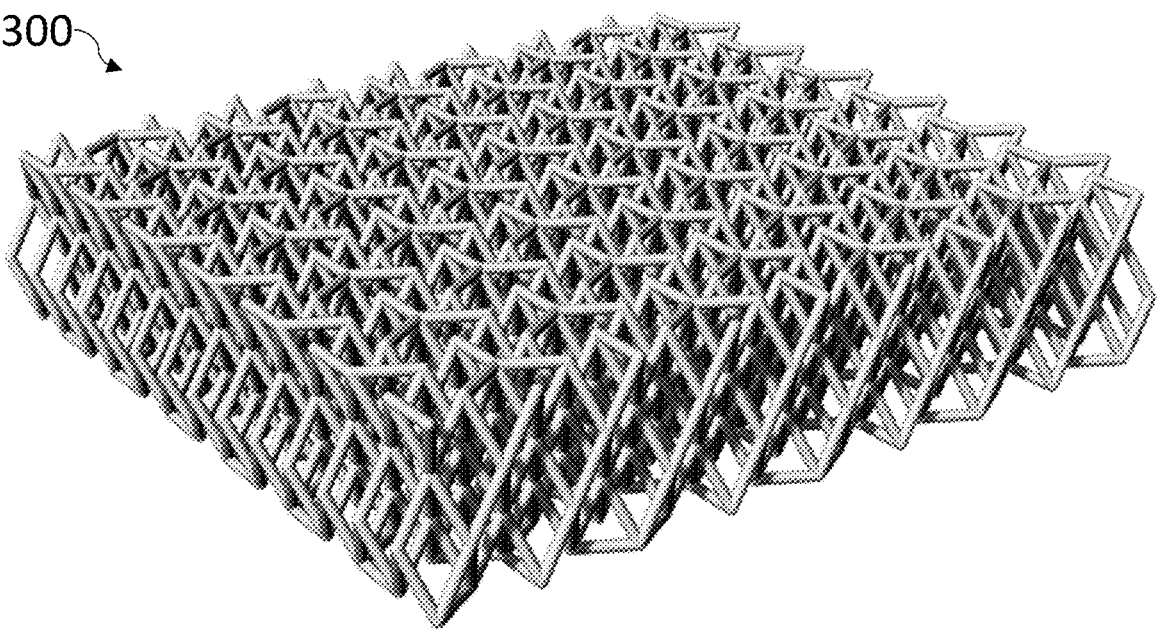
Figure 3C:
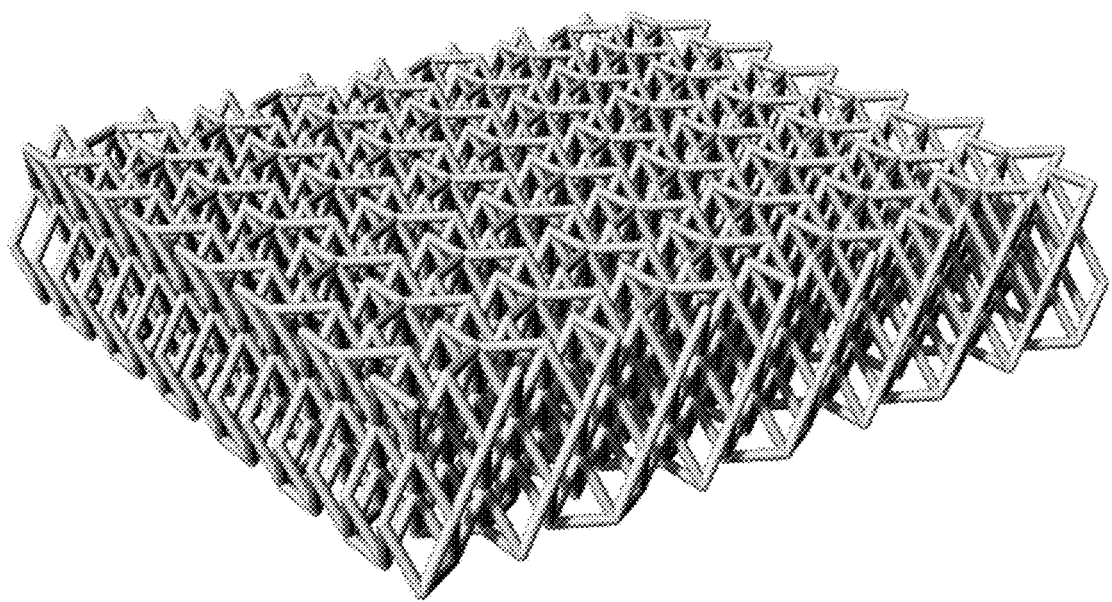
Figure 3D:
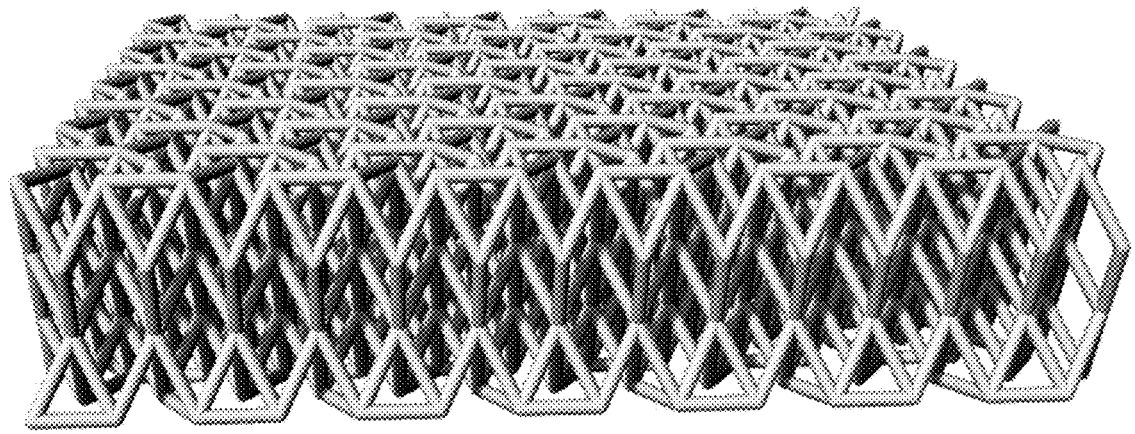
Figure 3E:
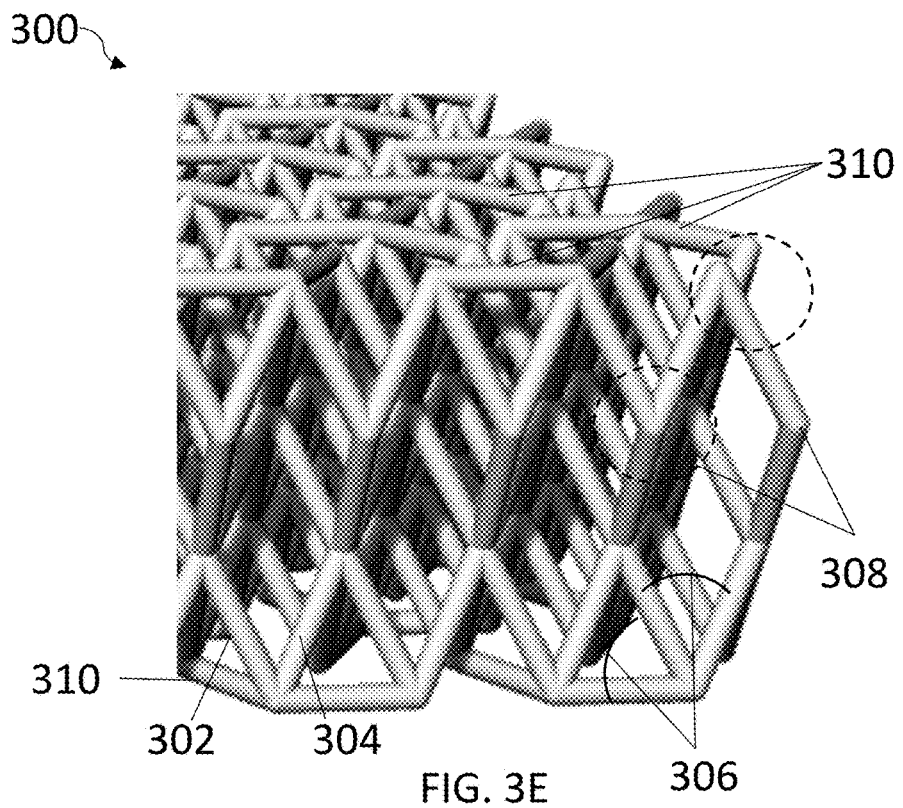
Figure 3F:
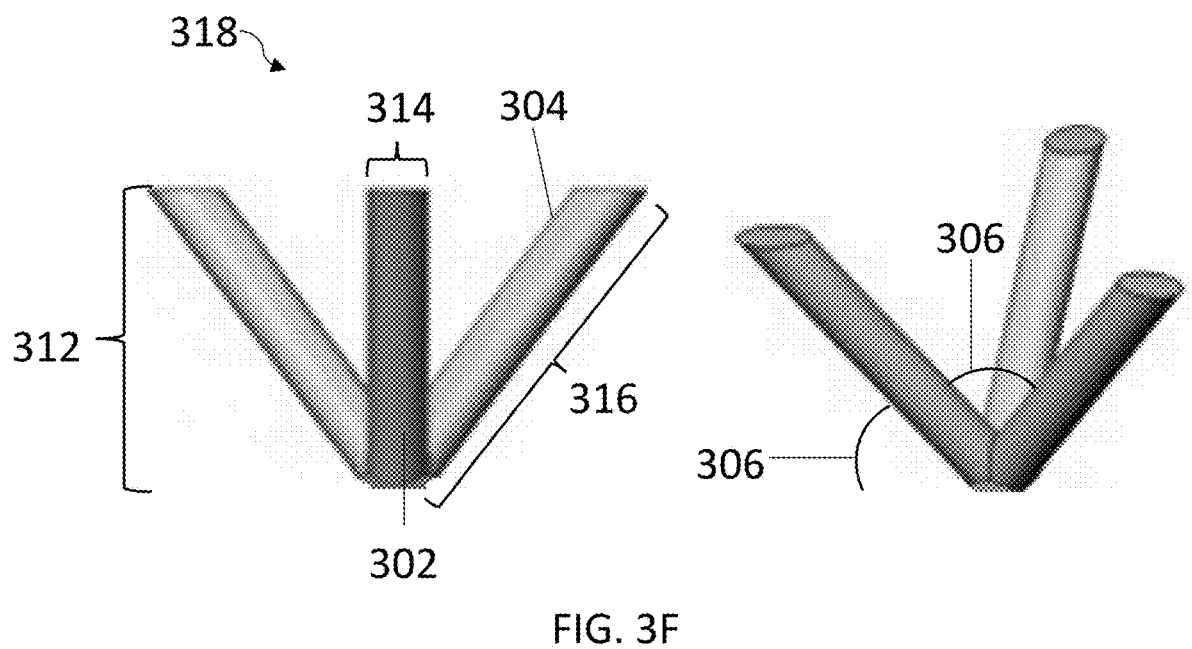
Figure 4A:
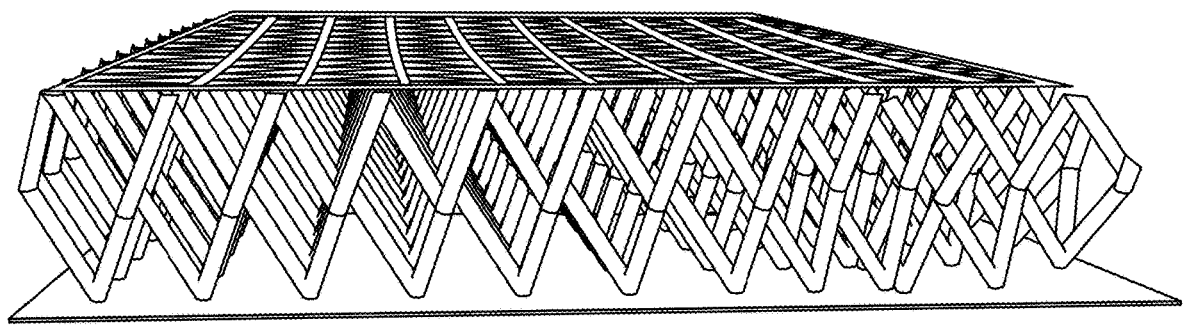
FIGS. 4A-4B depicts various views of an alternate embodiment of microlattice layer and/or structure.
Figure 4B:
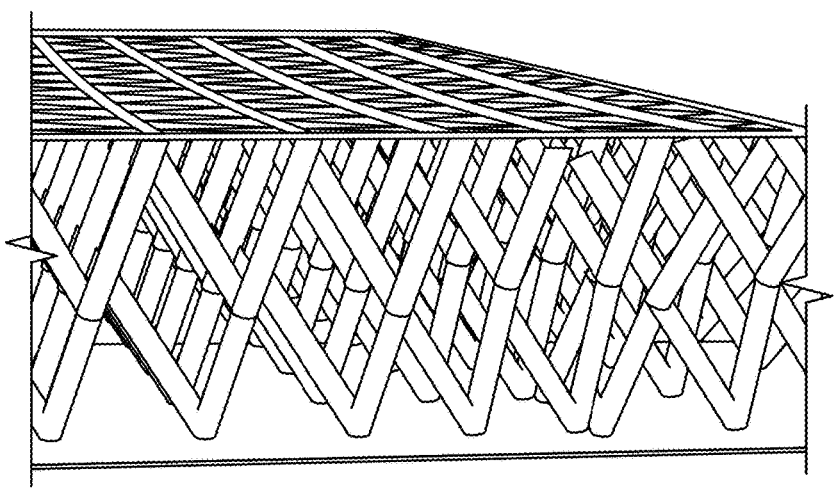
Figure 5A:
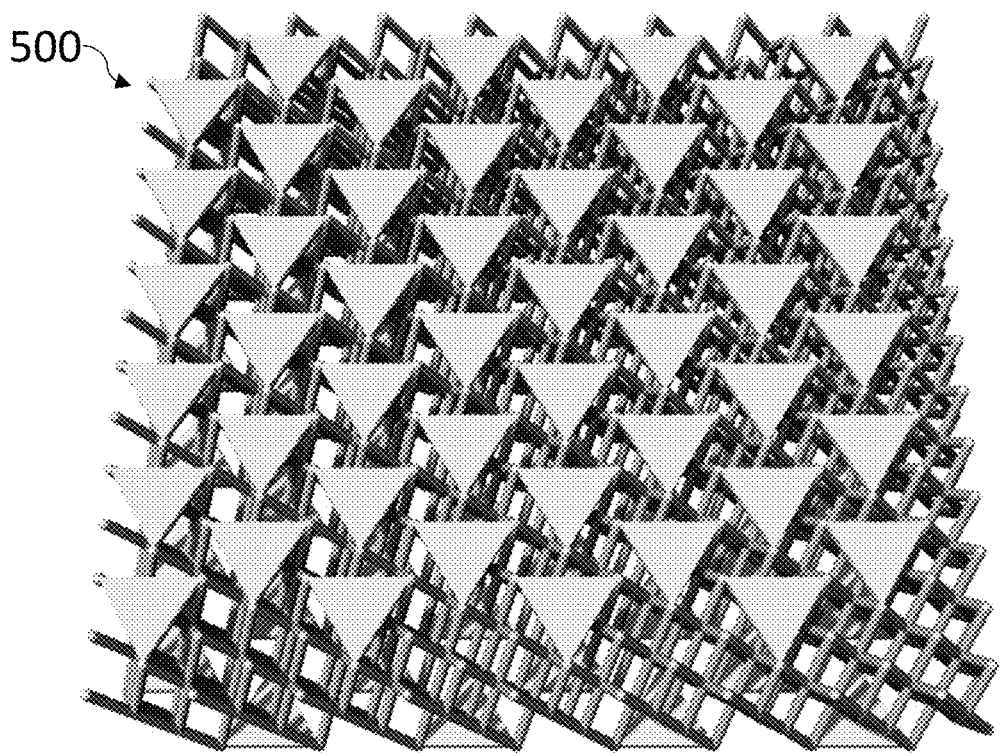
Figure 5B:
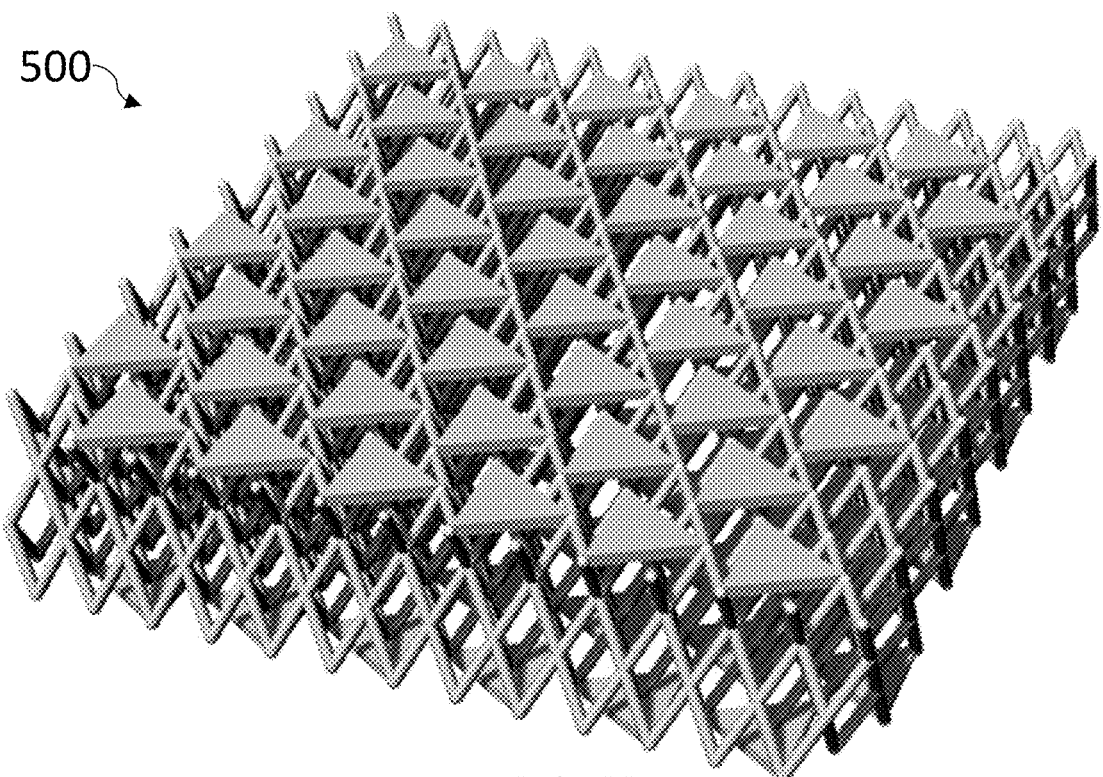
Figure 5C:
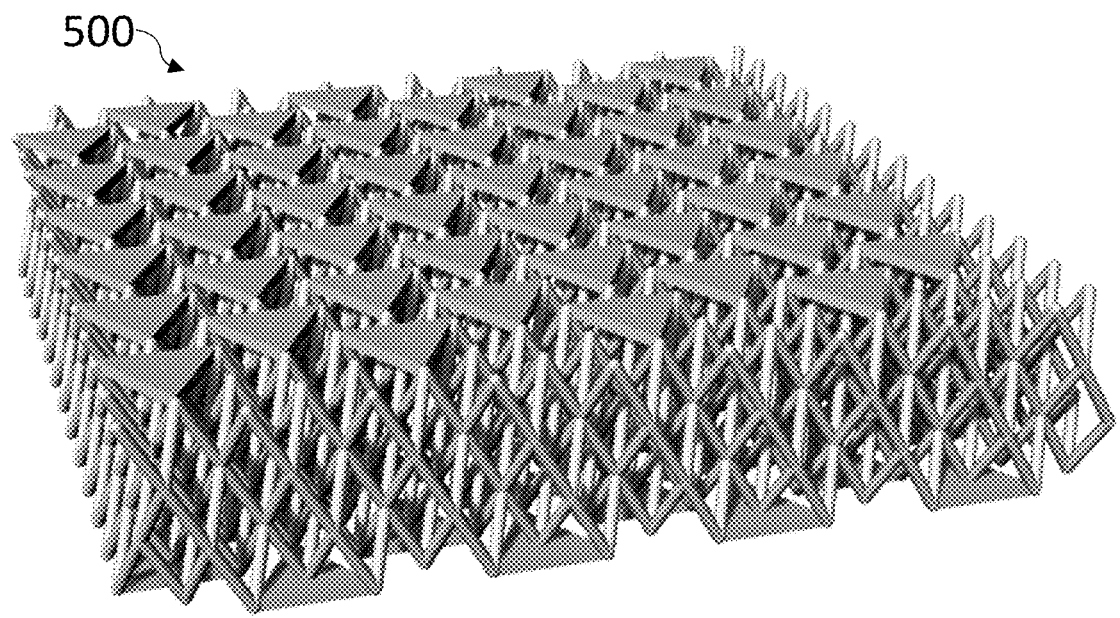
Figure 5D:
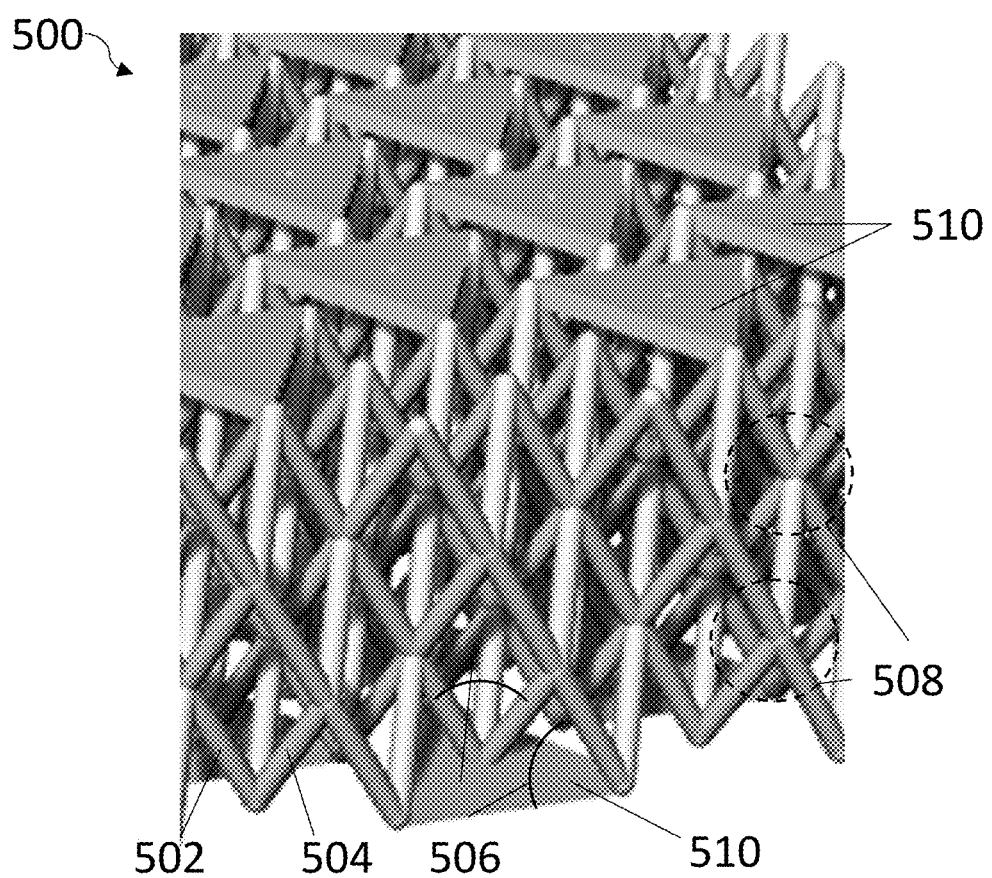
Figure 7A:
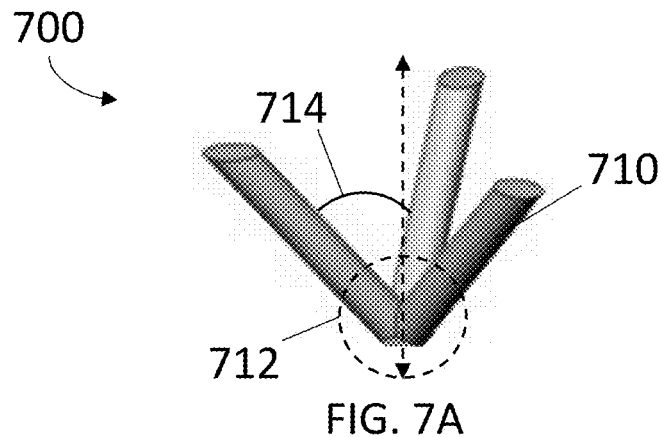
FIGS. 7A-7E depicts various embodiments of filament units.
Figure 7B:
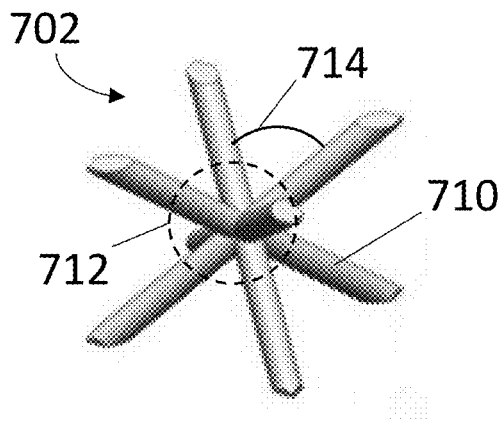
Figure 7C:
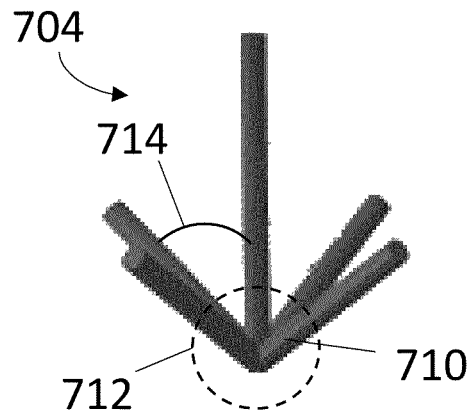
Figure 7D:
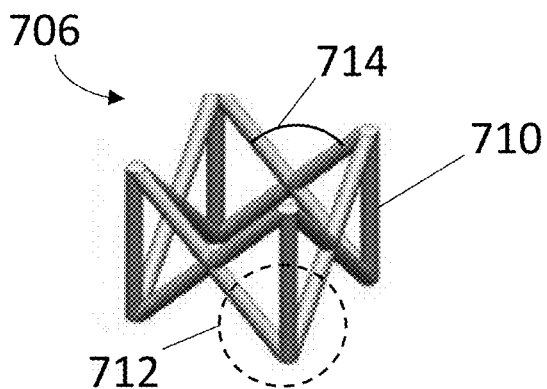
Figure 7E:
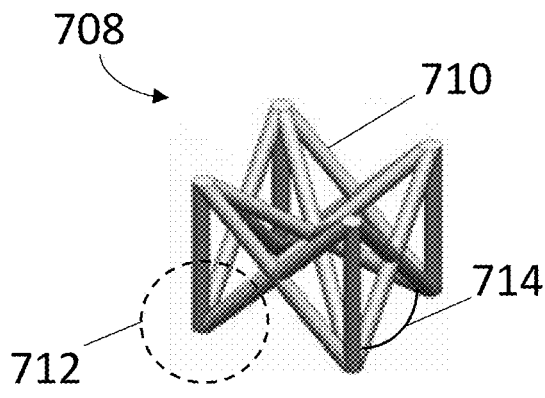

In another embodiment, the microlattice impact mitigation layer and/or structure 300 comprises a plurality of filament units 318 as shown in FIG. 3F. The microlattice layer and/or structures 300 may further comprise at least one material layer (not shown). The microlattice layer and/or structures 300 may further comprise a second material layer (not shown) and/or an intermediate material layer (not shown). The plurality of filament units 318 comprise a variety of geometric shapes. The geometric shapes comprise 3D array (pyramidal square, pyramidal triangle, tetrahedral, kagome) and/or a 3D colinear array (diamond textile, diamond, hexagon, and square). The collinearity is being defined as having the plurality of filament units 316 arranged in repeating rows, the repeating rows may be parallel or offset to the adjacent and/or preceding row. The plurality of filament units 318 comprise a plurality of nodes 308, a plurality of filaments 302,304 a plurality of interior angles 306. The microlattice impact mitigation layer and/or structure 300 may further comprise a plurality of connecting members 310. The plurality of filaments 302,304 extend from each of the plurality of nodes 308. The plurality of interior angles 306 disposed between the plurality of filaments 302,304, and the plurality of interior angles 306 comprise 1 to 89 degrees. The filament unit size 312, filament dimensions (e.g. filament width or diameter 314 and filament length 316) and/or filament interior angles 306. Furthermore, the filament unit density and filament unit orientation (not shown) may be varied to achieve the specific performance attributes. The filament units 318 having a longitudinal axis, the filament units 318 being rotated 1 to 89 degrees from its longitudinal axis. The plurality of filament units 318 are coupled and/or fused to the adjacent plurality of filament units to create an array. Alternatively, the each of the plurality of filament units 318 are coupled or fused to the adjacent each of the plurality of filament units 318 to create an array. The plurality of connecting members 310 may further connect laterally and/or substantially laterally between the plurality of filaments 302,304 and the adjacent plurality of filaments 302, 304. The plurality of connecting members 310 may be disposed on at least a top surface and/or at least a bottom surface of the microlattice layer 300. The plurality of connecting members 310 may be disposed a top portion and/or bottom portion of the plurality of interconnected filaments or the plurality of filaments 302, 304. The plurality of connecting members 310 may be disposed on an intermediate portion of the plurality of interconnected filaments or the plurality of filaments 302, 304, the intermediate portion being any position between the top portion and/or bottom portion of the plurality of interconnected filaments or the plurality of filaments 302,304.

FIGS. 5A-5E depicts various views of an alternate embodiment of a microlattice layer or structure 500. The microlattice layers and/or structures 500 may comprise a plurality of interconnected filaments 502,504, a plurality of nodes 508, and/or one or more material layers 510. The microlattice layers and/or structures 500 may further comprise a plurality of connecting members (not shown). The plurality of nodes 508 comprising intersections between the plurality of interconnected filaments 502,504, the plurality of nodes 508 formed at the points of convergence of between the plurality of interconnected filaments 502,504. The plurality of interconnected filaments 502,504 may extend in two or more different directions. Alternatively, the plurality of interconnected filaments 502,504 may extend in three or more different directions. The one or more material layers 510 disposed on the top and/or bottom surface of the microlattice layer or structure 500. The one or more material layers 510 comprising a plurality of material segments. The plurality of material segments may be arranged in repeating rows, the repeating rows being positioned in parallel/colinear and/or offset to the preceding or adjacent repeating rows. The one or more material layers 510 and/or the plurality of material segments mates, abuts, connects and/or couples to a plurality of interconnected filaments 502,504, to a plurality of nodes 508, and/or the plurality of nodes 508 and the plurality of interconnected filaments 502,504. The one or more material layers 510 and/or the plurality of material segments may further connect between the plurality of interconnected filaments 502, 504 and the adjacent plurality of interconnected filaments. The one or more material layers 510 and/or the plurality of material segments may extend laterally and/or substantially laterally over the plurality of interconnected filaments 502,504. The one or more material layers 510 may further connect laterally and/or substantially laterally between the plurality of interconnected filaments 502,504 and the adjacent plurality of interconnected filaments. The plurality of connecting members (not shown) may be disposed on at least a top surface and/or at least a bottom surface of the microlattice layer. The plurality of connecting members may be disposed a top portion and/or bottom portion of the plurality of interconnected filaments or the plurality of filaments. The plurality of connecting members may be disposed on an intermediate portion of the plurality of interconnected filaments or the plurality of filaments, the intermediate portion being any position between the top portion and/or bottom portion of the plurality of interconnected filaments or the plurality of filaments.

Example Embodiments

Claim 1. The micro-lattice layer or structure comprising: a first plurality of filaments and a second plurality of filaments, the first plurality of filaments having a first end and a second end, the second plurality of filaments intersects with the first plurality of filaments creating at least two intersection points or nodes at the first end and second end, the first plurality of filaments and the second plurality of filaments having a longitudinal axis, the second plurality of filaments extending non-perpendicularly in different directions from the first plurality of filaments; and a plurality of interior angles, the plurality of interior angles disposed adjacent to the at least two nodes;

The micro-lattice layer of claim 1, wherein the first plurality of filaments further comprises a mid-end, the mid end disposed anywhere along the longitudinal axis between the first and second end.

Claim 2. The micro-lattice layer or structure comprising: a first plurality of filaments and a second plurality of filaments, the first plurality of filaments and the second plurality filaments intersect creating at least two intersection points or nodes, the first plurality of filaments and the second plurality of filaments having a longitudinal axis, a first end, and a second end, the first plurality of filaments and the second plurality of filaments extending in different directions; the first plurality of filaments and the second plurality of filaments arranged in repeating rows to create an array; and a plurality of interior angles, the plurality of interior angles disposed adjacent to the nodes;

Claim 3. The micro-lattice layer or structure comprising: a first plurality of filaments and a second plurality of filaments, the first plurality of filaments and the second plurality filaments intersect creating one or more nodes, the first plurality of filaments and the second plurality of filaments having a longitudinal axis, the first plurality of filaments and the second plurality of filaments extending in different directions; the first plurality of filaments and the second plurality of filaments arranged in repeating rows to create an array; and a plurality of interior angles, the plurality of interior angles disposed adjacent to the nodes;

The microlattice of claim 1, 2, or 3 wherein the at least two nodes and/or one or more nodes are disposed on a top portion of the first plurality of filaments and a bottom portion of the first plurality of filaments.

The microlattice of claim 1, 2, or 3 wherein the at least two nodes and/or one or more nodes are disposed on a top portion of the second plurality of filaments and a bottom portion of the second plurality of filaments.

The microlattice of claim 4 or preceding claim, wherein the at least two nodes and/or one or more nodes are disposed on an intermediate portion, the intermediate portion being disposed between the top portion and the bottom portion of the first or second plurality of filaments.

Claim 5. The microlattice layer or structure comprising: a plurality of interconnected filaments, the plurality of interconnected filaments extending along at least three directions; a plurality of nodes, the plurality of nodes being defined as the intersections between the plurality of interconnected filaments; and a plurality of interior angles, the interior angles disposed between the plurality of interconnected filaments.

Claim 6. The microlattice layer or structure comprising: a plurality of nodes; a plurality of filaments, the plurality of filaments extending from each of the plurality of nodes; and a plurality of interior angles, the interior angles disposed between the plurality of filaments.

Claim 7. The microlattice layer or structure comprising: a plurality of nodes; at least three or more filaments extending from the plurality of nodes; and a plurality of interior angles, the interior angles disposed between the at least three or more filaments.

Claim 8. The microlattice layer or structure comprising: a plurality of geometric filament units, each of the plurality of geometric filament units having a plurality of filaments and a node, the plurality of filaments extending from the node in different directions, the plurality of geometric filament units coupled to an adjacent geometric filament unit to create an array; and a plurality of interior angles, the plurality of interior angles disposed between the plurality of filaments.

Claim 9. The microlattice layer or structure comprising: a first material layer; a second material layer; and at least one microlattice layer, the microlattice layer disposed between the first material and the second material, the at least one microlattice layer comprises a first plurality of filaments and a second plurality of filaments, the first plurality of filaments and the second plurality filaments having at least one intersection point, the first plurality of filaments and the second plurality of filaments having a longitudinal axis.

The microlattice layer and/or structure of claim 9 or any preceding claim, wherein the first plurality of filaments comprises a first end and second end, the second end is coupled to the second material layer.

The microlattice layer and/or structure of claim 9 or any preceding claim, wherein the first plurality of filaments comprises a first end and second end, the first end is coupled to the first material layer.

The microlattice layer and/or structure of claim 9 or any preceding claim, wherein the first plurality of filaments comprises a first end and second end, the first end is coupled to the first material layer and the second end is coupled to the second material layer.

The microlattice layer and/or structure of claim 9 or any preceding claim, wherein the second plurality of filaments comprises a first end and second end, the second end is coupled to the second material layer.

The microlattice layer and/or structure of claim 9 or any preceding claim, wherein the second plurality of filaments comprises a first end and second end, the first end is coupled to the first material layer.

The microlattice layer and/or structure of claim 9 or any preceding claim, wherein the second plurality of filaments comprises a first end and second end, the first end is coupled to the first material layer and the second end is coupled to the second material layer.

The microlattice layer and/or structure of claim 9 or any preceding claim, wherein the first plurality of filaments longitudinal axis is perpendicular to the first and/or second material layer.

The microlattice layer and/or structure of claim 9 or any preceding claim, wherein the second plurality of longitudinal axis is non-perpendicular to the first and/or second material layer.

The microlattice layer and/or structure of claim 9 or any preceding claim, wherein the first plurality of filaments longitudinal axis is non-perpendicular to the first and/or second material layer.

The microlattice layer and/or structure of claim 9 or any preceding claim, wherein the second plurality of longitudinal axis is perpendicular to the first and/or second material layer.

Any preceding claims, wherein the non-perpendicularity comprises an angle of 1 to 89 degrees.

Any preceding claims, wherein the non-perpendicularity comprises an angle of 30 to 75 degrees.

The microlattice layer and/or structure of claim 9 or any preceding claim, wherein the first plurality of filaments are spaced apart and parallel to the adjacent first plurality of filaments.

The microlattice layer and/or structure of claim 9 or any preceding claim, wherein the second plurality of filaments are spaced apart and parallel to the adjacent second plurality of filaments.

The microlattice layer and/or structure of claim 9 or any preceding claim, wherein the first plurality of filaments or the second plurality of filaments are at least a 3:1 aspect ratio.

The microlattice layer and/or structure of claim 9 or any preceding claim, wherein the first plurality of filaments and the second plurality of filaments are at least a 3:1 aspect ratio.

The microlattice layer and/or structure of claim 9 or any preceding claim, wherein the first plurality of filaments and/or the second plurality of filaments comprises a cross-sectional shape, the cross-section shape being a circle, a regular polygon or irregular polygon.

The microlattice layer and/or structure of claim 9 or any preceding claim, wherein the first plurality of filaments and/or the second plurality of filaments comprises a material having an initial modulus of 1 to 10,000 MPa.

The microlattice layer and/or structure of claim 9 or any preceding claim, wherein the first plurality of filaments and/or the second plurality of filaments comprises a material having a stress at 50% and a strain of 0.5 to 5,000 MPa.

The microlattice layer and/or structure of claim 9 or any preceding claim, wherein the first material and/or the second material comprises a uniform, one-piece layer.

The microlattice layer and/or structure of claim 9 or any preceding claim, wherein the first and/or second material comprises a plurality of segmented pieces, the plurality of segmented pieces are placed in repeating rows, each of the repeating rows are parallel or offset to the adjacent repeating row and/or each of the repeating rows are offset from the adjacent or repeating row.

The micro-lattice microlattice layer and/or structure of any preceding claim, wherein the cross-sectional shape is a solid, uniform shape.

The microlattice layer and/or structure of any preceding claim, wherein the cross-sectional shape is uniform along the longitudinal axis of the first plurality of filaments and/or the second plurality of filaments.

The microlattice layer and/or structure of or any preceding claim, wherein the cross-sectional shape is non-uniform along the longitudinal axis of the first plurality of filaments and/or the second plurality of filaments.

The microlattice layer and/or structure of or any preceding claim, wherein the cross-sectional shape having a width/diameter, the width/diameter being a range between 0.1 mm to 5 mm.

The microlattice layer and/or structure of or any preceding claim, wherein the first and/or second plurality of filaments material comprises foams, thermoplastics, thermoplastic elastomer, thermoset elastomers and/or any combination thereof.

The microlattice layer and/or structure of or any preceding claim, wherein the first and/or second material comprises polycarbonate, polyurethane, fiber glass, composite fiber, carbon fibre, expanded polystyrene (EPS), thermoplastics, fabrics, and/or any combination thereof.

Claim 10. An engineered material or a three dimensional network comprising: a plurality of filaments, each of the plurality of filaments intersects with at least two other filaments on their end creating an end node, and each end node is connected to at least one other end node with a connecting member; where the plurality of filaments may have at least one other intersection point with other filaments that are not ends nodes (mid nodes), where each mid node constitutes an intersection of at least 3 filaments; and where each filament forms an angle between 30 and 89 degrees with the nodal plane.

The engineered material of any preceding claim, wherein the filaments cross-section area is between 0.01-20 square mm.

The engineered material of any preceding claim, wherein the filaments are made of a material with an initial modulus of 1-10,000 MPa, or a stress at 50% strain of 0.5-10,000 MPa.

The engineered material of any preceding claim, wherein the filaments are built with a material able to resist a strain deformation of a minimum 100% without permanent plastic deformation.

The engineered material of any preceding claim, wherein the filaments are built with a material able to resist a strain deformation of a minimum 100%.

The engineered material of any preceding claim, wherein the connecting member between the end nodes is another part of the product that is bonded to the engineered material.

The engineered material of any preceding claim, wherein the connecting members are between mid-nodes instead of end-nodes.

We claim:

1. A microlattice pad assembly comprising:
   a first pad layer, the first pad layer comprises one or more microlattice structures, the one or more microlattice structures comprising a plurality of interconnected filaments, wherein:
     the plurality of interconnected filaments includes a plurality of interior filaments;
     each interior filament is a straight filament that extends obliquely from a respective first end at a first surface to a respective second end at a second surface;
     the respective first end of each interior filament connects with the respective first ends of at least two other filaments of the plurality of interconnected filaments to form a first set of end nodes at the first surface;
     the respective second end of each interior filament connects with the respective second ends of at least two other filaments of the plurality of interconnected filaments to form a second set of end nodes at the second surface;
     each interior filament intersects with at least one other filament of the plurality of interconnected filaments to form one or more mid nodes between the respective first end and the respective second end of the respective interior filament;
     one of the first surface and the second surface of the first pad layer is contoured to an anatomical feature; and
     the first pad layer further comprises a plurality of segments that are spaced apart, each segment of the plurality of segments directly contacting at least two end nodes of the second set of end nodes at the second surface.

2. The microlattice pad assembly of claim 1, wherein a cross-section of each filament of the plurality of interconnected filaments is uniform along a longitudinal axis of the filament.

3. The microlattice pad assembly of claim 1, wherein an interior subset of the one or more mid nodes comprises an intersection of at least three filaments of the plurality of interconnected filaments.

4. The microlattice pad assembly of claim 1, wherein each interior filament intersects at least two other filaments at a respective mid node of the one or more mid nodes.

5. The microlattice pad assembly of claim 1, wherein a respective mid node of the one or more mid nodes comprises an intersection of at least two other filaments of the plurality of interconnected filaments.

6. The microlattice pad assembly of claim 1, wherein the anatomical feature comprises a wearer's head.

7. The microlattice pad assembly of claim 1, wherein:

the first surface is contoured the anatomical feature; and the second surface is coupled to an inner surface of a helmet shell.

8. The microlattice pad assembly of claim 7, wherein the second surface is contoured to the inner surface of the helmet shell.

9. The microlattice pad assembly of claim 7, wherein an impact mitigation layer is disposed between the inner surface of the helmet shell and the first pad layer.

10. The microlattice pad assembly of claim 1, wherein each interior filament intersects with at least two other filaments of the plurality of interconnected filaments to form the one or more mid nodes between the respective first end and the respective second end of the respective interior filament.

11. The microlattice pad assembly of claim 1, wherein the first pad layer comprises an open structure.

12. The microlattice pad assembly of claim 1, wherein the first pad layer is 3D printed.

13. A helmet comprising:

a shell; and a layer comprising one or more pads, wherein the layer is contoured to an anatomical feature of a wearer, wherein the one or more pads comprise a microlattice structure including a plurality of interconnected filaments that are straight and extend obliquely from a first end at a first surface to a second end at a second surface, wherein:

the plurality of interconnected filaments includes a plurality of interior filaments;

the respective first end of each interior filament of the plurality of interconnected filaments connects with the respective first ends of at least two other filaments of the plurality of interconnected filaments to form a first set of end nodes at the first surface;

the respective second end of each interior filament of the plurality of interconnected filaments connects with the respective second ends of at least two other filaments of the plurality of interconnected filaments to form a second set of end nodes at the second surface;

each interior filament intersects with at least one other filament of the plurality of interconnected filaments to form one or more mid nodes between respective first end and the respective second end of the respective interior filament; and the one or more pads further comprise a plurality of segments that are spaced apart, each segment of the plurality of segments directly contacting at least two end nodes of the second set of end nodes at the second surface.

* * * * *